United States Patent [19]

Yamamoto

[11] Patent Number: 5,801,859
[45] Date of Patent: Sep. 1, 1998

[54] NETWORK SYSTEM HAVING TRANSMISSION CONTROL FOR PLURAL NODE DEVICES WITHOUT ARBITRATION AND TRANSMISSION CONTROL METHOD THEREFOR

[75] Inventor: Mitsuru Yamamoto, Yokohama, Japan

[73] Assignee: Canon Kabushiki Kaisha, Tokyo, Japan

[21] Appl. No.: 897,707

[22] Filed: Jul. 21, 1997

Related U.S. Application Data

[63] Continuation of Ser. No. 579,737, Dec. 28, 1995, abandoned.

[30] Foreign Application Priority Data

Dec. 28, 1994 [JP] Japan ................................ 6-327496
Dec. 14, 1995 [JP] Japan ................................ 7-325632

[51] Int. Cl.$^6$ .......................... H04B 10/20; H04J 14/00
[52] U.S. Cl. .......................... 359/119; 359/125; 370/368; 370/429
[58] Field of Search .......................... 359/118, 119, 359/123, 125, 137, 158; 370/351, 368, 428–429, 430

[56] References Cited

U.S. PATENT DOCUMENTS 5,493,434  2/1996  Sasayama et al. .................... 359/123

FOREIGN PATENT DOCUMENTS 0 410 626 A2  1/1991  European Pat. Off. .
6-308558  11/1994  Japan .

OTHER PUBLICATIONS

"Fast Wavelength–Switching of Laser Transmitters and Amplifiers", H. Kobrinski et al., *IEEE Journal on Selected Areas in Communications*, vol. 8, No. 6 (Aug. 1990), pp. 1190–1202.

*Primary Examiner*—Kinfe-Michael Negash
*Attorney, Agent, or Firm*—Fitzpatrick, Cella, Harper & Scinto

[57] ABSTRACT

In a first node device of a network system wherein plural node devices are connected through N numbered channels for signal transmission, N numbered buffers temporarily store signals to be transmitted and transmission units send the signals from each buffer through the N numbered channels. A channel altering control unit controls the transmission units to alter the channels through which the buffer signals can be sent according to a predetermined pattern that prevents signals from plural buffers from being sent to the same channel at the same time and a buffer controller operating synchronously with the channel alteration, controls the buffers to read out signals through desired channels. A second node device receives the signals from the first node device through the N numbered channels.

77 Claims, 27 Drawing Sheets

FUNCTION OF SWITCH

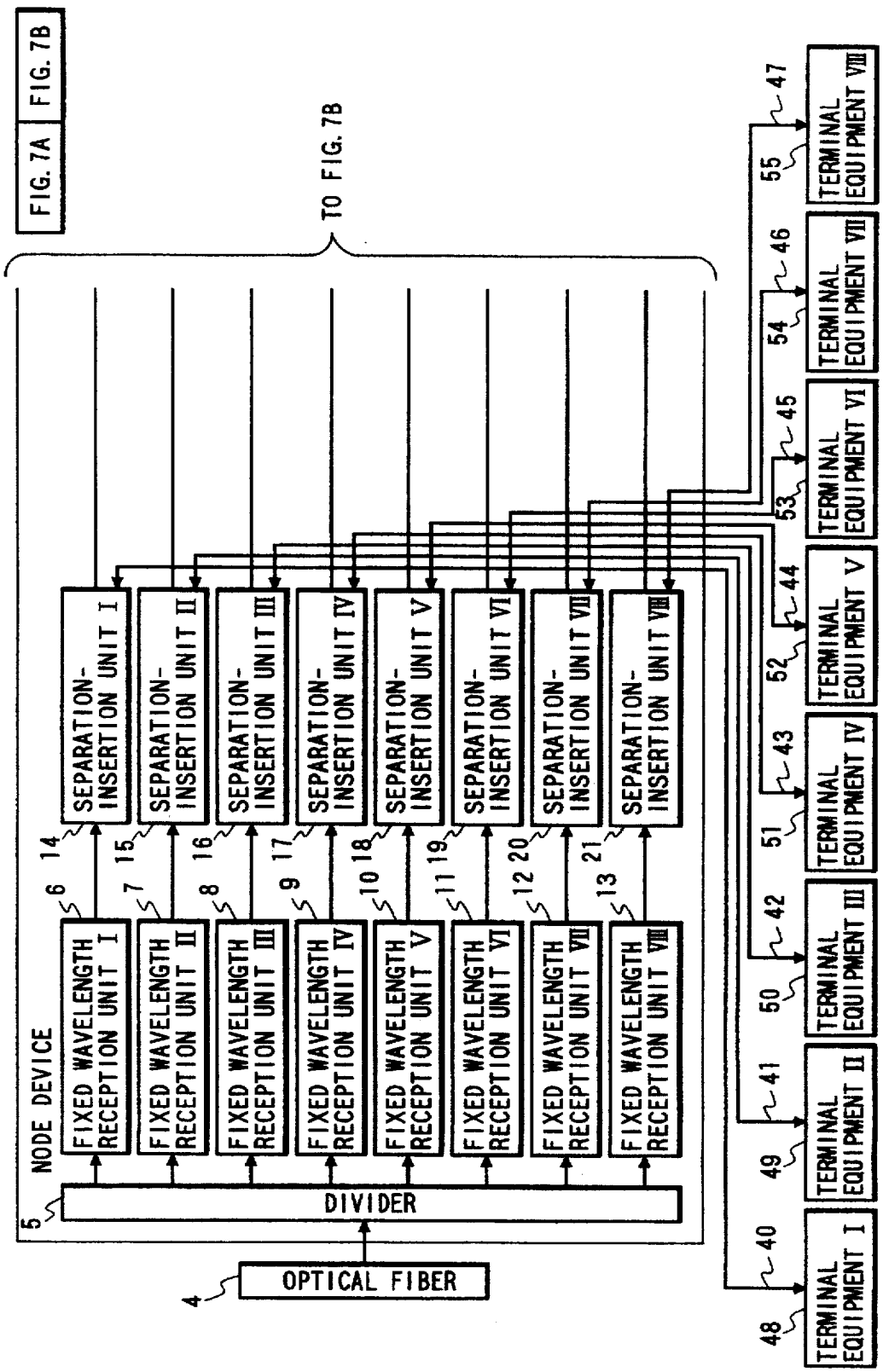

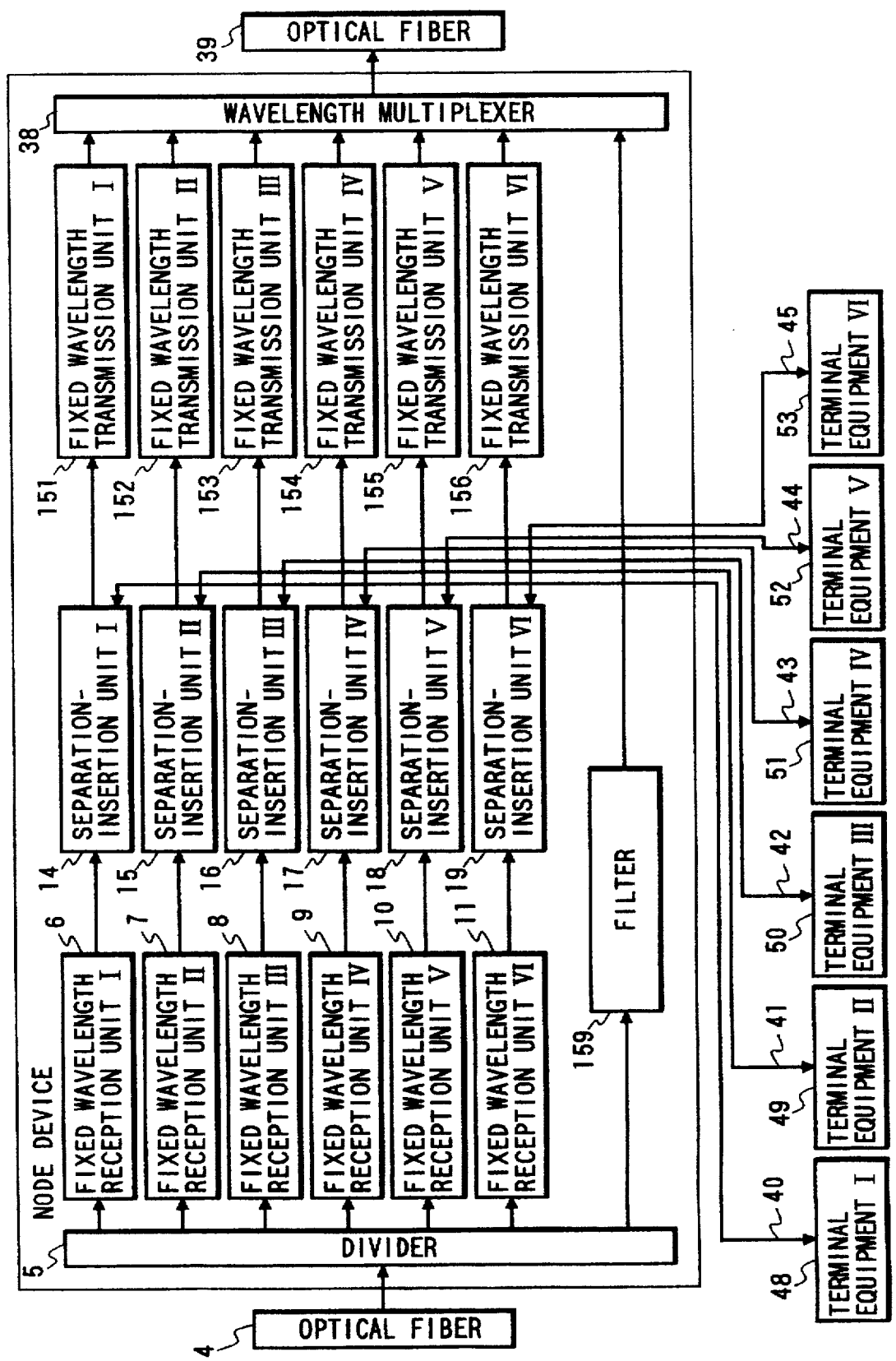

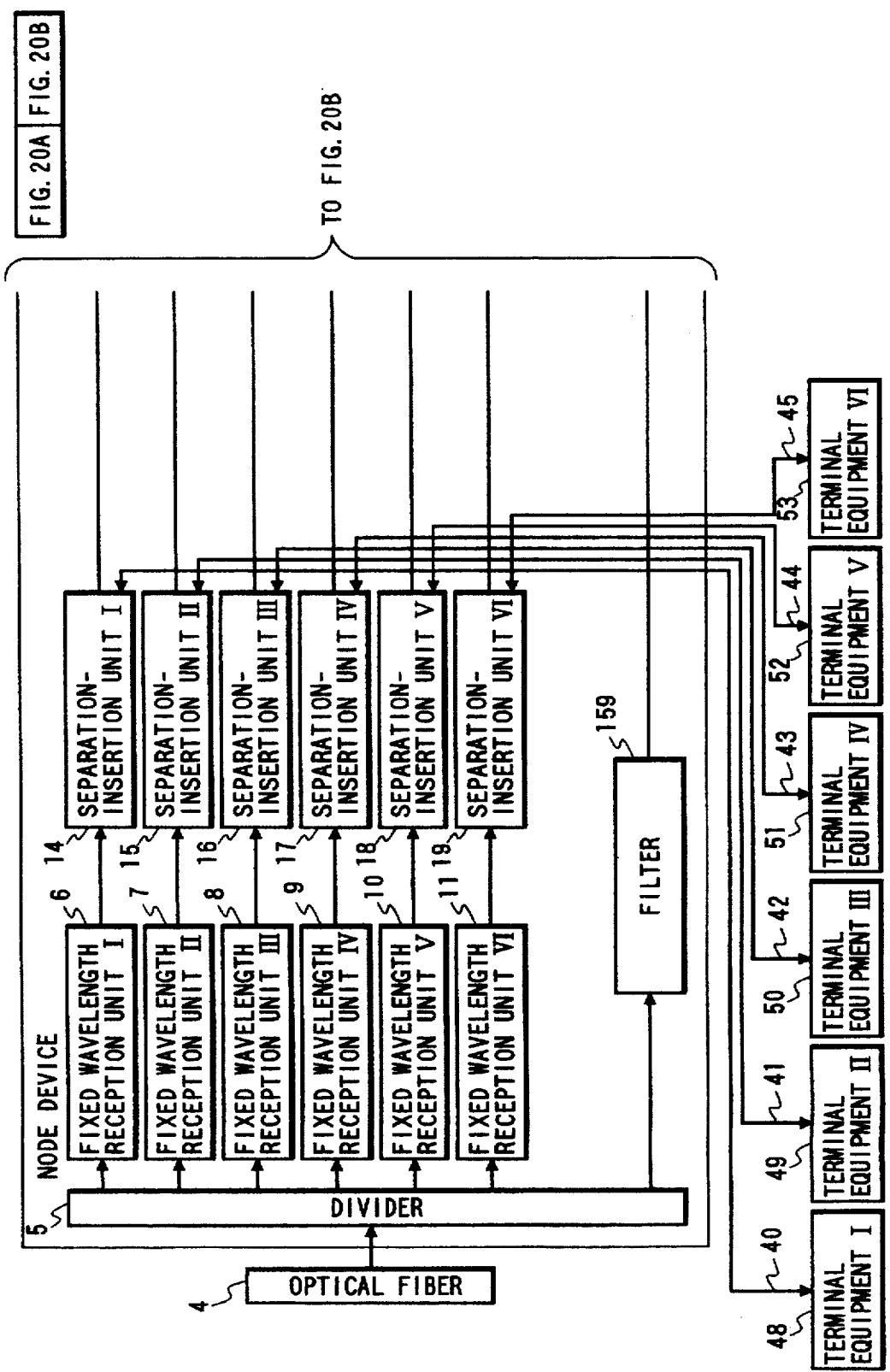

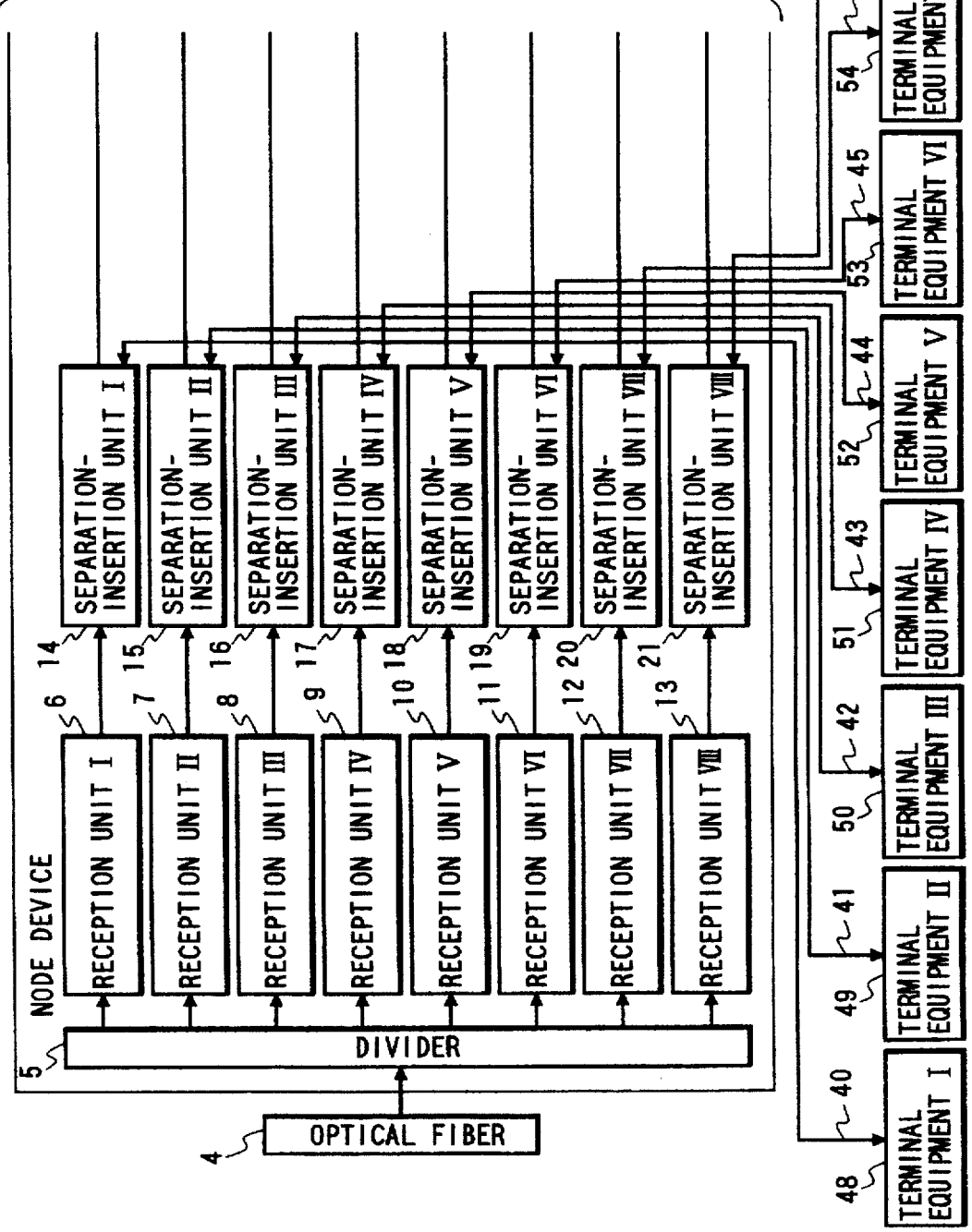

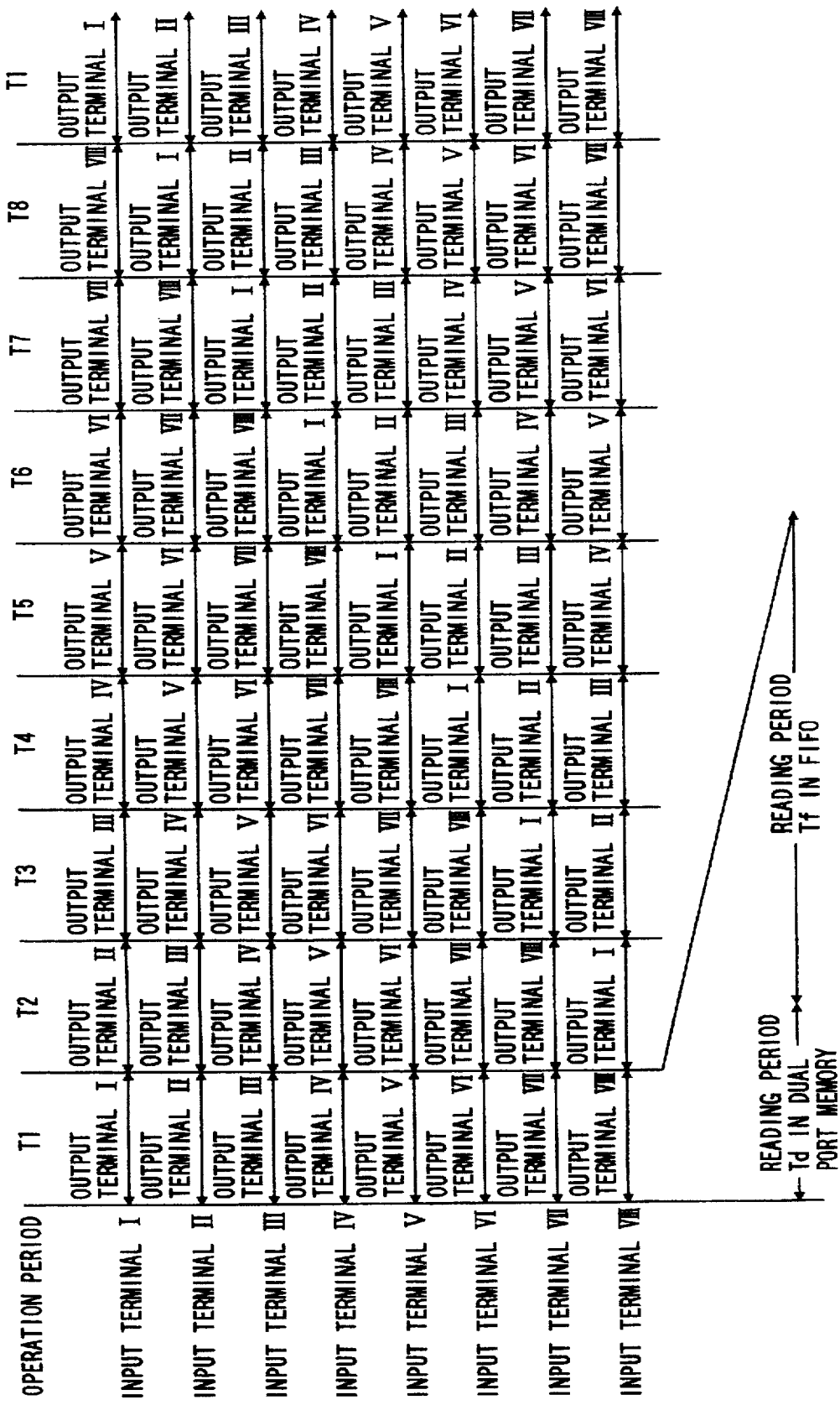

1

NETWORK SYSTEM HAVING TRANSMISSION CONTROL FOR PLURAL NODE DEVICES WITHOUT ARBITRATION AND TRANSMISSION CONTROL METHOD THEREFOR

This application is a continuation of application Ser. No. 08/579,737 filed Dec. 28, 1995, now abandoned.

BACKGROUND OF THE INVENTION

1. Field of the Invention

The present invention generally relates to a network system, a node device and a transmission control method. More particularly, it relates to a node device for connection of a plurality of terminal equipments, a network system which includes a multi-channel transmission line having a plurality of channels for connection of a plurality of node devices, and a transmission control method to control packets transmitted through the node devices and the network system.

2. Related Background Art

In recent years, study and development have been made with respect to network systems each of which employs a plurality of channels for transmission, such as a wavelength multi-transmission line utilizing a wide range of optical wavelengths, since a high-speed network system is required following speeding up of processing in each terminal equipment. Such network systems, node devices and methods are roughly classified into two types.

First classification, as shown in FIG. 1, includes a network system which is constituted of a plurality of node devices 117 for connection of a plurality of terminals 124 and a wavelength multi-transmission line 125 for connection of the plurality of node devices 117.

In the first type of the network system of FIG. 1, a packet transmitted from a terminal equipment 123 and input to an I/F unit 121 is exchanged so as to be transmitted from one of a plurality of fixed wavelength transmission unit 120 with a predetermined wavelength.

The packet is then output to the fixed wavelength transmission unit 120 and transmitted with the predetermined wavelength therefrom. Afterward, relay processings are made through relay node devices which exist on the way to a destination terminal to which the packet is transmitted.

Finally, the packet is received at a fixed wavelength reception unit 118 in the destination node device and controlled by the exchange unit with respect to its destination so as to be output from an output I/F unit 122 to which the destination terminal is connected. Accordingly, the packet can be output from the proper output I/F unit 122 and received by the destination terminal 123.

The exchange unit of the node device is operative to route the packet through the desired node device to the desired terminal equipment by controlling exchange operation as to which fixed wavelength transmission unit and I/F unit should be selected for output of the packet.

Second classification includes a network system connected by a topological wavelength multi-transmission line, such as bus or star network, which is generally called as a transmission media shared-type system.

Such a network system makes a request for use of the wavelength transmission line to a server which manages the wavelength assigned to each of the terminal equipments. The network system then performs arbitration control using a so-called demand assigning method to get the server to assign the wavelength so that no wavelength conflict can occur such as several terminal equipments use an identical wavelength for transmission. As mentioned above, the network system of second type employs the wavelength assigned for packet transmission.

The above conventional systems, however, have some disadvantages as described below.

In the first type of conventional system, there arises a problem that the node device increases in cost because of a large-scaled hardware of the exchange unit.

FIG. 2 is a first structural example of the conventional exchange unit of the first type, illustrating a crossbar exchange having N inputs and N outputs.

In FIG. 2, each of decoder units 126 reads out an address portion of the input packet and instructs a control unit 130 on the output destination to which the packet should be output. FIFOs (First In First Out) 127 then store the input packets temporarily and output them to respective output lines one by one in order of input in accordance with control instructions from the control unit.

Input lines 128 supply switches 129 with the packet signals from the FIFOs 127. The switches 129 act to switch over whether to output the input packet signal to the output line or not. The control unit 130 performs, in accordance with outputs from the decoder, read-out control of the FIFOs 127 as well as opening and closing control of the respective switches 129.

The output lines 131 supply the respective output destinations with the packet signals from the respective switches 129.

FIG. 5 shows a packet to be exchanged in the packet exchange unit of FIG. 2. In FIG. 5, an address portion 140 indicates a destination terminal equipment to receive the packet and a data portion 141 indicates data to be carried by the packet.

In the crossbar exchange, routing control is performed in the control unit 130 by controlling opening and closing action of the switch to which a desired destination is connected so that the output destination can be changed. Arbitration control is also performed in the control unit 130 to determine which input should be output when an output conflict occurs such as the plurality of inputs intend to be output to an identical destination.

Under these controls, the exchange operation is carried out in the crossbar exchange. However, in the first example of the exchange unit having N inputs and N outputs, as shown in FIG. 2, N×N switches are required, resulting in a very large-scaled hardware.

Further, the first example of the exchange unit is required to connect N switch outputs per output line for connection between the plurality of input lines and the plurality of output lines, so that wiring of the connection line will be long, resulting in wiring delay, increase of stray capacitance, or the like. Accordingly, as the number of N inputs increases, it becomes harder to accelerate switching operation. In other words, the first type of the exchange unit is unsuitable for a high-speed exchange of input packet signals.

Furthermore, the first example of the exchange unit is required to perform the arbitration control by monitoring the occurrence of an output conflict with respect to all of inputs for each output destination. This also causes the control unit to increase in hardware scale so that the arbitration control can be realized.

Now, FIG. 3 shows a second structural example of the exchange unit, which intends to overcome the problems in the first example of the exchange unit. This second type of the exchange unit is constituted in a manner that 2×2 switches having two inputs and two outputs are connected in multistage. In FIG. 3, each of switches 132 is a 2×2 switch having two inputs and two outputs, performing both of functions; straight and cross. A set of 2×2 switches containing 12 pieces and connected to form a shuffle network realizes an omega exchange unit having 8 inputs and 8 outputs.

FIG. 4 shows an internal structure of the 2×2 switch having two inputs and two outputs as mentioned above.

In FIG. 4, a decoder I 133 and a decoder II 134 each read out the address portion of the input packet and instruct the control unit on a corresponding output terminal to which the packet should be output. A FIFO (First In First Out) I 135 and a FIFO II 136 temporarily store the input packets and output them to selectors in order of input under the control of the control unit. The selector I 137 and the selector II 138 each select either of the FIFOs which stores the packet signal to be output to the output destination.

If the selector I 137 selects the FIFO I 135 and the selector II 138 selects the FIFO II 136, the switch will be functionally in the straight state. Conversely, if the selector I 137 selects the FIFO II 136 and the selector II 138 selects the FIFO I 135, the switch will be in the cross state.

In the second example of the exchange unit, the required number of the 2×2 switches is NlogN-N/2 (the base of the log is 2) so that it can be smaller than that of the first example which includes the N×N switches. Nonetheless, there also arises another problem that the full scale of the hardware becomes large because the 2×2 switches each need a decoder, a FIFO, a control unit and a selector.

Further, the second example of the exchange unit has the disadvantage that a so-called blocking phenomenon can occur such as connection with the desired output destination can not be made depending upon the connected conditions of other inputs even if the connection has not been made from different inputs to a single output destination.

In FIG. 3, assuming that the input 5 is connected to the output destination 3, the 2×2 switch 132 on the upper left will be set to the cross state. Under this condition, the input 1 can not be connected to the output destination 1 because of occurrence of blocking unless the upper left 2×2 switch is set to the straight state.

As described such above, the first type of the conventional network system has the disadvantage that the node device increases in cost because of a large-scaled hardware of the exchange unit which forms a main component of the node device.

On the other hand, the second type of the network system is typically constituted as shown in FIG. 6, with the following problems contained therein.

FIG. 6 shows the second type of the conventional network system, which is constituted in a manner that a plurality of terminal equipments are connected through a bus network to a server which performs wavelength assignment for each terminal equipment.

In FIG. 6, a bus type wavelength multi-transmission line 142 is an optical fiber cable. A server 143 has a wavelength assignment function. And, blocks 144 each indicate a terminal equipment. A Power multiplexer and divider 145 then applies both an optical signal from a variable wavelength transmission unit 146 to the optical fiber cable 142 and an optical signal on the optical fiber cable 142 to a fixed wavelength reception unit 147 after dividing the signal.

The variable wavelength transmission unit 146 mounts a tunable laser diode (TLD) thereon and is operative to convert a packet signal from a packet processing unit 148 into an optical signal having a predetermined wavelength under the control of a wavelength control unit 149 and apply it to the power multiplexer and divider 145. The fixed wavelength reception unit 147 is constituted of a filter, through which only the optical signal having the predetermined wavelength can be transmitted by cutting off the other optical signals, and a photodiode which is operative to convert the optical signal transmitted through the filter into an electric signal to be output.

The wavelengths transmitted through the filter of the fixed wavelength reception unit 147 are assigned to be different in each terminal equipment. The wavelength control unit 149 controls the wavelength from the variable wavelength transmission unit to match up to a desired wavelength. Finally, an assignment control unit 150 assigns a plurality of wavelengths to be used in the network system for transmission as well as performs the arbitration control in the case the wavelength conflict occurs.

The conventional network systems, as described above, necessarily have an arbitration function, by which the wavelengths from the respective variable wavelength transmission units of the plurality of terminals can be prevented from overlapping, because the optical fiber cable or the bus wavelength multi-transmission line is commonly used in each terminal equipment. Generally, a demand assigning method is used to perform the arbitration control.

In this method, when transmitting the packet, the transmitting terminal first sets the transmission wavelength of its variable wavelength transmission unit to an acceptable wavelength for the server and sends the server a packet signal for request to send, including an address of a destination terminal to which the packet should be transmitted.

On reception of the packet signal for request to send, the server searches as to whether the acceptable wavelength for the destination terminal is available or not. The server then sets the transmission wavelength of its variable wavelength transmission unit to an acceptable wavelength for the transmitting terminal equipment and sends the transmitting terminal equipment a communication enabling packet signal as permission if available, or a communication disenabling packet signal as a communication-not-accepted signal if not available.

The terminal equipment from which the packet signal for request to send has been sent receives either of the communication enabling/disenabling signals, and if enabling, the transmitting terminal equipment sets the transmission wavelength of its variable wavelength transmission unit to the acceptable wavelength for the terminal equipment to which the packet is destinationed for sending the desired packet.

If not enabling, the transmitting terminal equipment waits for a predetermined interval of time, sends again the server the packet signal for request to send, and repeats the above operation until the communication is permitted. The arbitration function is thus performed so that the wavelengths from the respective variable wavelength transmission units of the plurality of terminals can be prevented from overlapping.

In the conventional network system of the second type, each filter is set to transmit only an optical signal having an individual wavelength unique to each terminal equipment so that the wavelength of the optical signal incident on each photodiode can be unique as well. Accordingly, the transmission wavelength can be changed at the tunable laser diode (TLD) of the transmitting terminal equipment, thereby realizing the routing function for sending the packet to the destination terminal equipment to be desired.

However, the network system of the second type takes time to communicate with the server for arbitration, such as to send the packet signal for request to send and to receive the communication enabling/disenabling packet signal.

Further, the arbitration control is necessarily performed for each wavelength on the network and this puts too much load on the arbitration control unit of the server, so that arbitration itself will take time, resulting in lowering of throughput in the network system. Furthermore, the wavelength control unit of each terminal necessarily adjusts the transmission wavelength into the predetermined wavelength in each communication, such as with the server or the receiving terminal equipment, and this requires high-speed wavelength control, resulting in a large-scaled hardware.

There also arises a third problem as discussed below. The conventional network systems such above need to check the accepting destination address against all of terminal addresses in the network system and read out output specification data from an output specification table based upon a terminal address with which the accepting destination address has been matched, so that it is necessary to arrange the number of memory and comparator sets in the same number of terminals or more. The same arrangements are made with respect to the output specification table.

Further, the time for generation of the table addresses becomes long as the number of matched signals increases. Accordingly, increasing the number of terminals to be connected in the conventional network system increases the decoders in hardware scale as well as the node devices in cost, and therefore, it becomes harder to decode addresses at a high speed, interfering with the high-speed operation in the network system.

SUMMARY OF THE INVENTION

An exchange operation in the exchange unit of the first type mentioned above is to switch a relationship of connection between a transmitting side and a receiving side. As a result of the inventor's study, it has been found that it is possible to appropriately perform the exchange operation among a plurality of transmitting sides and a plurality of receiving sides both connected to a multi-channel (wavelength multiplexed) transmission line which is multi-channel transmitting means by altering the combination between a transmitting side and a receiving side for use in each channel (wavelength).

The inventor further has found that in the alteration of combination between a transmitting side and a receiving side, channels (wavelengths) are fixedly assigned to transmitting sides or receiving sides while channels (wavelengths) used for the other transmitting or receiving sides are changed at the same time, and transmission of data is performed in synchronization that the combination between a transmitting side and a receiving side is altered to a desired combination between a transmitting side and a receiving side, so that it is not necessary to perform any arbitration.

The present invention is made in accordance with the above idea for solving the problems in the conventional systems and a primary object of the present invention is to provide improved node device and network system in which the exchange unit is eliminated from the conventional node device of the first type so that the node device can be prevented from increasing in hardware scale as well as increasing in cost.

Also, a secondary object of the present invention is to provide improved node device, network system and transmission control method which do not require arbitration control such as to interfere with throughput improvement in the network system and which simplify the routing control as well as the transmission channel control such as wavelength control of the tunable laser diode utilized as variable wavelength transmission means, so that the operation can be performed at a higher speed than conventional ones, thereby reducing the hardware scale.

Accordingly, the present invention can solve the problems in the art by providing the network system, the node device and the transmission control method as disclosed hereinbelow.

A first network system according to the present invention in which a plurality of node devices are connected for signal transmission through N numbered channels comprising:

a first node device including;
N numbered buffer means for temporarily storing signals to be transmitted;
transmission means which can send each signal from each buffer means through the N numbered channels;
channel alteration control means for controlling the transmission means to alter the channels, through which the signals from the buffer means can be sent, in accordance with a predetermined pattern so that the signals from two or more buffer means can not be sent to an identical channel at the same time; and
buffer control means, in synchronism with alteration of channels for desired ones, for controlling the buffer means to read out the signals to be read out through the desired channels; and a second node device for receiving signals from the first node device for transmission including;
reception means for receiving the N numbered channels respectively.

In such a structure, it not required to alter the transmission channels of the transmission means in accordance with destination addresses to which the signals should be transmitted from the first node device. It is also unnecessary to rearrange the transmission channels in advance so that signals to be transmitted through an identical channel can not be input from two or more buffer means to the transmission means at the same time. In addition, the first node device can further include means for receiving the N numbered channels respectively.

In one form of the network system to which a plurality of terminal equipments are connected, the node device or devices further include separation means for selectively separating a certain signal to be separated from a stream of signals received by the reception means and outputting it to a terminal connected thereto through a subtransmission line.

The signal to be transmitted such above can be composed of a separation means address indicating an address of either separation means to which a distination terminal is connected or a node device in which the separation means are included and a channel address indicating a channel through which the separation means can selectively separate the signal to be separated, whereby the buffer means can select a channel to be output in accordance with the channel address and the separation means can determine in accordance with the separation means address whether to separate the signal or not.

In the network such above, the signal which is transmitted from one node device (transmitting node device) to another node device (receiving node device) has only to be output through a predetermined channel in the first node device which resides between the above two node devices.

Accordingly, assuming that the first node device stands next to the destination node device (receiving node device) on the upper-stream side and outputs the signal through the predetermined channel therein, the node devices in the network other than the above first node device can use any one of channels to output the signal. The other relay node devices each refer to the drop means address mentioned above to identify itself as the node device for outputting the signal through the predetermined channel or not.

Further, with a structure for inputting signals to the network, the node devices can each include insertion means for inserting a signal sent from a terminal equipment connected thereto through a subtransmission line into a signal stream to be transmitted by said transmission means.

Furthermore, in order to ease read-out operation, the buffer means can divide in advance input signals into one signal to be output with channel designated, through which the signal should be sent, and the other signal to be output without channel designation. The signal to be output with channel designation can be also divided by channel to be transmitted so that the read-out operation can become still easier, thus enhancing the efficiency and speeding up the system.

In another aspect of the present invention, the network system can further include a set to N sets of third node devices including;

reception means for selectively receiving a predetermined channel out of the plurality of channels;

separation means for selectively separating a signal to be separated from the signal stream in the reception means and outputting it to a terminal connected thereto through a subtransmission line;

insertion means for inserting a signal to be transmitted from the terminal equipment through the subtransmission line to the signal stream received by the reception means; and transmission means for transmitting the signal stream through a predetermined channel in the plurality of channels, wherein channels to be received by said reception means are different one another in the respective sets and channels to be transmitted from said transmission means are different in the respective sets so that each of said channels to be received by said reception means in the respective sets is same as either one of said channels to be transmitted from said transmission means in the respective sets.

Such a third node device or devices can not be used to select a channel for output of input signals, but it can cost-efficiently increase the number of terminals to be connected in the network system. In the configuration such above, the receivable channel and the transmittable channel in each third node device are arranged in the same number and to correspond to each other, so that no channel interference can occur between node devices even when a multi-channel transmission is performed, for example, utilizing a wide range of wavelengths.

The plurality of channels such above may be arranged either in a multiple form or not. According to a preferred embodiment of the present invention in which a multi-channel configuration is embodied, the plurality of channels are optical channels having N numbered wavelengths so that a wavelength multi-transmission can be performed between node devices.

In this configuration, if the optical channels having a plurality of wavelengths are used as the plurality of channels and the transmission is performed through the variable wavelength transmission means, it would be better to reduce the variance rate of the wavelength. Accordingly, either of the following two patterns can be effectively applied to the wavelength alteration.

First pattern of the wavelength alteration starts with the shortest wavelength out of N numbered wavelengths and, in turn, selects odd numbers of the wavelengths in ascending order. Then, after selecting the longest wavelength in odd numbers, it selects the longest wavelength in even numbers, in turn, selects even numbers of the wavelengths in descending order and, after selecting the secondly shortest wavelength, the shortest wavelength is again selected.

Second pattern of the wavelength alteration starts with the secondly shortest wavelength out of N numbered wavelengths and, in turn, selects even numbers of the wavelengths in ascending order. Then, after selecting the longest wavelength in even numbers, it selects the longest wavelength in odd numbers, in turn, selects odd numbers of the wavelengths in descending order and, after selecting the shortest wavelength, the secondly shortest wavelength is again selected.

In still another aspect of the present invention, the channel alteration can be accomplished by a network system further including N numbered fixed channel transmission means utilized as transmission means instead of the variable channel transmission means, each of which outputs a predetermined individual channel out of N numbered channels, and connection alteration means for altering connection between the N numbered buffer means and the N numbered fixed channel transmission means, wherein the fixed channel transmission means, from which signals of the respective buffers are transmitted, are altered in accordance with a predetermined pattern by controlling the connection alteration means, so that the channels transmittable from the buffer means can be altered.

The connection alteration means include N numbered selectors, which correspond to the N numbered fixed channel transmission means respectively, and distribution means which distribute outputs from the N numbered buffer means respectively to the N numbered selectors. Accordingly, the connection alteration means can be used to alter the connection between the buffer means and the fixed channel transmission means by alteration as to which output should be selected from the buffer means for each selector.

Furthermore, the present invention can be applied to another network system which includes N numbered channels and a plurality of node devices each for receiving and transmitting two or more preassigned channels out of the N numbered channels so that a signal to be transmitted through any one of the N numbered channels can be transferred to another channel for transmission in at least one node device out of all of node devices.

Accordingly, the present invention further discloses a second network system, wherein a first node device selected at least one out of the plurality of node devices includes n numbered reception means each of which receives n numbered channels to be received and transmitted by its own node device out of the N numbered channels;

n numbered buffer means each of which temporarily stores signals to be transmitted out of all signals in the reception means;

transmission means which can send the signals from the buffer means through the n numbered channels;

channel alteration control means for controlling the transmission means to alter the channels, through which the signals from the buffer means can be sent, in accordance with a predetermined pattern so that the signals from two or more buffer means can not be sent to an identical channel at the same time; and buffer control means, in synchronism with alteration of channels for desired ones, for controlling the buffer means to read out the signals to be read out through the desired channels.

In this configuration, the first node device can not respond to all of the N numbered channels, but can do to n numbered channels in the substantially same manner as that of the first network system.

The present invention also discloses node devices and transmission control methods utilized in the above network systems.

In the network systems, the node devices and the transmission control methods according to the present invention such above, routing control of a packet can be performed, without exchange means incorporated, by altering a channel used during transmission of the packet from each buffer so that the fixed wavelength reception means for receiving the packet can be altered.

Further, since the plurality of buffer means can be set not to share a single channel with each other for packet transmission, no arbitration control is required, such as to utilize the demand assignment or the like, because no signal collision can occur.

BRIEF DESCRIPTION OF DRAWINGS

By way of example and to make the description more clear, reference is made to the accompanying drawings in which:

FIG. 19 is a block diagram of another node device illustrating the third embodiment according to the present invention;

FIG. 27 is a time chart illustrating the fifth embodiment according to the present invention.

DETAILED DESCRIPTION OF THE PREFERRED EMBODIMENTS (First Embodiment)

This embodiment discloses a network structure which utilizes optical signals having a plurality of wavelengths as a plurality of channels and a wavelength multi-transmission line as a multi-channel line.

Figure 7B:
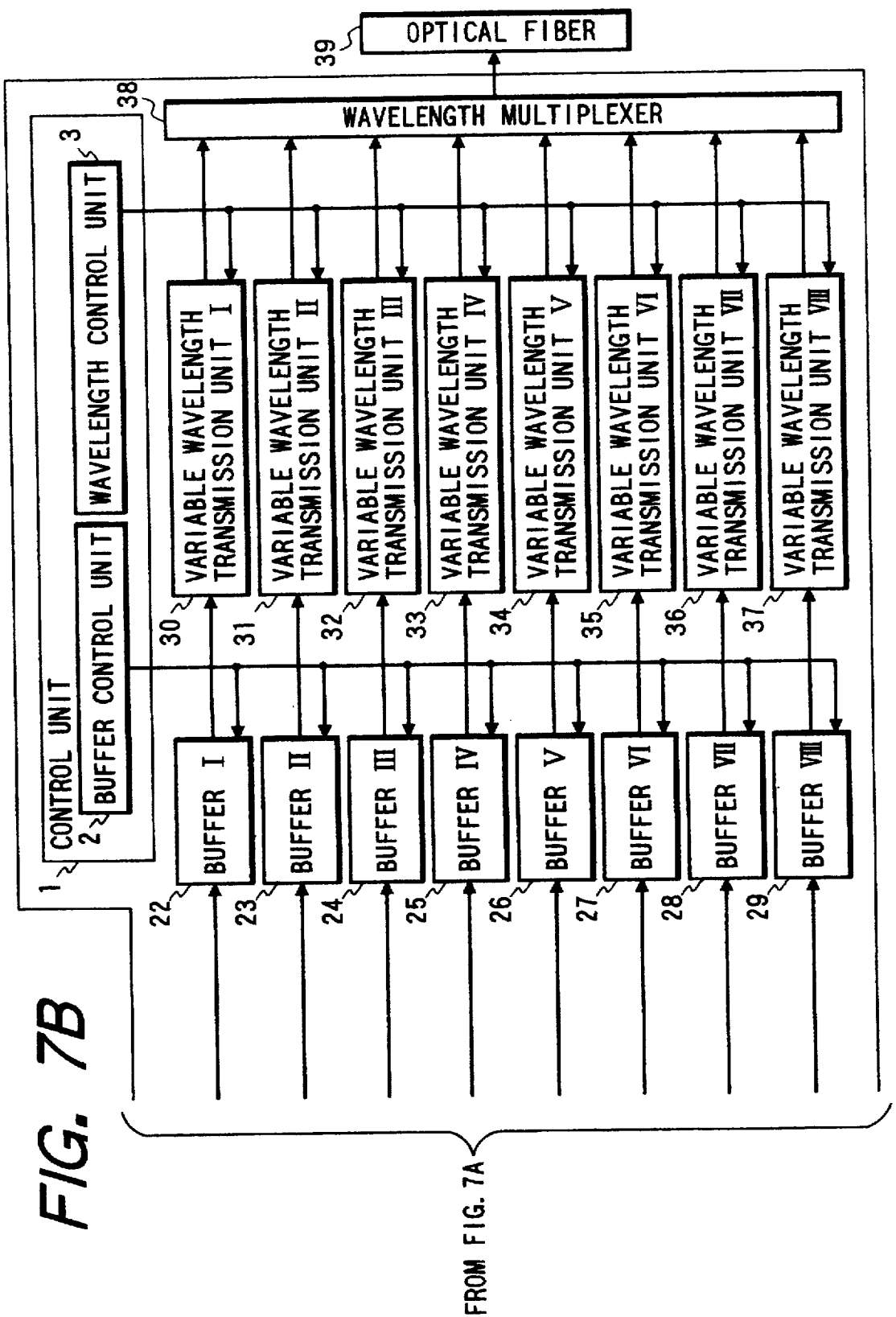
FIG. 7 is comprised of FIGS. 7A and 7B showing block diagrams of a node device illustrating a first embodiment according to the present invention.

FIGS. 7A and 7B are block diagrams of a node device illustrating a first embodiment according to the present invention, in which 8 subtransmission lines are connected with an optical wavelength multi-transmission line. Each of the subtransmission lines is coupled to a terminal equipment.

In FIGS. 7A and 7B, a control unit 1 of the node device includes. a buffer control unit 2 and a wavelength control unit 3. The buffer control unit 2 controls buffers so that, when a packet receiving terminal memorized in a buffer is connected to an adjacent node device, the packet can not be read out from the buffer until two wavelengths match up to each other; one is a wavelength received by a fixed wavelength reception unit from which the packet is output to a separation-insertion unit to which the receiving terminal equipment is connected via the adjacent node device, and the other is a transmission wavelength of a variable wavelength transmission unit from which the packet in the buffer is transmitted.

On the other hand, the wavelength control unit 3 controls transmission wavelengths of the variable wavelength transmission means in accordance with a predetermined transmission-wavelength control pattern described later.

An optical fiber 4 is used as an optical wavelength multi-transmission line and serves as a transmission line between a wavelength multiplexer in a node device adjacent to the upstream and a divider in its own node device. The divider 5 divides optical signals on the optical fiber so as to output them to 8 fixed wavelength reception units.

The fixed wavelength reception units I 6 to VIII 13 are photodiodes and serve as fixed wavelength reception means. The fixed wavelength reception units I 6 to VIII 13, the internal structure of which will be described later, each receive only a packet which is transmitted through one of optical signals having wavelengths $\lambda 1$ to $\lambda 8$.

The separation-insertion units I 14 to VIII 21 serve as separation-insertion means, each of which is operative to drop a packet out of a packet stream from the fixed wavelength reception unit and transmit it to a subtransmission line, while it is operative to add a packet from the subtransmission line to the packet stream from the fixed wavelength reception unit. The internal structure of the separation-insertion unit will be also described later.

The buffers I 22 to VIII 29 serve as buffer means to temporarily store the packets from the separation-insertion means, the internal structure of which will be also described later. The variable wavelength transmission units I 30 to VIII 37 are tunable laser diodes (TLDs) and serve as variable wavelength transmission means, which convert, under the control of the wavelength control unit, the packets from the buffers into optical signals each having a predetermined wavelength out of wavelengths $\lambda 1$ to $\lambda 8$ and send them through the wavelength multiplexer 38 to the optical wavelength multi-transmission line or the optical fiber 39, the internal structure of which will be also described later.

Each of the packets is processed only within a group, consisting of, for example, the fixed wavelength reception unit I 6, the separation-insertion unit I 14, the buffer I 22 and the variable wavelength transmission unit I 30 in the case the packet is received in the fixed wavelength reception unit I 6. Similarly, the fixed wavelength reception unit II 7, the separation-insertion unit II 15, the buffer II 23 and the variable wavelength transmission unit II 31 together form a group. The other fixed wavelength reception units, the separation-insertion units, the buffers and the variable wavelength transmission units form groups respectively as well.

The wavelength multiplexer 38 multiplexes the optical signals of wavelengths $\lambda 1$ to $\lambda 8$ which are sent from the 8 variable wavelength transmission units and applies them to the optical fiber 39. The optical fiber 39 is the optical wavelength multi-transmission line and serves as a transmission line between the wavelength multiplexer in its own node device and another wavelength multiplexer in a node device adjacent to the downstream.

The subtransmission lines I 40 to VIII 47 serve as packet transmission lines between the separation-insertion units and the terminals. The terminals I 48 to VIII 55 are connected to the subtransmission lines I 40 to VIII 47, respectively. Each of the terminals receives a packet output from the corresponding separation-insertion unit, while it generates a packet to be transmitted to other terminal and sends it through the subtransmission line to the separation-insertion unit.

Figure 8:
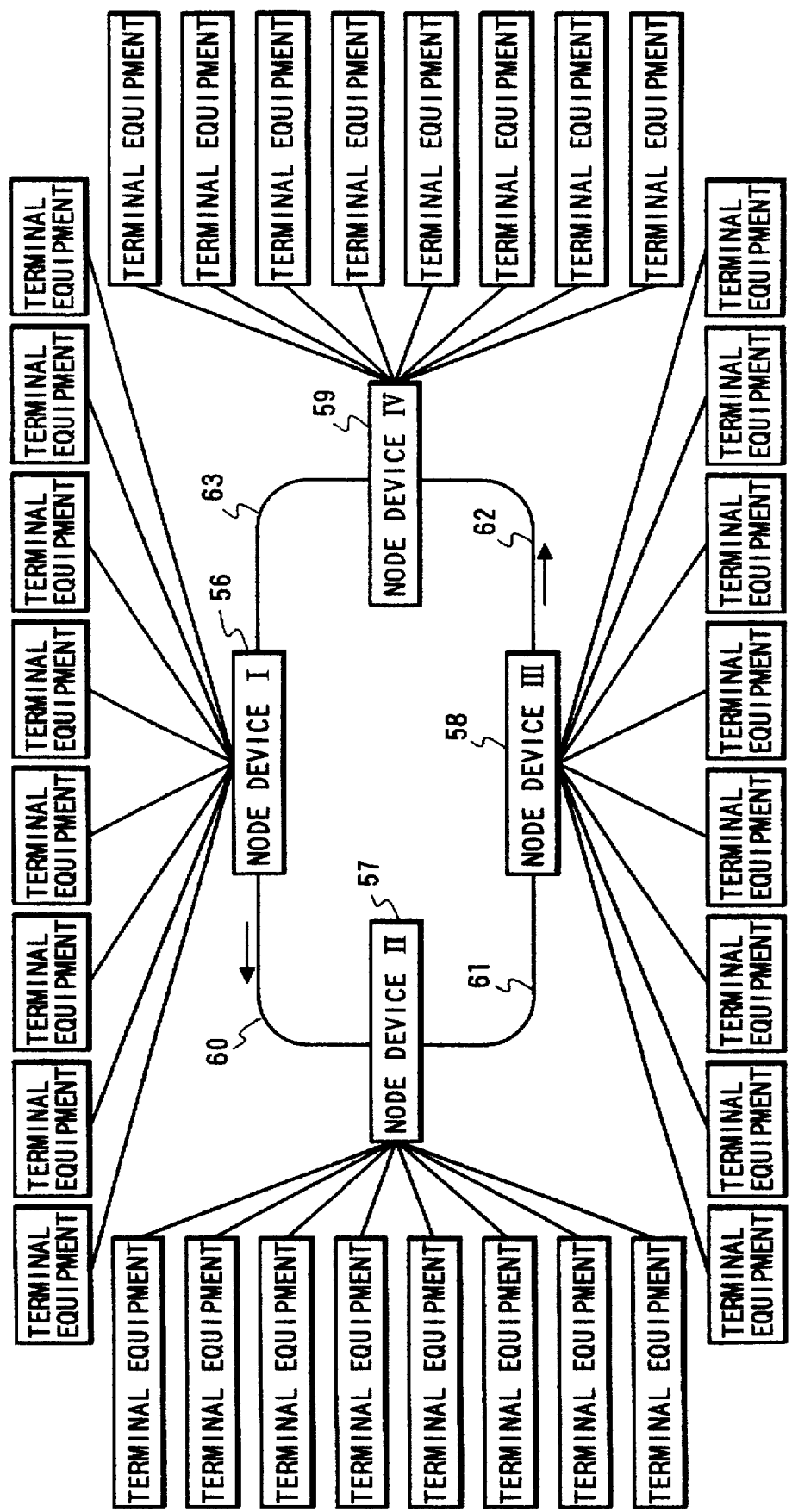
FIG. 8 is a schematic diagram of a network system illustrating the first embodiment according to the present invention.

FIG. 8 is a block diagram of a network system illustrating the first embodiment according to the present invention, in which four node devices of FIGS. 7A and 7B are connected by optical fibers. The node devices 56 to 59 shown in FIGS. 7A and 7B are respectively connected through 8 subtransmission lines with 8 terminals. The optical fibers 60 to 63 are each used as an optical wavelength multi-transmission line.

The optical fibers 60 to 63 correspond to the optical fibers 4 and 39 of FIGS. 7A and 7B as follows:

In the node device I 56, the optical fiber 4 of FIG. 7A corresponds to the optical fiber 63 of FIG. 8 and the optical fiber 39 of FIG. 7B corresponds to the optical fiber 60 of FIG. 8. Similarly, in the node device II 57, the optical fiber 4 of FIG. 7A corresponds to the optical fiber 60 of FIG. 8 and the optical fiber 39 of FIG. 7B corresponds to the optical fiber 61 of FIG. 8. As to the node devices III 58 and IV 59, the correspondences are found in the same manner.

Figure 9:
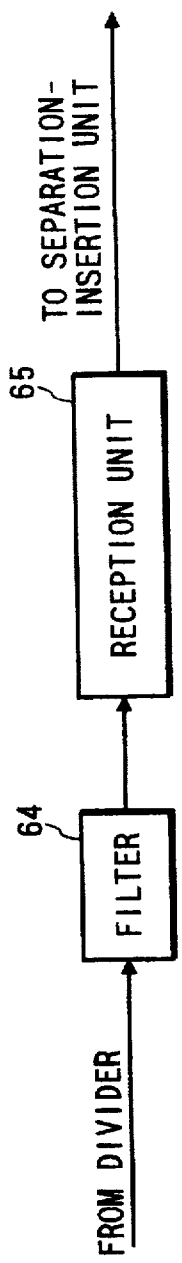
FIG. 9 is a block diagram of a fixed wavelength reception unit illustrating the first embodiment according to the present invention.

FIG. 9 shows an internal structure of one of the fixed wavelength reception units I 6 to VIII 13 which are utilized in the node device of the first embodiment according to the present invention.

In FIG. 9, a filter 64 transmits only an optical signal having a fixed wavelength assigned to each fixed wavelength reception unit, with optical signals of the other wavelengths cutting out. In other words, each of filters in each node device transmits a wavelength uniquely assigned to each of the fixed wavelength reception units; k1 to the fixed wavelength I 6, $\lambda 2$ to the II 7, $\lambda 3$ to the III 8, $\lambda 4$ to the IV 9, $\lambda 5$ to the V 10, $\lambda 6$ to the VI 11, $\lambda 7$ to the VII 12, and $\lambda 8$ to the VIII 13. The wavelengths $\lambda 1$ to $\lambda 8$ are numbered in ascending order, exhibiting the relation of $\lambda 1 < \lambda 2 < \lambda 3 < \lambda 4 < \lambda 5 < \lambda 6 < \lambda 7 < \lambda 8$.

A reception unit 65 is a photodiode for converting the optical signal, being transmitted through the filter 64 with the predetermined wavelength, into an electric signal and outputting it to the separation-insertion unit. This reception unit mounts thereon a pin photodiode (Pin-PD), the back stage of which is connected an amplifier, an equalizer and an identification circuit so that the optical signal can be wave shaped prior to output operation.

Figure 10:
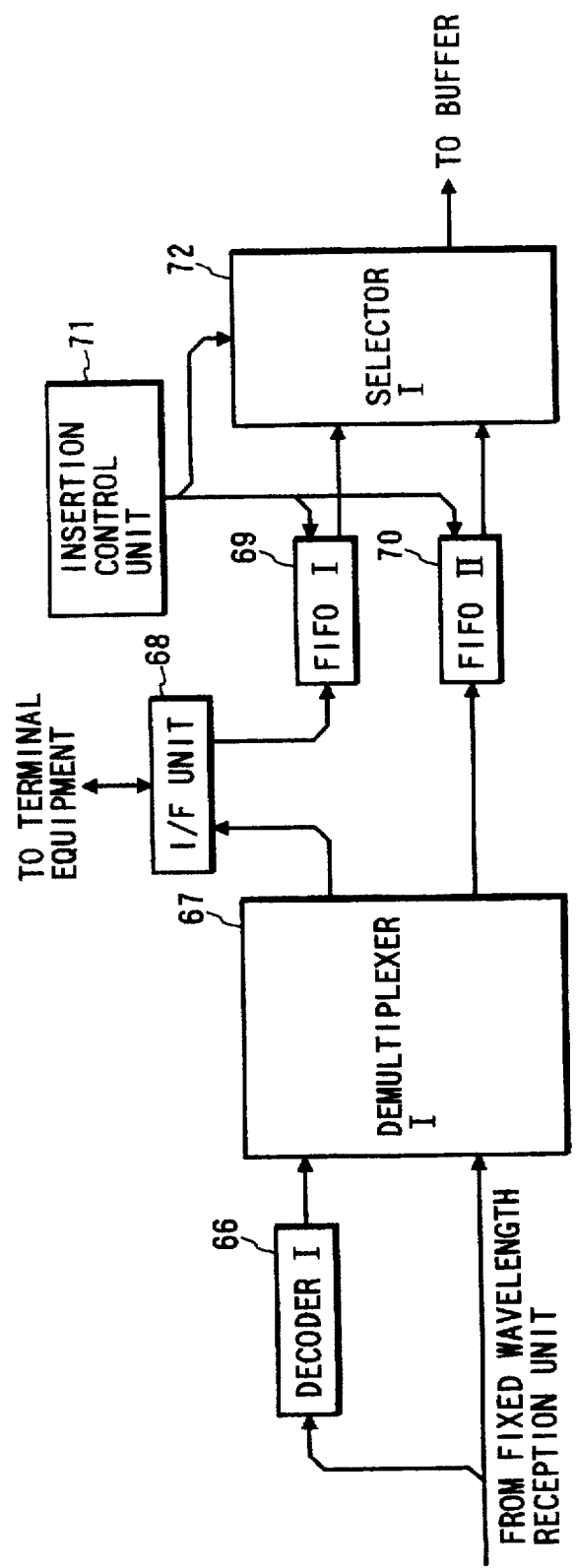
FIG. 10 is a block diagram of a separation-insertion unit illustrating the first embodiment according to the present invention.

FIG. 10 shows an internal structure of one of separation-insertion units I 14 to VIII 21 which are utilized in the node device of the first embodiment according to the present invention. The same internal structure is applied to all of the separation-insertion units and the description will be made with respect to only one unit.

In FIG. 10, a decoder I 66 reads out an address portion of an input packet and instructs a demultiplexer I 67 as to whether the packet should be output to the subtransmission line or not. The demultiplexer 67 outputs the input packet to an I/F unit 68 or a FIFO II 70 in accordance with instructions from the decoder I 66. The I/F unit 68 is operative to send the packet from the demultiplexer 67 to the subtransmission line and output the packet from the subtransmission line to a FIFO I 69.

The FIFOs (First In First Out) I 69 and II 70 temporarily store the input packets and output them to a selector I 72 in order of input in accordance with control instructions from an add control unit 71. The add control unit 71 controls reading operation of both the FIFO I 69 and FIFO II 70. The add control unit 71 also instructs the selector 72 as to which FIFO should be selected, so that the packet on the subtransmission line can be added to a packet stream from the fixed wavelength reception unit. The selector I 72 then selects the FIFO in accordance with instructions from a reading control unit, the FIFO storing the packet to be output.

Figure 5:
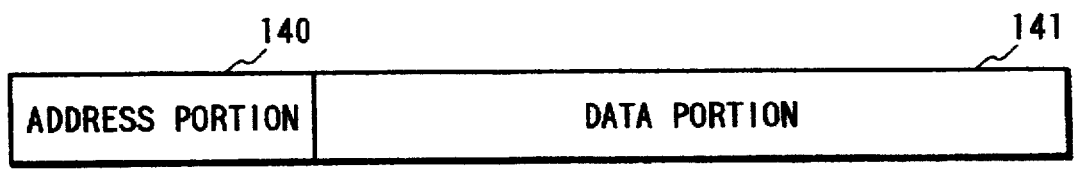
FIG. 5 is a diagram showing a structure of a packet.
Figure 4:
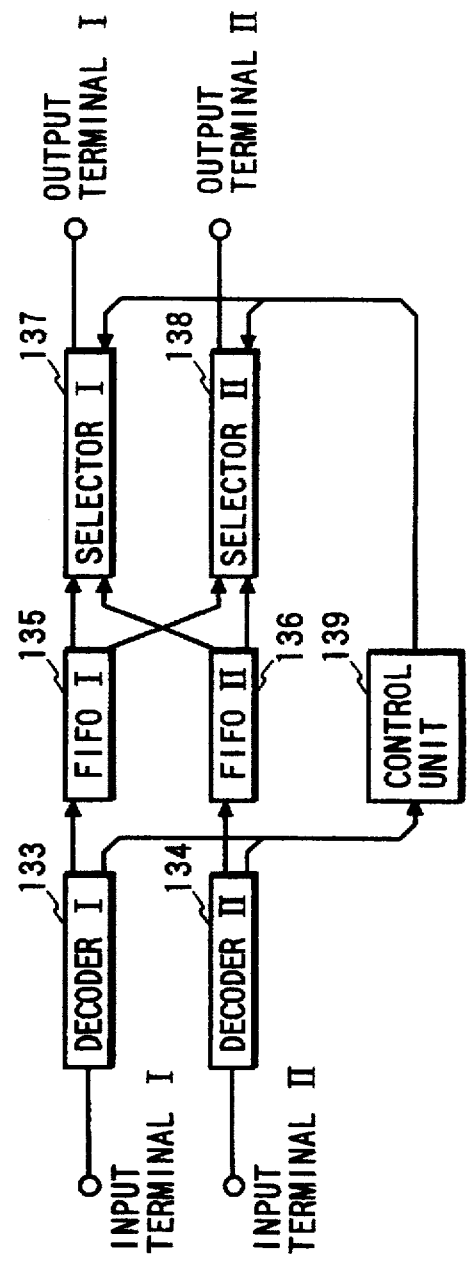
FIG. 4 is a block diagram of a 2×2 electric switch illustrating the first prior art.
Figure 6:
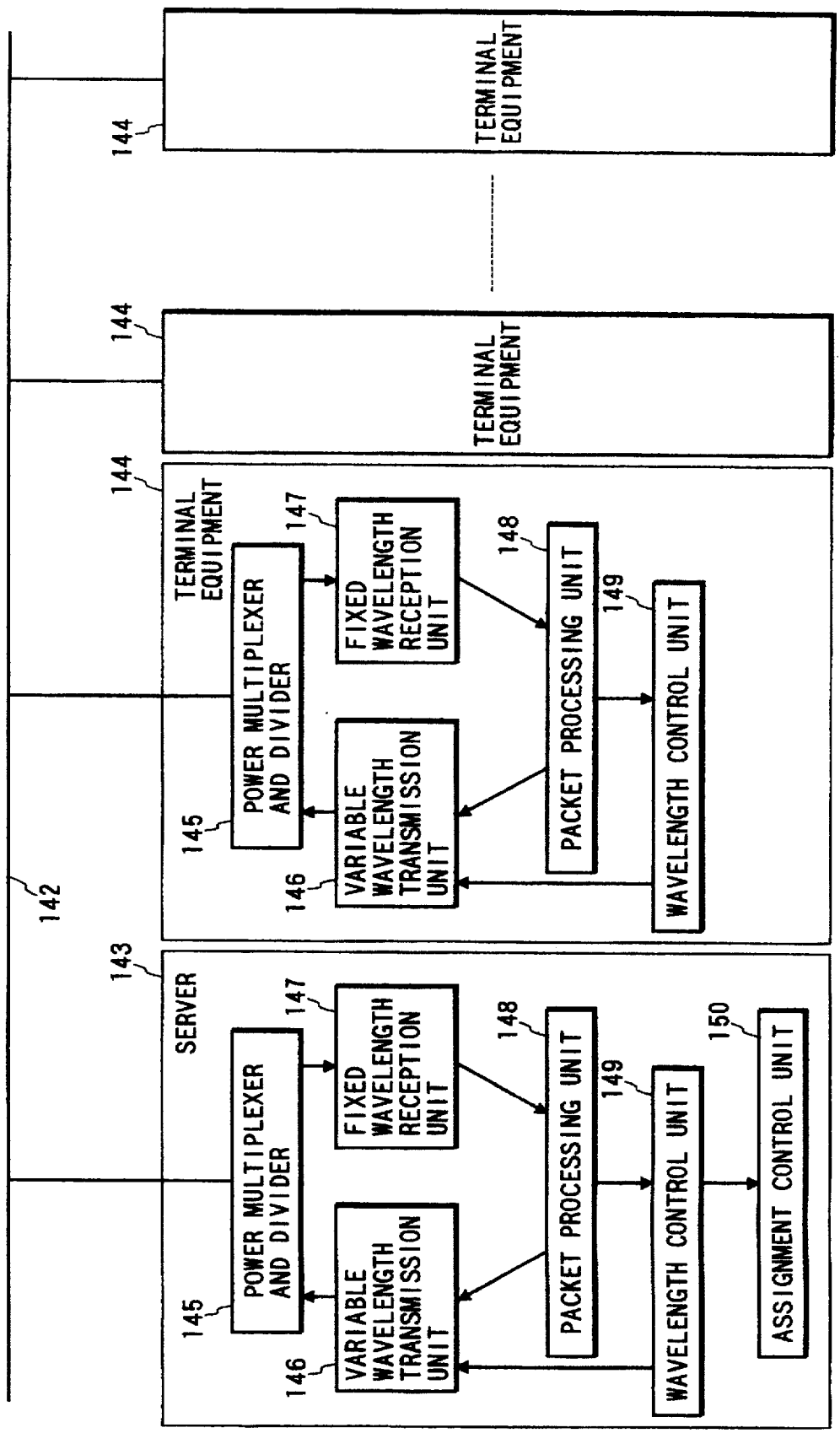
FIG. 6 is a block diagram of a network system illustrating a second prior art.

In this embodiment, the packet has the same structure as that of the prior art of FIG. 5.

Figure 11:
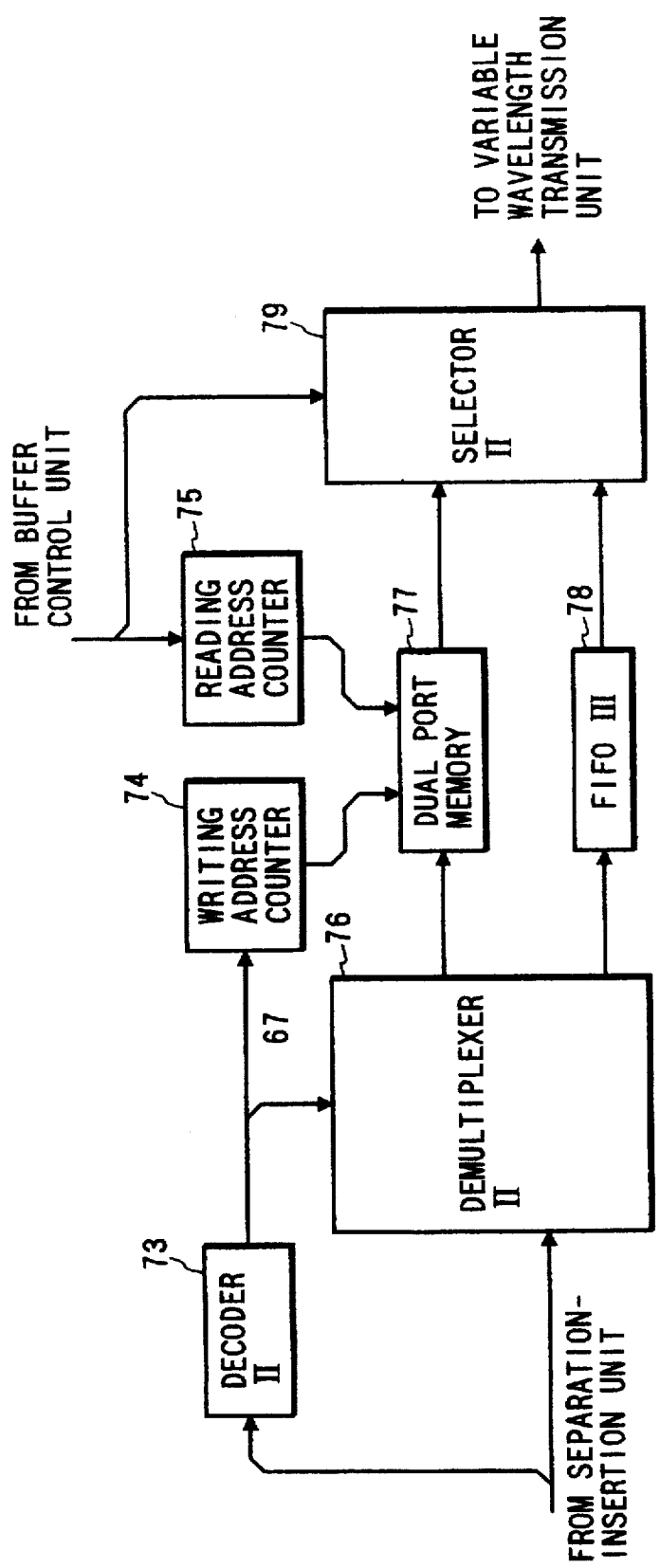
FIG. 11 is a block diagram of a buffer unit illustrating the first embodiment according to the present invention.

FIG. 11 shows an internal structure of one of buffers I 22 to VIII 29 which are utilized in the node device of the first embodiment according to the present invention. The same internal structure is applied to all of the buffers I 22 to VIII 29 and the description will be made with respect to only one buffer.

In FIG. 11, a decoder II 73 reads out an address portion of the packet to be input and determines whether or not a destination of the packet is a terminal equipment connected to the adjacent node device. If not, the decoder II 73 instructs a demultiplexer II 76 to set its output destination to a FIFO III 78. On the other hand, if it's the terminal equipment connected to the adjacent node device, the decoder II 73 instructs both the demultiplexer II 76 to set its destination to a dual port memory 77 and a writing address counter 74 to set a writing start address value to the dual port memory 77, the starting address being written in the packet in accordance with a wavelength to be received by a fixed wavelength reception means from which the packet is output to a separation-insertion means in the adjacent node device to which the destination reception terminal is connected.

The writing address counter 74 starts with the writing start address value, which is output from the decoder II 73, and outputs address signals for writing the packet in the dual port memory 77 in due order. Similarly, a reading address counter 75 starts with an offset value as a reading start address, which is output from the buffer control unit, and outputs address signals for reading the packet from the dual port memory 77 in due order.

The demultiplexer II 76 outputs the input packet either the dual port memory 77 or the FIFO III 78 in accordance with instructions from the decoder II 73. The dual port memory 77 is operative to perform reading and writing of packet data individually.

Figure 12:
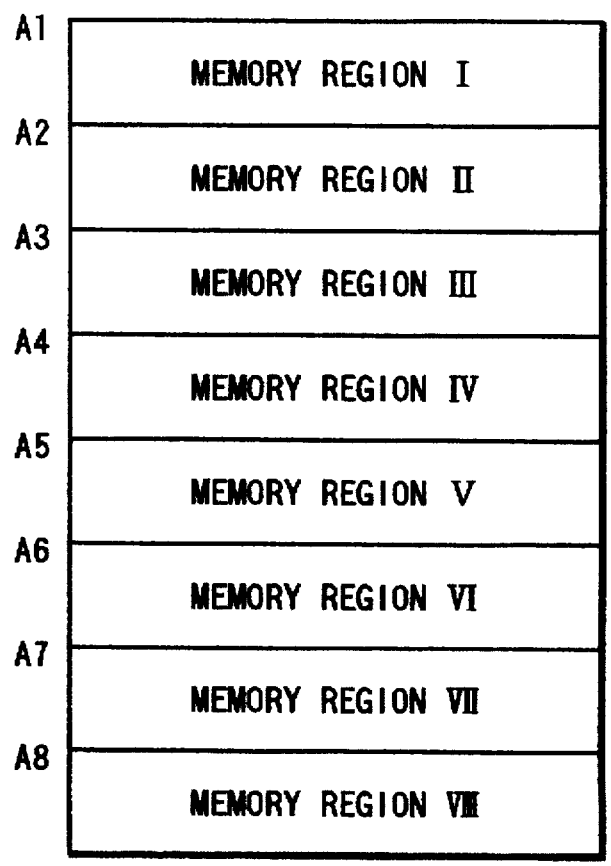
FIG. 12 is a diagram of a memory map of a dual port memory illustrating the first embodiment according to the present invention.

Memory region of the dual port memory 77, as shown in a memory map of FIG. 12, is divided into 8 regions; memory regions I to VIII, in accordance with wavelengths for transmitting packets, each of which corresponds to each channel, i.e., either of transmission wavelengths λ1 to λ8. A start of address in each region is A1, A2, A3, A4, A5, A6, A7 or A8.

Then, the FIFO (First In First Out) III 78 temporarily stores packets to be input thereto and outputs them to a selector II 79 in order of input under the control of the reading control unit. The selector II 79 selects, in accordance with instructions from the buffer control unit, either of outputs; one is from the dual port memory 77 and the other is from the FIFO III 78, and outputs it to the variable wavelength transmission unit.

Figure 13:
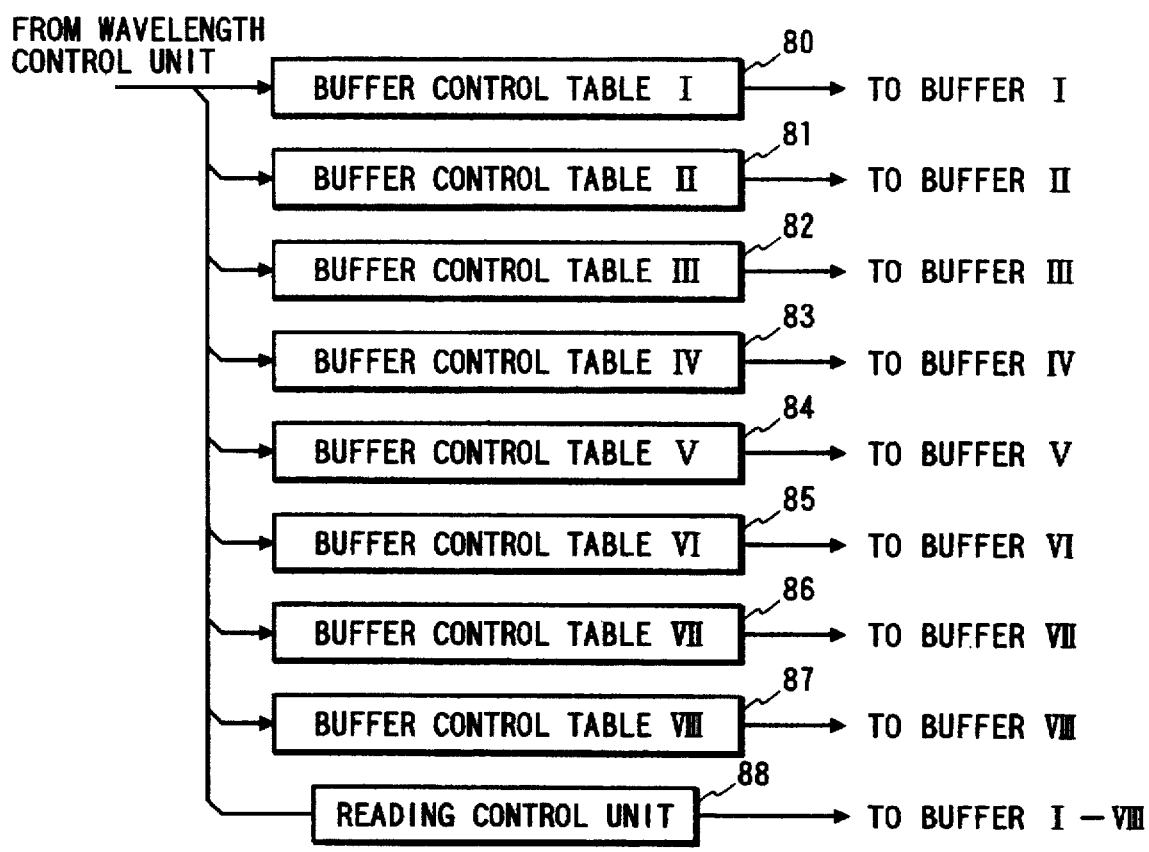
FIG. 13 is a block diagram of a buffer control unit illustrating the first embodiment according to the present invention.

FIG. 13 shows an internal structure of the buffer control unit which is utilized in the first embodiment according to the present invention. In FIG. 13, buffer control tables I 80 to VIII 87 are read out in order in response to the address value which is output from the wavelength control unit. Then, predetermined offset values of the buffer control tables are respectively output to address counters 75 in the buffers I 22 to VIII 29. These tables are incorporated in a read-only memory (ROM). The contents of the buffer control tables I 80 to VIII 87 will be described later.

The reading control unit 88 counts clock signals which are output from the wavelength control unit so that reading control signal can be output to the buffers I 22 to VIII 29, which reads out both the dual port memory 77 and the FIFO III 78 under control.

Figure 14:
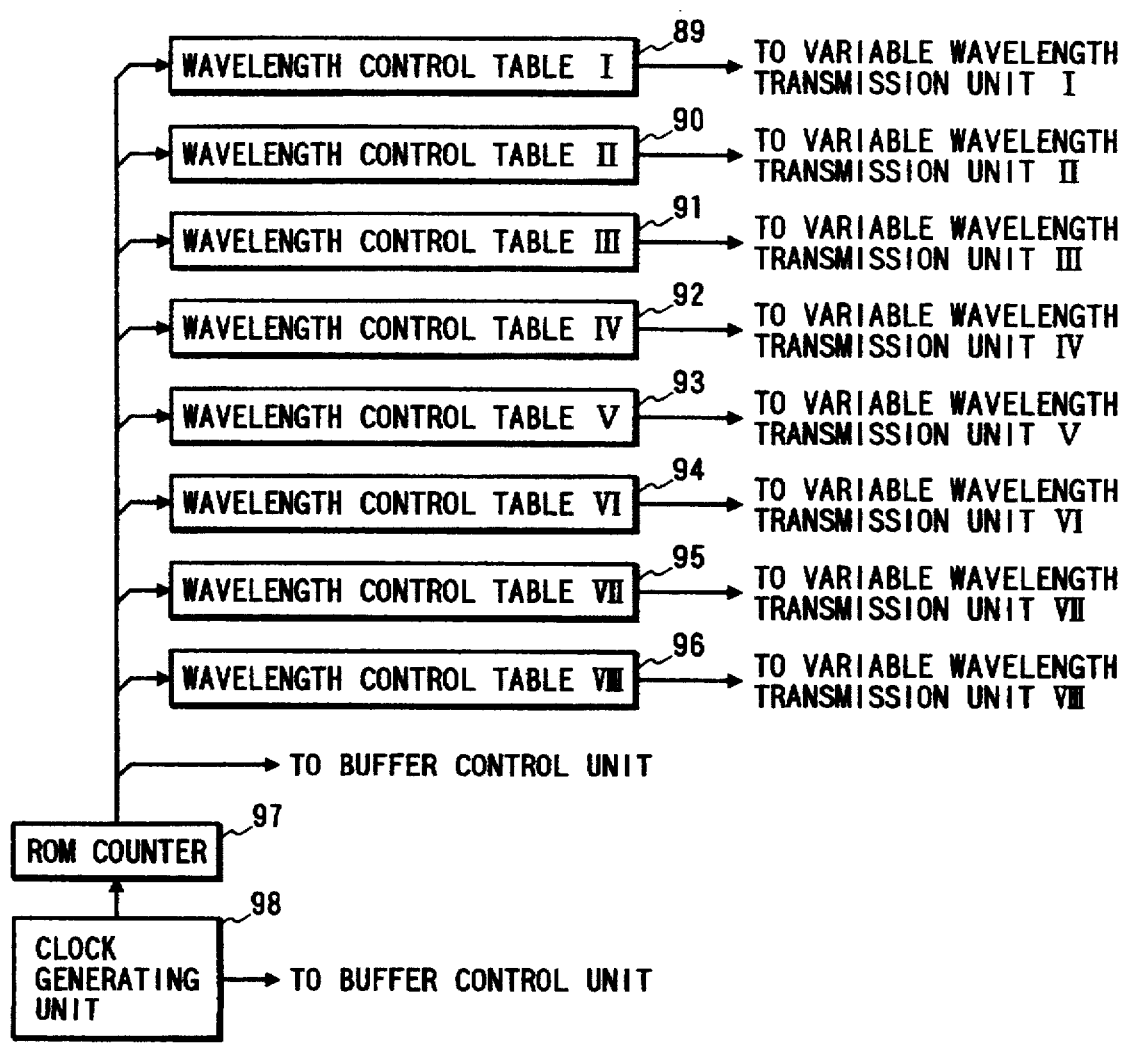
FIG. 14 is a block diagram of a wavelength control unit illustrating the first embodiment according to the present invention.

FIG. 14 shows an internal structure of the wavelength control unit which is utilized in the first embodiment according to the present invention. In FIG. 14, wavelength control tables I 89 to VIII 96 are read out in order in response to the address value which is output from a 3-bit ROM counter. Then, predetermined wavelength control signals are respectively output to respective drive units in the variable wavelength transmission units. These tables are also incorporated in the read-only memory (ROM). The contents of the wavelength control tables I 89 to VIII 96 will be also described later.

Then, the clock generating unit 98 generates and sends a predetermined clock signal to the buffer control unit, while it devides and outputs the clock signal to the ROM counter.

Figure 15:
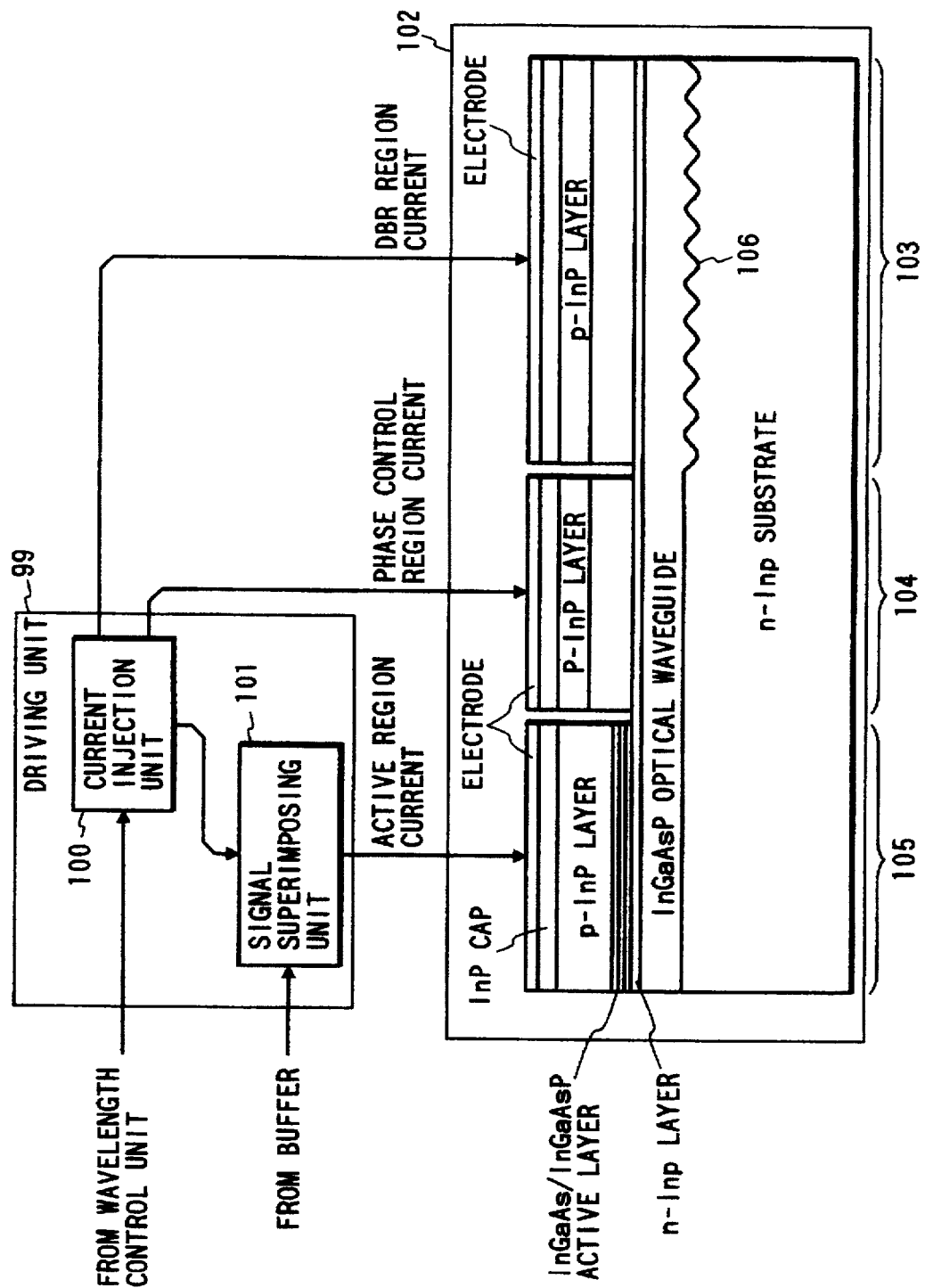
FIG. 15 is a block diagram of a variable wavelength transmission unit illustrating the first embodiment according to the present invention.

FIG. 15 shows an internal structure of one of variable wavelength transmission units I 30 to VIII 37 which are utilized in the node device of the first embodiment according to the present invention. The same internal structure is applied to all of the variable wavelength transmission units I 30 to VIII 37 and the description will be made with respect to only one unit.

In FIG. 15, a drive unit 99 includes a signal superimposing unit 101 and a current injection unit 100 therein. The current injection unit 100 controls bias current values to be respectively injected into three regions of a DBR-type tunable laser diode (TLD); emission region, phase control region and DBR region, in response to the wavelength control signal which is output from the wavelength control unit so as to control the transmission wavelengths λ1 to λ8. The signal superimposing unit 101 superimposes an electric signal from the buffer on the bias current from the current injection unit 100 so that the optical signal, to which intensity modulation has been made in accordance with a predetermined wavelength, can be sent from the DBR-type tunable laser diode (TLD).

The DBR region 103 varies its refractive index in accordance with an amount of injected carrier so that the transmission wavelength can be varied. The phase control region 104 matches the DBR region to the emission region in phase of transmission wavelength. The emission region 105 is an active region for laser oscillation. Then, represented by numeral 106 is a diffraction grating which unifies wavelengths to be transmitted.

In the first embodiment, the contents of the wavelength control tables I 89 to VIII 96 mentioned above are set as shown in Table 1 below. The table 1 shows the wavelengths transmitted from the variable wavelength transmission units under the control of the wavelength control units. Further, the offset values of the buffer control tables I 80 to VIII 87 are set as shown in Table 2.

TABLE 1

| Table Name | Address | | | | | | | |
|---|---|---|---|---|---|---|---|---|
| | 0 | 1 | 2 | 3 | 4 | 5 | 6 | 7 |
| Wavelength Control Table I | λ1 | λ3 | λ5 | λ7 | λ8 | λ6 | λ4 | λ2 |
| Wavelength Control Table II | λ2 | λ1 | λ3 | λ5 | λ7 | λ8 | λ6 | λ4 |
| Wavelength Control Table III | λ4 | λ2 | λ1 | λ3 | λ5 | λ7 | λ8 | λ6 |
| Wavelength Control Table IV | λ6 | λ4 | λ2 | λ1 | λ3 | λ5 | λ7 | λ8 |
| Wavelength Control Table V | λ8 | λ6 | λ4 | λ2 | λ1 | λ3 | λ5 | λ7 |
| Wavelength Control Table VI | λ7 | λ8 | λ6 | λ4 | λ2 | λ1 | λ3 | λ5 |
| Wavelength Control Table VII | λ5 | λ7 | λ8 | λ6 | λ4 | λ2 | λ1 | λ3 |
| Wavelength Control Table VIII | λ3 | λ5 | λ7 | λ8 | λ6 | λ4 | λ2 | λ1 |

TABLE 2

| Table Name | Address | | | | | | | |
|---|---|---|---|---|---|---|---|---|
| | 0 | 1 | 2 | 3 | 4 | 5 | 6 | 7 |
| Buffer Control Table I | A1 | A3 | A5 | A7 | A8 | A6 | A4 | A2 |
| Buffer Control Table II | A2 | A1 | A3 | A5 | A7 | A8 | A6 | A4 |
| Buffer Control Table III | A4 | A2 | A1 | A3 | A5 | A7 | A8 | A6 |
| Buffer Control Table IV | A6 | A4 | A2 | A1 | A3 | A5 | A7 | A8 |
| Buffer Control Table V | A8 | A6 | A4 | A2 | A1 | A3 | A5 | A7 |
| Buffer Control Table VI | A7 | A8 | A6 | A4 | A2 | A1 | A3 | A5 |
| Buffer Control Table VII | A5 | A7 | A8 | A6 | A4 | A2 | A1 | A3 |
| Buffer Control Table VIII | A3 | A5 | A7 | A8 | A6 | A4 | A2 | A1 |

These 16 numbered tables are all read out in synchronism with the ROM counter 97. Accordingly, the transmission wavelength of each tunable laser diode (TLD) is shifted in a cycle of λ1, λ3, λ5, λ7, λ8, λ6, λ4, λ2, and λ1. By shifting the wavelength alternately such above, the greatest value of variance rate of the wavelength can be reduced during alteration of the wavelength. If not be done such above, for example, when starting from λ1 and shifting to λ2, λ3, λ4, λ5, λ6, λ7 and λ8 in this order, the variance rate of the wavelength becomes extremely large during shifting λ8 to λ1 and this loads the device heavily, decreasing the lifetime and the control reliability of the device. On the contrary, such a cycle that the transmission wavelength is shifted alternately can prevent occurrence of a big change in wavelength. Further, as shown in Table 1, the shift cycle of the transmission wavelength is set among the wavelength control tables to be out of phase so that the plurality of the tunable laser diodes (TLDs) can each perform the transmission with an individual wavelength. As discussed above, the transmission wavelength control pattern is determined in accordance with the wavelength control tables I 89 to VIII 96.

Turning now to Tables 1 and 2, the case of the variable wavelength transmission unit having the transmission wavelength λ1 indicates that its offset value for read-out of the buffer's dual port memory is A1 to be assigned to the memory region I. The other cases of λ2, λ3, λ4, λ5, λ6, λ7 and λ8 in turn take the offset values respectively assigned to the memory regions II, III, IV, V, VI, VII and VIII.

In addition, the memory regions I to VIII in the buffer shown in FIG. 11 correspond to the wavelengths to be received by the fixed wavelength reception unit from which the packet is output to the separation-insertion unit adjacent to the node device to which the receiving terminal was connected. Since the wavelength control tables and the buffer control tables are set respectively as shown in Tables 1 and 2, the packet data stored in each buffer is read out from the buffer under control in synchronism with the wavelength to be received by the fixed wavelength reception unit from which the packet is output to the separation-insertion unit adjacent to the node device to which the accepting terminal was connected.

Now, a description will be made as to an operation of the first embodiment according to the present invention with reference to the block diagrams of FIGS. 7A through 15, and a time chart of FIG. 16. The description will be made with respect to a packet transmission utilizing the terminal I 48 as the transmitting terminal connected to the node device I 56 through the subtransmission line I 40 and the terminal V 52 as the receiving terminal connected to the node device III 58 through the subtransmission line V 44. Hereinafter, the packet to be transmitted is called as packet A. Also, like elements in different node devices are represented by identical reference numerals for convenience sake.

The operation of the node device according to the first embodiment is composed of 8 continuous operation periods T1, T2, T3, T4, T5, T6, T7 and T8. The 8 operation periods are each divided into a period Td for reading the dual port memory 77 and a period Tf for reading the FIFO III 78 in accordance with the buffer operation. In this embodiment, the operation periods T1 through T8 all take a constant period of time.

The transmitting terminal equipment I 48 connected to the node device I 56 through the subtransmission line I 40 composes the packet A from both the data portion to be transmitted to the receiving terminal equipment V 52 connected to the node device III 58 through the subtransmission line V 44, and the address portion to exhibit the address of the accepting terminal V 52, as shown in FIG. 5.

The transmitting terminal equipment I 48 then transmits the packet A through the subtransmission line I 40 to the separation-insertion unit in the node device I 56. The I/F unit 68 in the separation-insertion unit I 14 of the node device I 56 receives the packet A from the subtransmission line I 40 and writes it in the FIFO I 69. After writing in the FIFO I 69, the separation-insertion unit finds a break in the packet stream while reading it out from the FIFO II 70, stops reading from the FIFO II 70 and starts reading from the FIFO I 69 instead so that the packet from the FIFO I 69 can be output from the selector.

After the end operation of reading the packet A from the FIFO I 69, the separation-insertion unit stops reading from the FIFO I 69 and starts again reading from the FIFO II 70 so that the packet from the FIFO II 70 can be output again from the selector. The packet A from the selector is then input to the buffer I 22.

In the buffer I 22, the decoder II 73 reads the address portion of the input packet A. In this case, since the destination terminal equipment for receipt of the packet A is not a terminal equipment connected to the adjacent node device I 1, the node device I 56 treats the packet as being a packet which does not assign a channel (i.e., wavelength) for transmission, and the decoder II 73 sets such that the demultiplexer II 76 outputs to the FIFO III 78. At the moment, assuming that the packet A is written in the operation period T8, it will be read out under the control of the buffer control unit 2 during the reading period Tf for the FIFO III 78 of the next operation period T1.

In the next operation period T1, the ROM counter 97 in the wavelength control unit 3 outputs "0" as a reading address value to the wavelength control tables I 89 through VIII 96 at the same time so that the contents of the wavelength control table can be read out in accordance with the value.

In this case, the control signal to be read out from the wavelength control table I 89 corresponds to the wavelength λ1 as shown in Table 1. ther wavelength control tables II 90, III 91, IV 92, V 93, VI 94, VII 95 and VIII 96 take the control signals corresponding to the wavelengths λ2, λ4, λ6, λ8, λ7, λ5 and λ3, respectively. These control signals are input to the drive units 99 in the variable wavelength transmission unit I 30 through the variable wavelength transmission unit VIII 37, respectively. In each drive unit 99, a current to be injected by the current injection unit is determined in accordance with the above wavelength control signal so that the transmission wavelength in the tunable laser diode (TLD) can be set to be a desired wavelength.

During the reading period Td in the dual port memory of the same operation period T1, the reading address value "0" from the ROM counter 97 in the wavelength control unit 3 is input to the buffer control tables I 80 through VIII 87 in the buffer control unit 2. The contents of these buffer control tables are then read out in accordance with this address value.

In this case, the offset value to be read out from the buffer control table I 80, as shown in Table 2, is A1 corresponding to the memory region I. Similarly, the other buffer control tables II 81, III 82, IV 83, V 84, VI 85, VII 86 and VIII 87 take the offset values A2, A4, A6, A8, A7, A5 and A3 respectively corresponding to the memory regions II, IV, VI, VIII, VII, V and III. These offset values are output to the address counters 75 in the buffer I 22 through the buffer VIII 29, respectively.

Further, the reading control unit 88 in the buffer control unit 2 outputs control signals in response to clock signals from the wavelength control unit 3, such as to permit reading in the dual port memory 77, inhibit reading for the FIFO III 78 and set the input of the dual port memory to be output from the selector. In accordance with these control signals, the reading address counter 75 in the buffer I 22 starts loading with the offset value A1 from the buffer control table I 80 to count up by an increment in due order. The counter thus generates an address for reading the packet written in the memory region I and output it to the dual port memory 77. The reading address causes the dual port memory 77 to read out and output the packet from the output port thereof to the variable wavelength transmission unit I 30 in due order. It will be understood that the packet to be read out at the moment is destinated to the terminal equipment I 48 connected to the adjacent node device II 57 through the subtransmission line I 40 because its transmission wavelength is λ1.

During the period Td for reading the dual port memory of the same operation period T1, the offset value A2 is simultaneously loaded from the buffer control table II 81 to the reading address counter 75 in the buffer II 23, so that the packet, which is written in the memory region II so as to be transmitted to the terminal equipment II 49 connected to the adjacent node device II 57 through the subtransmission line II 41, is read out from the dual port memory 77 and output to the variable wavelength transmission unit II 31 in the same manner as that of the buffer I 22.

Similarly, the packets are read out from the memory regions IV, VI, VIII, VII, V and III in the buffers III 24, IV 25, V 26, VI 27, VII 28 and VIII 29 and output to the variable wavelength transmission unit III 32 through the variable wavelength transmission unit VIII 37, respectively. At the moment, the packets to be read out during the reading period Td are destinated to the terminals equipments connected to the adjacent node device II 57 through the subtransmission lines I 40 to VIII 47, respectively.

Subsequently, during the reading period Tf in the FIFO 78 of the operation period T1, the reading control unit in the buffer-control unit 2 outputs the control signals in response to the clock signals from the wavelength control unit 3, such as to inhibit reading in the dual port memory 77, permit reading in the FIFO III 78 and set the output of the FIFO III 78 to be output from the selector. In accordance with these control signals, the packets in the FIFO III 78 is read out and output to the variable wavelength transmission unit I 30 through the selector 79. At this time, the packet A written in the FIFO III 78 is read out. The packet A is a packet in which a wavelength for transmission is not assigned, i.e., the destination terminal equipment is not a terminal equipment connected to the adjacent node device in the downstream.

Similarly, as to the buffers II 23 to VIII 29, the packets in the FIFO III 78 are read out in due order and output to the variable wavelength transmission unit I 30 through the variable wavelength transmission unit VIII 37, respectively.

The variable wavelength transmission units I 30 to VIII 37 change wavelengths of the packets to ones having predetermined wavelengths in accordance with the wavelength control signals respectively output from the buffers I 22 to VIII 29 so as to apply them to the wavelength multiplexer 38. At this time, the wavelengths of the applied optical signals, as described above, are λ1, λ2, λ4, λ6, λ8, λ7, λ5 and λ3 respectively in the variable wavelength transmission units I 30, II 31, III 32, IV 33, V 34, VI 35, VII 36 and VIII 37.

As such above, the optical signals applied from the 8 numbered variable wavelength transmission units are different in wavelength from each other so that all of the optical signals can be mixed in the wavelength multiplexer 38 without interacting each other. The optical signals are then incident on the optical fiber 39 and transmitted to the node device II 57 adjacent to the downstream. The packet A is thus sent from the terminal equipment I 48 connecting to the node device I 56 through the subtransmission line I 40, to the terminal equipment V 52 connected to the node device III 58 through the subtransmission line V 44, so that it can be transmitted as the optical signal having the wavelength λ1 to the node device II 57 as discussed above.

After that, the node device II 57 performs the following relay transmission processing with respect to the packet A which was transmitted as the optical signal having the wavelength λ1.

The optical signals having the wavelengths λ1 to X8 and transmitted from the node device I 56 through the optical fiber 60 are divided by the divider 5 and incident on the fixed wavelength reception unit I 6 to the fixed wavelength reception unit VIII 13, respectively. In the fixed wavelength reception unit I 6, only the optical signal having k1 is transmitted through the filter 64 and received by the photodiode (PD). In this case, since the packet A was sent from the node device I 56 as the optical signal having the wavelength λ1, it is received by the fixed wavelength reception unit I 6 and then output to the separation-insertion unit I 14.

The decoder I 66 in the separation-insertion unit I 14 reads the address portion of the input packet A. The packet A, however, is destinationed to the receiving terminal equipment connected to which the adjacent node device III 58 but not to the terminal equipment to the separation-insertion unit I 14, so that the decoder 66 sets the output destination of its demultiplexer 67 to the FIFO II 70. The packet A is thus written in the FIFO II 70, read out under the control of the add control unit 71 and output through the selector 72 to the buffer I 22.

Then, the decoder 73 in the buffer I 22 reads the address portion of the packet A again. The packet is destinationed to the receiving terminal equipment V 52 connected to the adjacent node device III 58, so that the decoder 73 sets the output destination of the demultiplexer 76 to the dual port memory 77, simultaneously outputting the offset value A5 as a writing start address value to the writing address counter 74. The writing address counter 74 loads the writing start address and count up by an increment in due order so as to generate a writing address of the input packet A and output it to the dual port memory 77. The packet A has been already input to the input port of the dual port memory 77 through the demultiplexer 76, so that the packet A is written in the memory region V in accordance with the address from the address counter 74 in due order.

Assuming that the packet A is written in the dual port memory 77 in the operation period T1, prior to reading from the dual port memory 77, the packet A will be controlled to wait for the coming operation period T3 in which the transmission wavelength of the variable wavelength transmission unit I 30 in the node device II 57 corresponds to the wavelength λ5 received by the fixed wavelength reception unit V 10 for outputting the packet to the separation-insertion unit V 18 to which the destination receiving terminal equipment was connected in the adjacent node device III 58.

In the operation period T2 subsequent to the operation period T1, the period T1 during which the packet A was written in the dual port memory 77 in the node device II 57, the ROM counter 97 in the wavelength control unit 3 outputs "1" as a reading address value to the wavelength control tables I 89 through VIII 96 at the same time. This address value is used to read out the contents of the wavelength control table.

At this time, the control signal to be read out from the wavelength control table I 89 corresponds to the wavelength λ3 as shown in Table 1. Similarly, the other wavelength control tables II 90, III 91, IV 92, V 93, VI 94, VII 95 and VIII 96 take the control signals corresponding to the wavelengths λ1, λ2, λ4, λ6, λ8, λ7 and λ5, respectively. These control signals are input to the drive units 99 in the variable wavelength transmission unit I 30 through the variable wavelength transmission unit VIII 37, respectively. Accordingly, the channels or wavelengths to be transmitted from the variable transmission units I 30 to VIII 37 are altered such that they are transmitted in synchronism with each other but an identical wavelength is not sent to two or more variable wavelength transmission units.

As similar to that of the operation period T1, the reading address value "1", which is output from the ROM counter 97 in the wavelength control unit 3 during the operation period T2, is input to the buffer control tables in the buffer control unit 3. Further, the control signals are composed in the reading control unit 88 in response to the clock signals from the wavelength control unit 3. In accordance with these control signals, the packets are read out from the dual port memories 77 and the FIFOs III 78 in the buffers I 22 to VIII 29. At this time, the dual port memory 77 in the buffer I 22 is read out from its memory region III as shown in Table 2. As to the other buffers II 23, III 24, IV 25, V 26, VI 27, VII 28 and VIII 29, the packets are read out from the memory regions I, II, IV, VI, VIII, VII and V, respectively.

As such above, the packets are read out, converted into the predetermined optical signals mentioned above and transmitted through the wavelength multiplexer 38 to the optical fiber.

In this case, the packet A has been written in the memory region V of the dual port memory 77 in the buffer I 22, so that it is read out from the dual port memory during the reading period Td of the coming operation period T3.

In the operation period T3, the ROM counter 97 in the wavelength control unit 3 outputs "2" as a reading address value to the wavelength control tables I 89 through VIII 96, respectively. The contents of the wavelength control table are read out in accordance with this address. At this time, the transmission wavelength is set to λ5 with respect to the variable wavelength transmission unit I 30. Similarly, the address value "2" is output to the buffer control unit 2 and read out from the buffer control tables. At this time, the region to be read out from the dual port memory in the buffer I 22 is set to the memory region V.

Then, the other buffers are read out under the control of the corresponding control signals, converted into the predetermined optical signals in the variable wavelength transmission units and sent through the wavelength multiplexer 38 to the optical fiber as described above. In other words, the packet A is read out from the dual port memory during the reading period Td of the operation period T3, sent as an optical signal from the variable I wavelength transmission unit I 30 to the optical fiber through the wavelength multiplexer 38 and incident on the node device III 58.

The optical signals having the wavelengths λ1 to λ8 and transmitted from the node device II 57 through the optical fiber 61 are divided by the divider 5 in the node device III 58 and incident on the fixed wavelength reception units I 6 through VIII 13. In the fixed wavelength reception unit V 10, only the optical signal having the wavelength λ5 can be transmitted through the filter 64 and received by the photodiode (PD). Since the packet A was sent from the node device II 57 as the optical signal with the wavelength λ5, it is received by the fixed wavelength reception unit V 10. Then, the packet A is output from the fixed wavelength reception unit V 10 to the separation-insertion unit V 18.

The decoder I 66 in the separation-insertion unit V 18 reads out the address portion of the input packet A. In this case, the packet A is destinationed to the accepting terminal connected to the its own separation-insertion unit V 18, so that the decoder I 66 will set the output destination of the demultiplexer I 67 to the I/F unit 68. The packet A is thus output through the demultiplexer I 67 to the I/F unit 68 and received by the destination accepting (receiving) terminal equipment V 52 through the subtransmission line V 44. Finally, a desired processing is performed by extracting only the data portion after removing the address portion of the packet therefrom.

As described such above, the packet A has been transmitted from the transmitting terminal equipment I 48 connected to the node device I 56 through the subtransmission line I 40 to the accepting terminal equipment V 52 connected to the node device III 58 through the subtransmission line V 44.

In brief, the packet A was sent with either of wavelengths corresponding to the timings when it was input to the node device I 56, as is λ1 in the above description. Then, it was converted by the node device II 57 into the optical signal having the wavelength λ5 to be received by the fixed wavelength reception unit V 10 for outputting the packet to the separation-insertion unit V 18 to which the accepting terminal was connected via the node device III 58. The packet A was received in the fixed wavelength reception unit V 10 in the node device III 58, separated in the separation-insertion unit V 18 and finally received by the terminal via the subtransmission line V 44.

(Second Embodiment)

Figure 17:
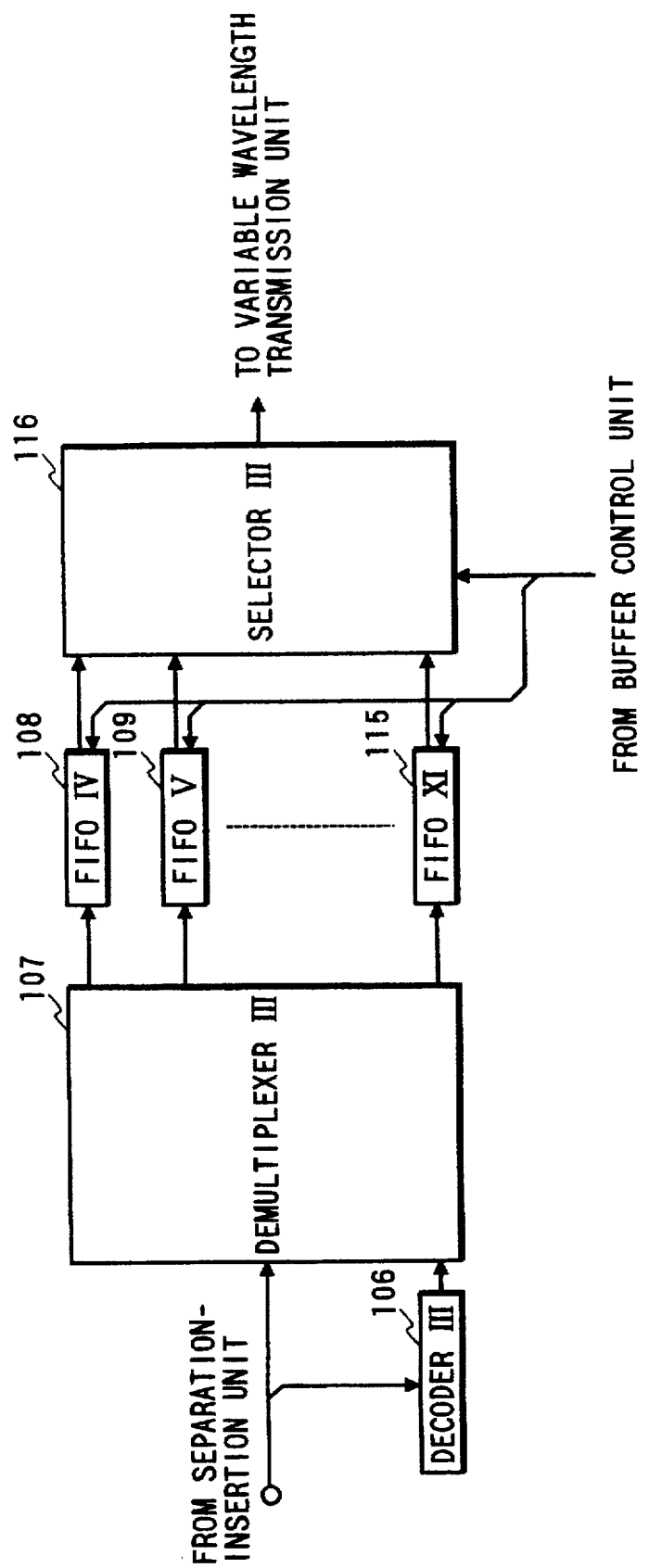
FIG. 17 is a block diagram of a buffer illustrating a second embodiment according to the present invention.

FIG. 17 shows a second embodiment of an internal structure which can be applied to the buffers I 22 to VIII 29 of the first embodiment.

In FIG. 17, a decoder III 106 reads an address portion of a packet to be input, selects a FIFO for writing in the packet out of FIFOs 108 to 115 and instructs a demultiplexer III 107 on the selected FIFO. The demultiplexer III 107 is operative to output the packet signal input from the separation-insertion unit to the selected FIFO in accordance with the instructions from the decoder III 106. The FIFOs 108 to 115 are provided for each transmission wavelength, which temporarily store packet signals from the demultiplexer III 107 and read out them in accordance with the instructions from the buffer control unit.

In this embodiment, a packet in which the destination terminal equipment is not a terminal equipment connected to the adjacent node device and in which it is not necessary to assign a wavelength for transmission is also stored in either one of the FIFO IV 108 to FIFO XI 115 appropriately. Further, such configuration may be employed that a packet in which it is not necessary to assign a wavelength for transmission is stored in a FIFO having a memory region not occupied. Then, a selector III 116 selects a certain FIFO out of the FIFOs IV 108 to XI 115 in accordance with the instructions from the buffer control unit and delivers its output signal to the variable wavelength transmission unit.

The following Table 3 shows an example of the buffer control tables which can be preferably utilized in the buffer structure of FIG. 17. In this example, the buffer control unit is the same as that of FIG. 11.

TABLE 3

| | Address | | | | | | | |
|---|---|---|---|---|---|---|---|---|
| Table Name | 0 | 1 | 2 | 3 | 4 | 5 | 6 | 7 |
| Buffer Control Table I | IV | VI | VIII | X | XI | IX | VII | V |
| Buffer Control Table II | V | IV | VI | VIII | X | XI | IX | VII |
| Buffer Control Table III | VII | V | IV | VI | VIII | X | XI | IX |
| Buffer Control Table IV | IX | VII | V | IV | VI | VIII | X | XI |
| Buffer Control Table V | XI | IX | VII | V | IV | VI | VIII | X |
| Buffer Control Table VI | X | XI | IX | VII | V | IV | VI | VIII |
| Buffer Control Table VII | VIII | X | XI | IX | VII | V | IV | VI |
| Buffer Control Table VIII | VI | VIII | X | XI | IX | VII | V | IV |

In this embodiment, the FIFOs are selected as shown in the buffer control tables of Table 3 in each operation period so that the written packet signals can be read out and output to the variable transmission units respectively. For example, during the operation period T1, the FIFO IV is selected for the buffer I 22 so that the packet written in the FIFO IV can be read out and output to the variable wavelength transmission unit I 30 from which the packet signal is outputted with the wavelength λ1.

This embodiment uses a plurality of the FIFOs so that the offset signals does not need to be output to the reading counter, thereby effectively simplifying the buffer structure.
(Third embodiment)

Figure 1:
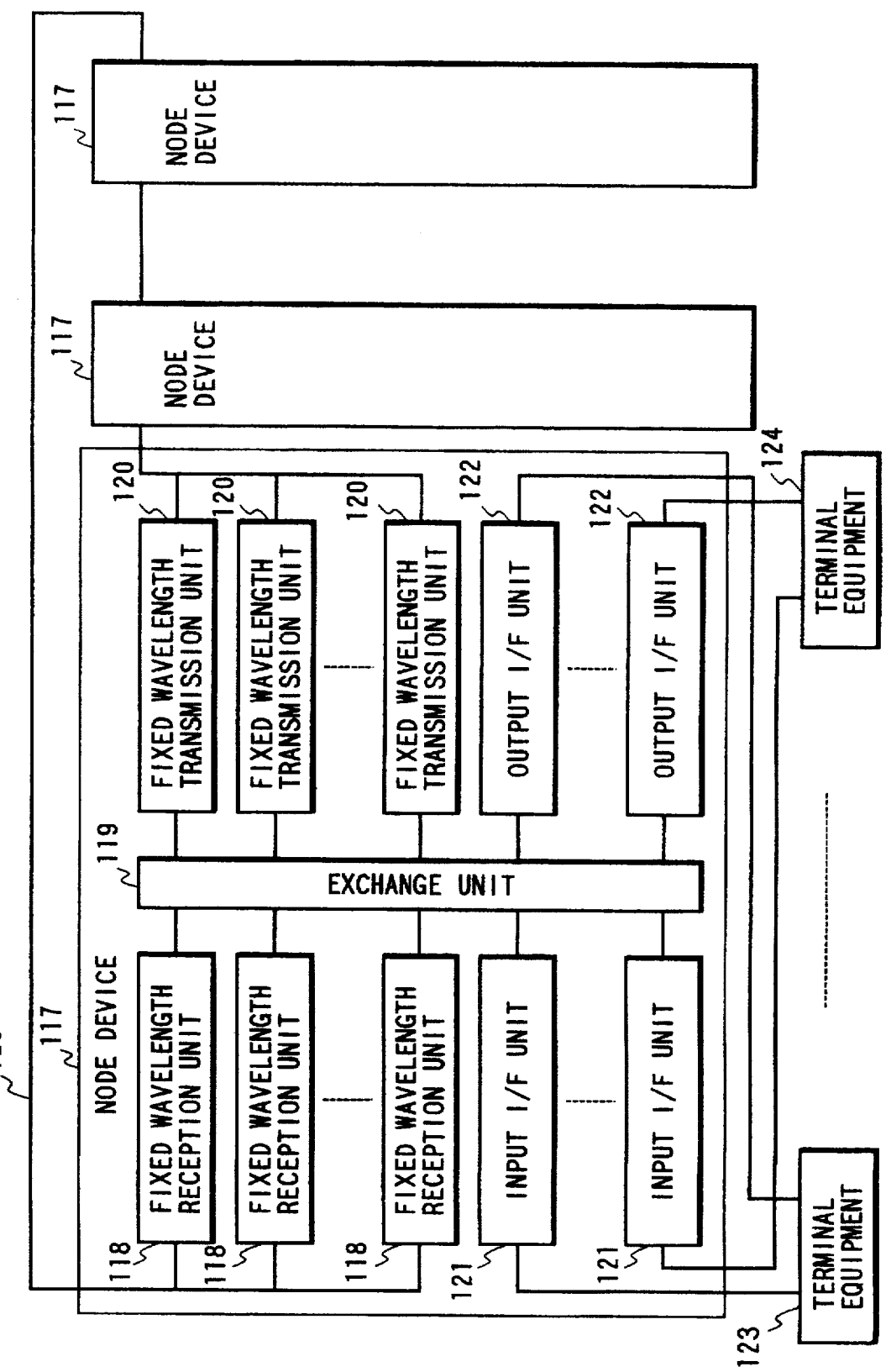
FIG. 1 is a block diagram of a network system illustrating a first prior art.
Figure 2:
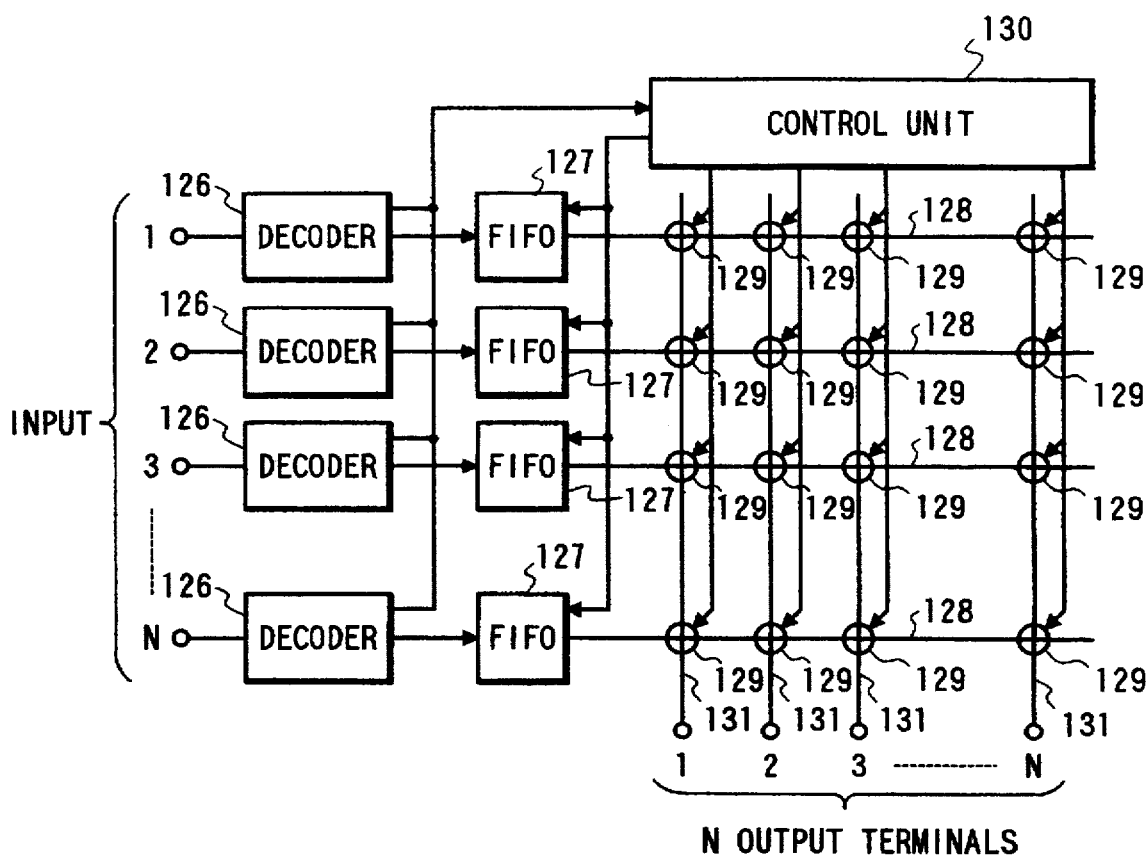
FIG. 2 is a block diagram of an 8×8 electric switch illustrating the first prior art.
Figure 18:
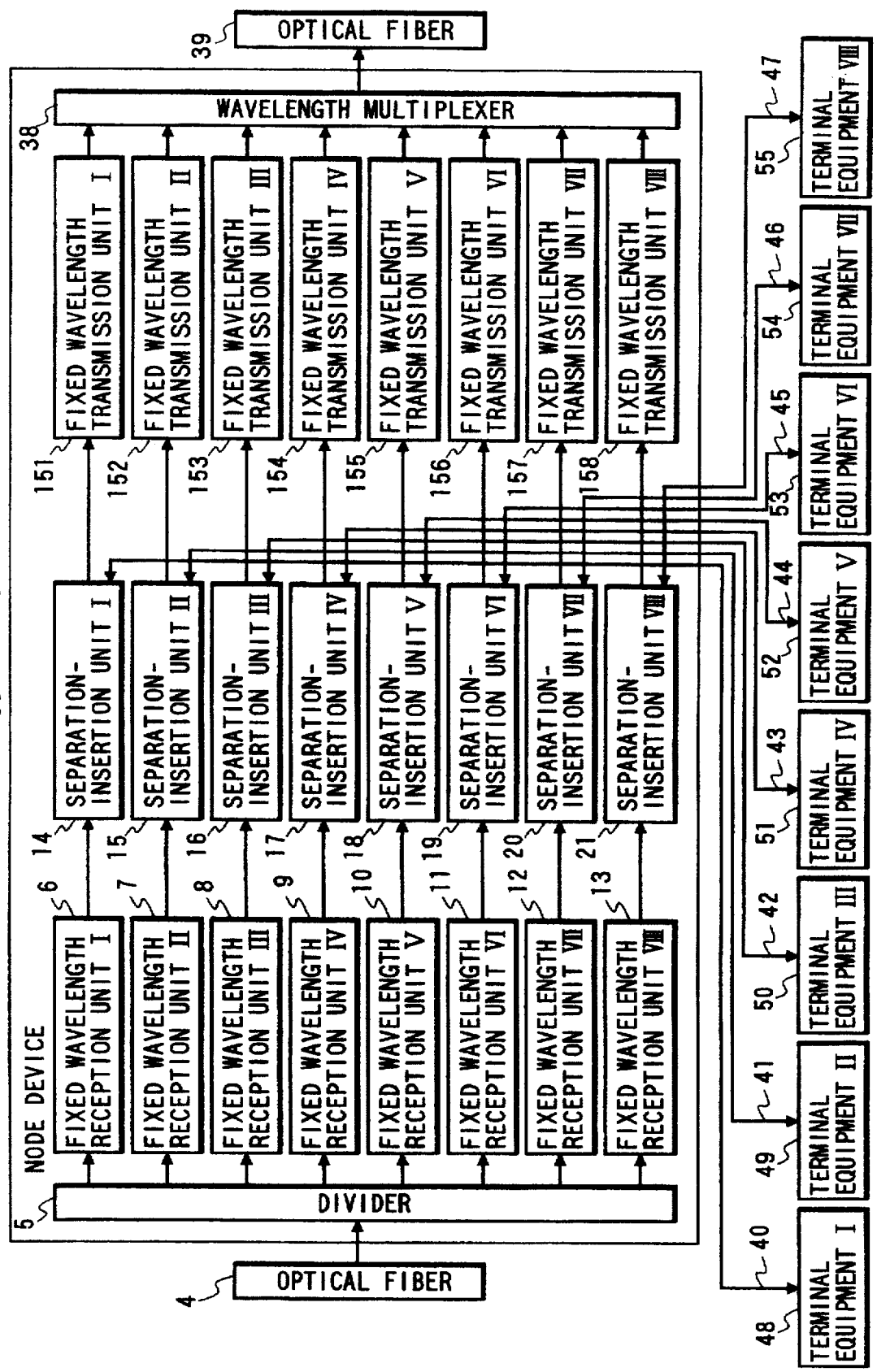
FIG. 18 is a block diagram of a node device illustrating a third embodiment according to the present invention.

FIG. 18 shows a structure of a node device which can be partially utilized in a network system according to a third embodiment. The node device is constituted such that the buffer control unit 2, the wavelength control unit 3, buffers I 22 to VIII 29 are removed from the node device shown in FIGS. 7A and 7B, and further, the variable wavelength transmission units I 30 to VIII 37 of FIG. 1 are replaced with fixed wavelength transmission units I 151 to VIII 158, respectively. The fixed wavelength transmission units I 151 to VIII 158 can each transmit only an optical signal having an individual wavelength; one of the wavelengths λ1 to λ8.

The network system of this embodiment, the structure of which is similar to that of the FIG. 8, features that the node device structure of FIG. 18 is utilized for the node devices II 57 to IV 59 instead of that of the node device shown in FIG. 8, but the node device I 56 takes the same structure as that of the first embodiment shown in FIGS. 7A and 7B.

In the above network system, the embodiment assumes that a packet C is transmitted from the terminal equipment I 48 connected, to the node device II 57, to the terminal equipment V 52 connected to the node device III 58.

As is similar to the first embodiment, the packet C from the terminal equipment I 48 connected to the node device II 57, is input to the separation-insertion unit I 14 in the node device II 57. The packet C is added in the separation-insertion unit I 14 to a packet stream from the fixed wavelength reception unit I 6, sent from the fixed wavelength transmission unit I 151 through a channel of the wavelength λ1 and input to the node device III 58. Since the packet C is transmitted through the channel of the wavelength λ1, it can not be input to the separation-insertion unit V 18 to which the destination accepting terminal equipment was connected, but it is relayed toward the node device IV 59. Similarly, the packet C is also relayed through the node device IV 59 to be input to the node device I 56.

The buffer I 22 in the node device I 56 stores the packet C in the memory region V in its dual port memory 77 in accordance with the address of the packet C. The packet C stored in the dual port memory 77 is read out and transmitted toward the node device II 57 at the time when the transmission wavelength of the variable wavelength transmission unit I 30 becomes λ5. The packet C is relayed through the node device II 57 and then input to the node device III 58, in which the packet C is received by the fixed wavelength reception unit V 10, separated by the separation-insertion unit V 18 in accordance with the address and input to the destination accepting terminal equipment V 52.

In the embodiment, some of the node devices can not be required to use the variable wavelength transmission unit, the buffer and means for control these components, so that a further low-cost network can be accomplished.

Also, a node device shown in FIG. 19 can be partially utilized in the network system. The node device of FIG. 19 is constituted such that the fixed wavelength reception units, the separation-insertion units and the fixed wavelength transmission units respectively corresponding to the wavelengths λ7 and λ8 are removed from the node device shown in FIG. 18. A filter 159 is used to transmit channels or optical signals having the wavelengths λ7 and λ8, as to which the node device can not follow, to node devices located on the downstream side. That is, the filter 159 is operative to cut off the wavelengths λ1 to λ6. Such a node device can be placed in the network system by connecting it with at least one node device shown in FIGS. 7A and 7B, the device of FIGS. 7A and 7B including the variable wavelength transmission units arranged in the same number of the channels so that the packets can be transmitted to a desired accepting terminal by altering their channels or wavelengths in the node device.

In the embodiments such above, although the channels in the variable wavelength transmission units, i.e., the transmission wavelengths fell in a range of λ1 to λ8, the present invention is not limited to 8 numbered channels. In general, if the number of channels is set to N, alteration of the channels will be made in a predetermined pattern; either of which starts with the shortest wavelength out of N numbered wavelengths, selects odd numbers of the wavelengths in ascending order in turn, then selects the longest wavelength in even numbers after selecting the longest wavelength in odd numbers, selects even numbers of the wavelengths in descending order in turn and selects again the shortest wavelength after selecting the secondly shortest wavelength; or which starts with the secondly shortest wavelength out of N numbered wavelengths, selects even numbers of the wavelengths in ascending order in turn, then selects the longest wavelength in odd numbers after selecting the longest wavelength in even numbers, selects odd numbers of the wavelengths in descending order in turn and selects again the secondly shortest wavelength after selecting the shortest wavelength.

By altering the channels or transmission wavelengths in such a pattern, the variance rate of the transmission wavelengths can be decreased, thus effectively preventing the occurrence of a wavelength conflict such as several variable wavelength transmission units simultaneously transmit the packets with an identical wavelength even if all of the variable wavelength transmission units use the above pattern. In addition, other patterns can be utilized in alteration of the channels as long as the alteration pattern is performed such that each of the transmission units alters its transmission channel in synchronism with each other but without simultaneous transmission through the identical channel.

(Fourth Embodiment)

Figure 20B:
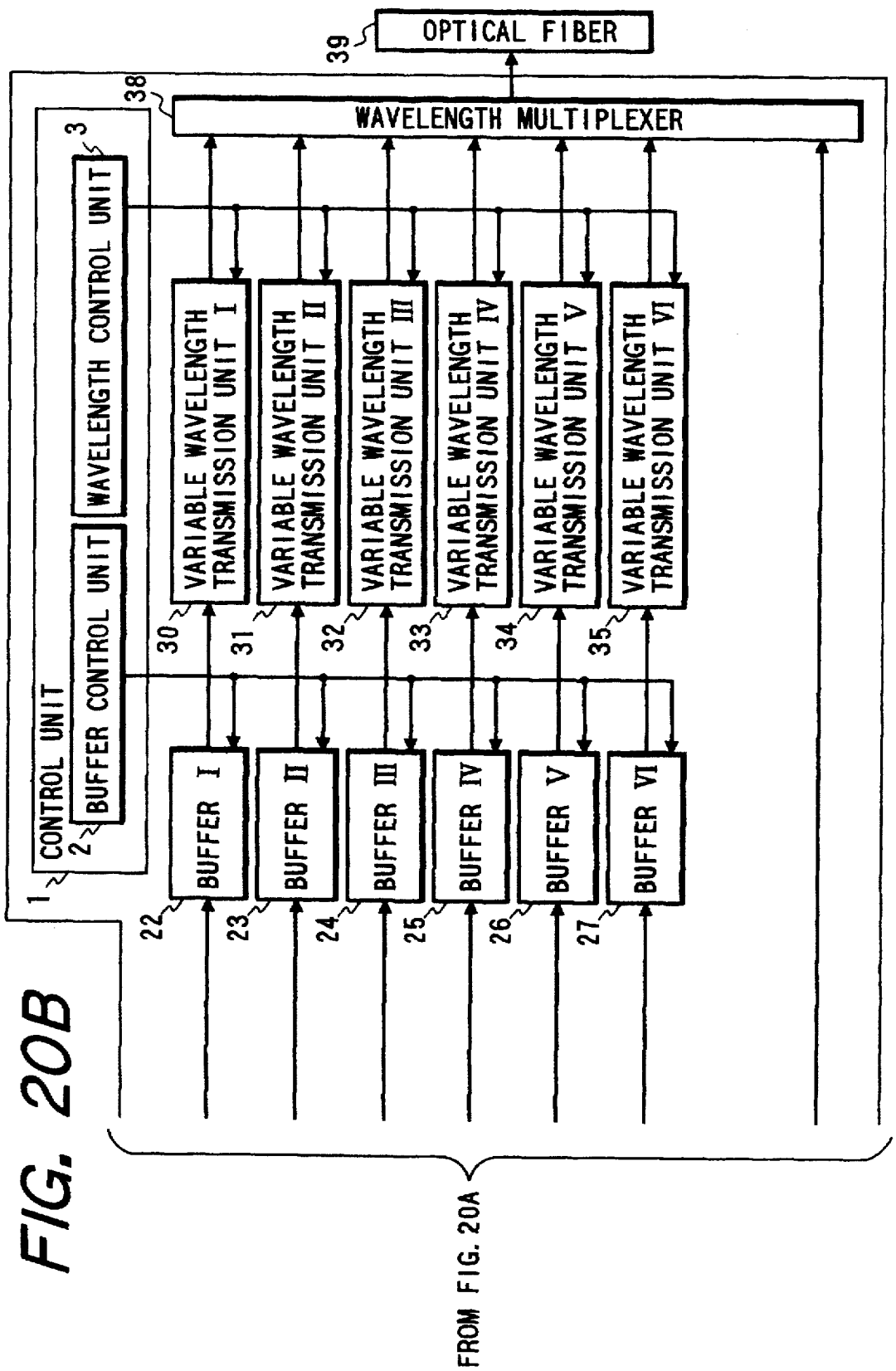
FIG. 20 is comprised of FIGS. 20A and 20B showing block diagrams of a node device illustrating a fourth embodiment according to the present invention.

FIGS. 20A and 20B show a node device which is constituted such that the fixed wavelength reception units, the separation-insertion units, the buffers and the variable wavelength transmission units respectively corresponding to the wavelengths $\lambda 7$ and $\lambda 8$ are removed from that shown in FIGS. 7A and 7B. The filter 159, as is similar to that of FIG. 19, is also provided in this node device.

In the node device such above, the wavelengths of the variable wavelength transmission units are set to select one out of $\lambda 1$ to $\lambda 6$ in due order for reception by the node devices. For example, the following pattern can be applied:

$\lambda 1 \rightarrow \lambda 3 \rightarrow \lambda 5 \rightarrow \lambda 6 \rightarrow \lambda 4 \rightarrow \lambda 2 \rightarrow \lambda 1$ The present invention can be also carried out by using the above node device. The node device such above, however, can not be output the wavelengths $\lambda 7$ and $\lambda 8$, so that at least one other node device necessarily includes the fixed wavelength reception units and the variable wavelength transmission units respectively corresponding to at least one of the node device's transmittable at least one of the wavelengths $\lambda 1$ to $\lambda 6$ and at least one of the wavelengths $\lambda 7$ and $\lambda 8$. Accordingly, the transmission can be performed with a desired wavelength by relaying a signal through the node device of FIGS. 20A and 20B and the other node devices such above even if the signal is transmitted with any one of the wavelengths.

For example, the embodiment assumes that the network system includes one node device of FIGS. 20A and 20B, another node device corresponding to the wavelengths $\lambda 1$, $\lambda 7$ and $\lambda 8$ and the other node devices of FIG. 18. In this case, in order that the packet being transmitted with the wavelength $\lambda 2$ is transmitted with the wavelength $\lambda 8$, it has only to output the packet of the wavelength $\lambda 2$ from the node device of FIGS. 20A and 20B through the channel of the wavelength $\lambda 1$ and then output the packet of the wavelength $\lambda 1$ from the node device corresponding to the wavelengths $\lambda 1$, $\lambda 7$ and $\lambda 8$ through the channel of the wavelength $\lambda 8$.

Further, the network system can use a node device corresponding to the wavelengths $\lambda 1$ and $\lambda 7$ and another node device corresponding to the wavelengths $\lambda 7$ and $\lambda 8$ to relay packets properly between the above node devices. In such a case, each wavelength can be properly set to correspond to each node device. As such above, this embodiment is also realized such that the output wavelengths of the variable transmission are altered in each node device in a predetermined pattern and then the packets are read out from the buffer in accordance with the altered wavelengths. Accordingly, the transmission wavelengths are not required to determine for each packet whether to be transmitted or not, so that an efficient transmission can be performed.

(Fifth Embodiment)

Figure 21B:
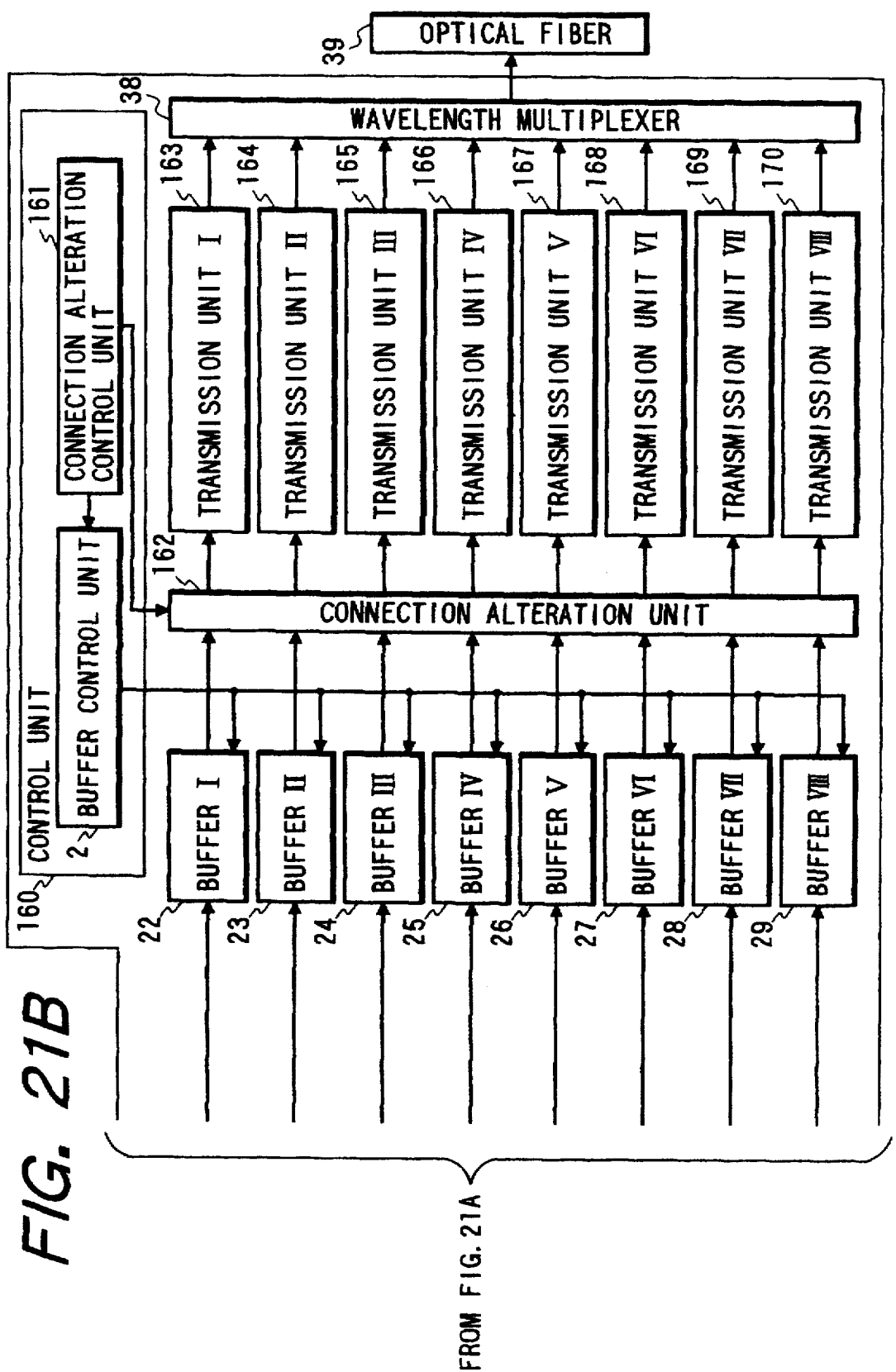
FIG. 21 is comprised of FIGS. 21A and 21B showing block diagrams of a node device illustrating a fifth embodiment according to the present invention.

The fifth embodiment uses a node device as shown in FIGS. 21A and 21B. In FIGS. 21A and 21B, like elements use like reference numerals of those shown in FIGS. 7A and 7B. The node device according to this embodiment differs from that of FIGS. 7A and 7B in that the transmission wavelengths from transmission units I 163 and VIII 170 are not variable, a connection alteration unit 162 is newly provided for altering the connection between the buffer and the transmission unit, and a connection alteration control unit 161 is further provided for controlling the connection alteration unit 162.

In the embodiment, a predetermined wavelength is assigned to each transmission unit without any variation of the wavelength so that the transmission wavelengths of the transmission units can be altered in the predetermined pattern so as to be output from the buffer. The network system according to the present embodiment is the same as that shown in FIG. 8.

The connection alteration unit 162 is constituted such that its input terminals I to VIII are connected to the buffers I to VIII and its output terminals I to VIII are connected to the transmission units I to VIII, respectively. In this configuration, the input terminal I corresponds to the channel of the wavelength $\lambda 1$, with corresponding to its output terminal I. Further, the input terminal II corresponds to the channel of the wavelength $\lambda 2$, with corresponding to its output terminal II. Similarly, the other input terminals correspond to the respective channels with they corresponding to their output terminals. The internal structure of the connection alteration unit will be described later.

The transmission units I 163 to VIII 170 serve as transmission means utilizing semiconductor laser and are each operative to convert packets from the connection alteration unit into an optical signal having a predetermined wavelength and output it through the wavelength multiplexer to the optical fiber which is used as a physical medium in an optical wavelength multi-transmission line.

A multi-electrode type DFB (Distributed Feed Back) laser can be used for the transmission means. The DFB laser is controlled as to each current injection amount of electrodes so that the transmission units I to VIII can be each assigned to an individual wavelength out of the transmission wavelengths $\lambda 1$ to $\lambda 8$.

Figure 22:
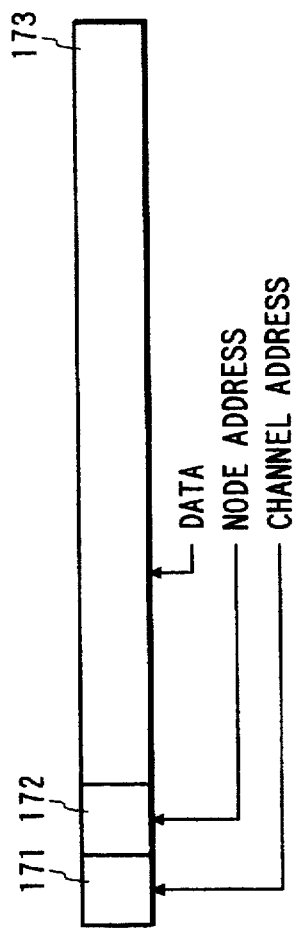
FIG. 22 is a schematic diagram illustrating a structure of a packet utilized in the fifth embodiment according to the present invention.

FIG. 22 shows a structure of a packet to be used in this embodiment. In FIG. 22, a field 171 indicates a channel identification information of the packet, concretely describing a channel address for identifying a channel processing group to which a corresponding separation-insertion unit belongs, the separation-insertion unit being connected through a subtransmission line to an accepting terminal to which the packet should be transmitted.

A field 172 indicates a node device identification information of the packet, concretely describing a node device address for identifying the node device to which the packet accepting terminal was connected. Represented by numeral 173 is a data portion which is carried by the packet. The following Tables 4 and 5 show the node address and the channel processing group in each node device according to the present embodiment.

TABLE 4

| Node Device | Node Address |
|---|---|
| Node Device I | 1 |
| Node Device II | 2 |
| Node Device III | 3 |
| Node Device IV | 4 |

TABLE 5

| Wavelength for Channel Processing Group | Channel Address |
|---|---|
| $\lambda 1$ | 1 |
| $\lambda 2$ | 2 |
| $\lambda 3$ | 3 |
| $\lambda 4$ | 4 |
| $\lambda 5$ | 5 |
| $\lambda 6$ | 6 |
| $\lambda 7$ | 7 |
| $\lambda 8$ | 8 |

Figure 3:
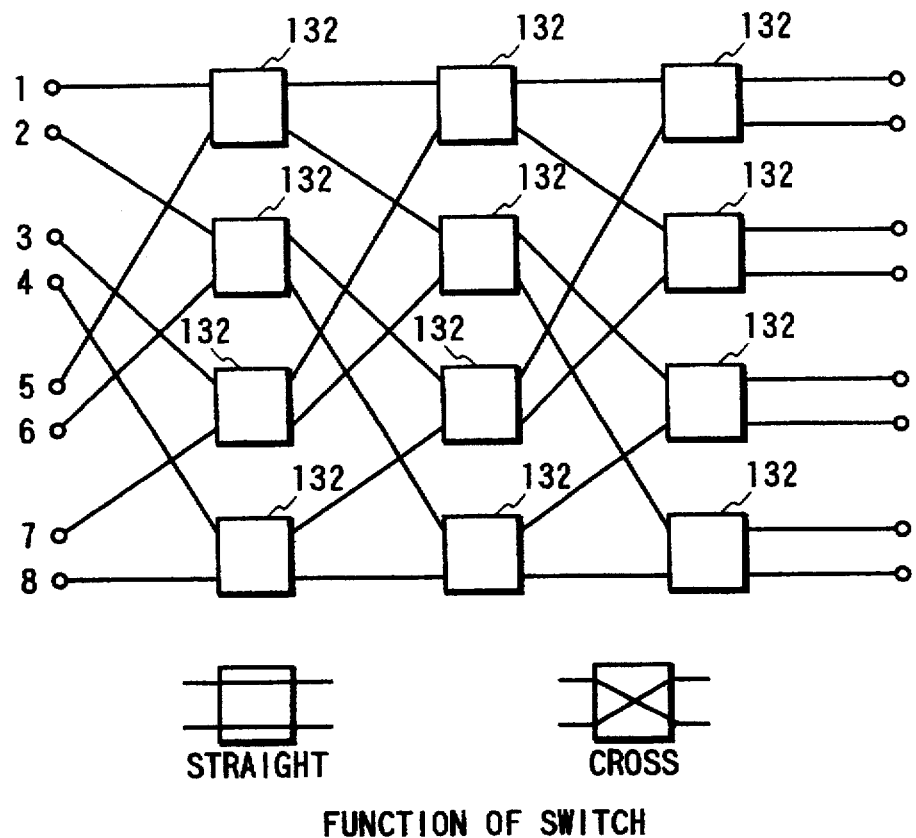
FIG. 3 is a block diagram of another 8×8 electric switch illustrating the first prior art.

Now, FIG. 3 shows an internal structure commonly used in the separation-insertion units I to VIII to which the fifth embodiment is applied. The same internal structure is applied to all of the separation-insertion units I to VIII and the description will be made with respect to only one unit.

Figure 23:
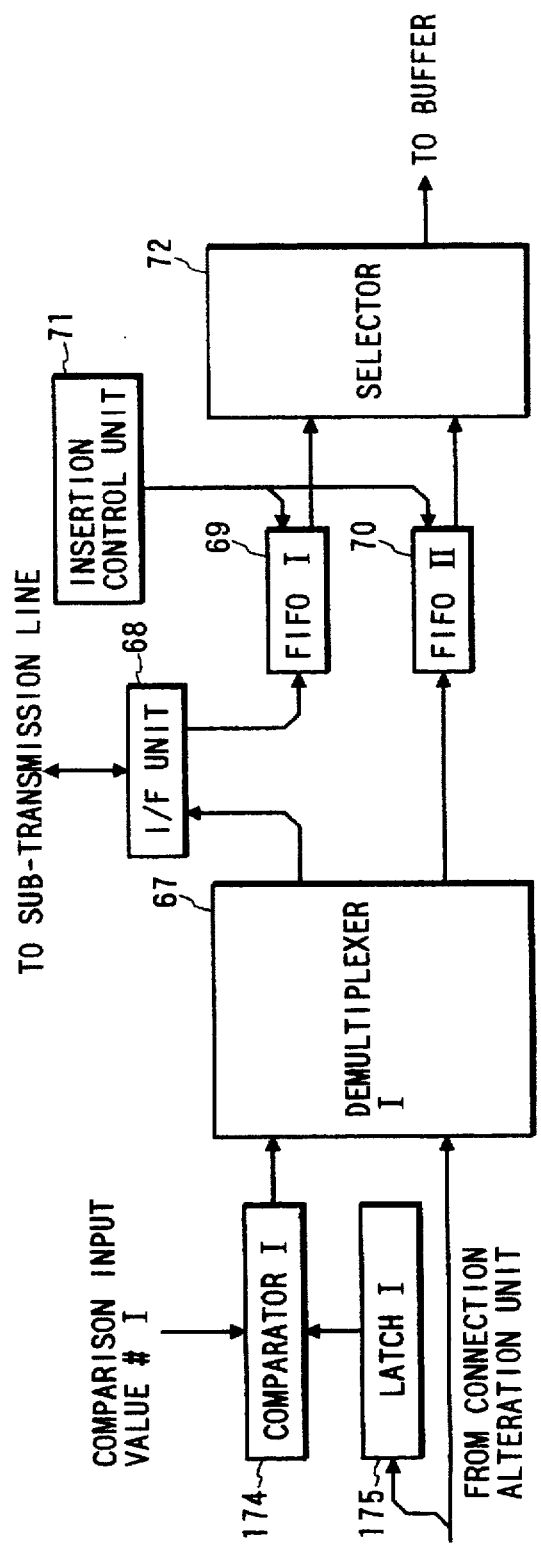
FIG. 23 is a block diagram of a separation-insertion unit illustrating the fifth embodiment according to the present invention.

In FIG. 23, a comparator I 174 compares a comparison input value "#I" with the node address portion used as the node device identification information of the packet to be output from a latch I. If the result shows matching, the comparator I 174 outputs a separation instruction signal to a demultiplexer I. If not matching, it outputs a relay instruction signal thereto. The comparison input value "#I" can take a proper value corresponding to each node device in accordance with Table 1.

The latch I 175 latches the node address portion of the packet for outputting it to the comparator I 174. The multiplexer I 67 outputs the input packet to either an I/F unit 68 or a FIFO II 70 in accordance with the instructions from the comparator I 174.

Figure 24:
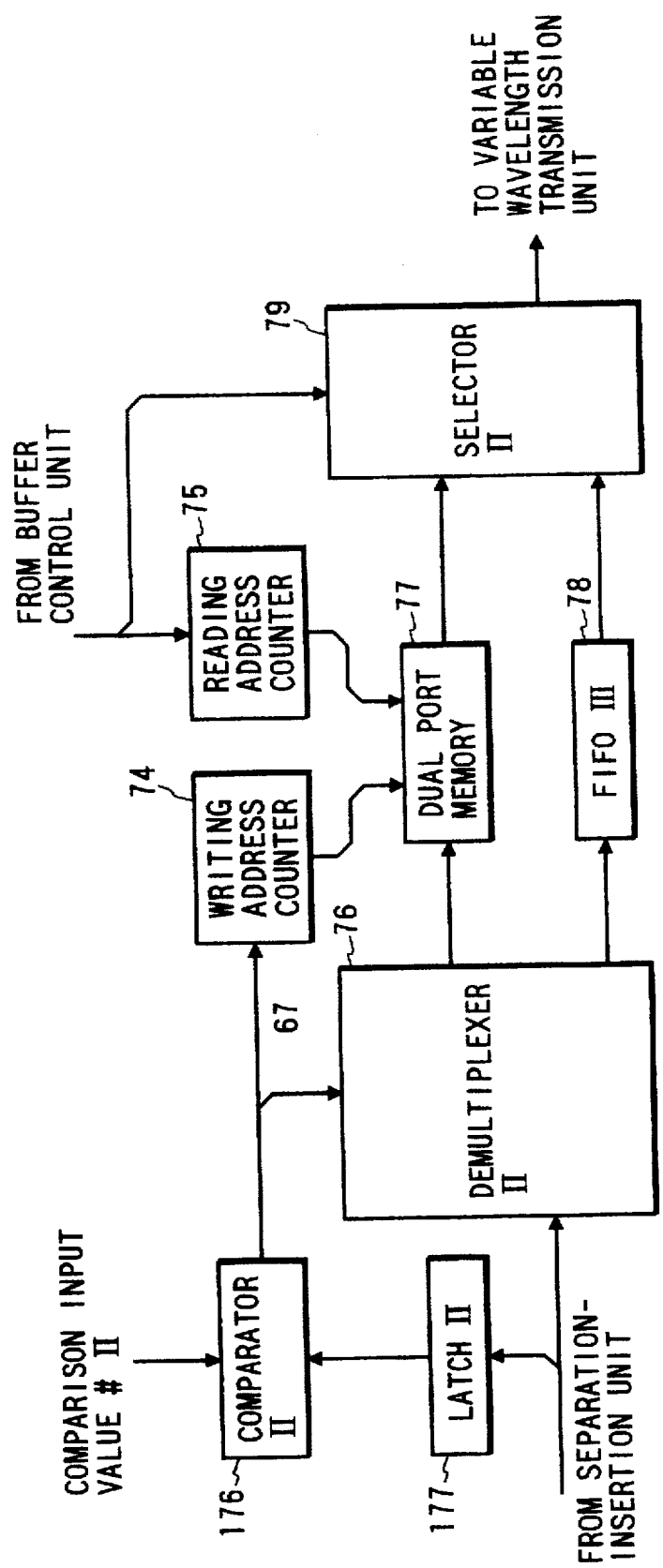
FIG. 24 is a block diagram of a buffer unit illustrating the fifth embodiment according to the present invention.

FIG. 24 shows an internal structure commonly used in the buffers I to VIII to which the fifth embodiment is applied. The same internal structure is applied to all of the buffers I to VIII and the description will be made with respect to only one buffer. As is similar to the separation-insertion unit such above, the buffer also uses a comparator II 176 and a latch II 177 instead of the decoder shown in FIG. 11.

In this configuration, the input packets are divided into packets with designation of the output terminal, from which the packet should be output by the connection alteration unit, and packets without designation, then, both are temporarily stored. The packet with the designation of the output terminal from which the connection alteration unit should output the packet is further stored for each output terminal temporarily.

Since the output terminals I to VIII in the transmission alteration unit are connected to the transmission units I to VIII and the transmission units I to VIII correspond to the channel processing groups I to VIII, the output terminals I to VIII, of course, correspond to the channel processing groups I to VIII, respectively. In this embodiment, the packet with the designation of the output terminal, which is output by the connection alteration unit, is destinationed to a accepting terminal to which the adjacent node device was connected through a subtransmission line. The designated output terminal corresponds to a channel processing group to which a corresponding separation-insertion unit belongs, the separation-insertion unit being connected through the sub-transmission line to the destination accepting terminal to which the packet should be transmitted.

In FIG. 24, the comparator II 176 compares a comparison input value "#II" with the node address portion of the packet being output from the latch II. If the result shows matching, the comparator I 174 outputs a signal indicating designation presence to a demultiplexer II. If not matching, it outputs a signal indicating no designation thereto. The comparison input value "#II" can take a proper value corresponding to a node device address of each node device located on the downstream side along the transmission direction. The latch I 177 latches the node address portion of the packet for outputting it to the comparator II 176.

Figure 25:
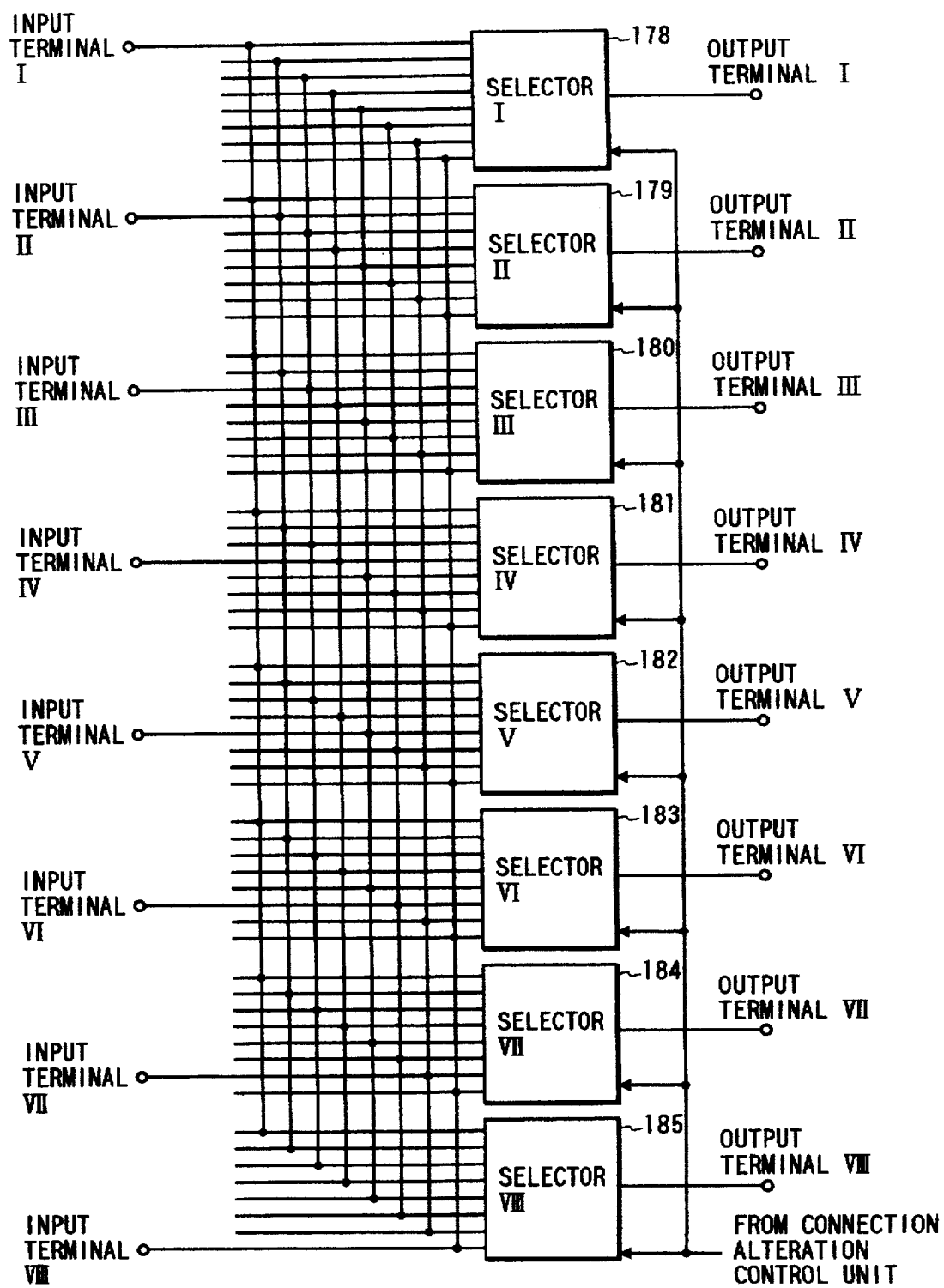
FIG. 25 is a block diagram of a connection alteration unit illustrating the fifth embodiment according to the present invention.

FIG. 25 shows an internal structure of the connection alteration unit to which the present embodiment can be applied. The connection alteration unit has 8 input terminals and 8 output terminals. In FIG. 25, blocks 178 to 185 represent selectors I to VIII, respectively. The selectors I to VIII use 8 signals at the input terminals I to VIII as their own inputs to output a packet being input from a predetermined input terminal to its output terminal in response to a selection signal from the connection alteration unit. A description will be made later as to the selection signal. The connection alteration unit is constituted such above. Accordingly, the connection between the input terminals and the output terminals is set such that the channel processing group can be transferred for properly processing the transmission packet.

Figure 26:
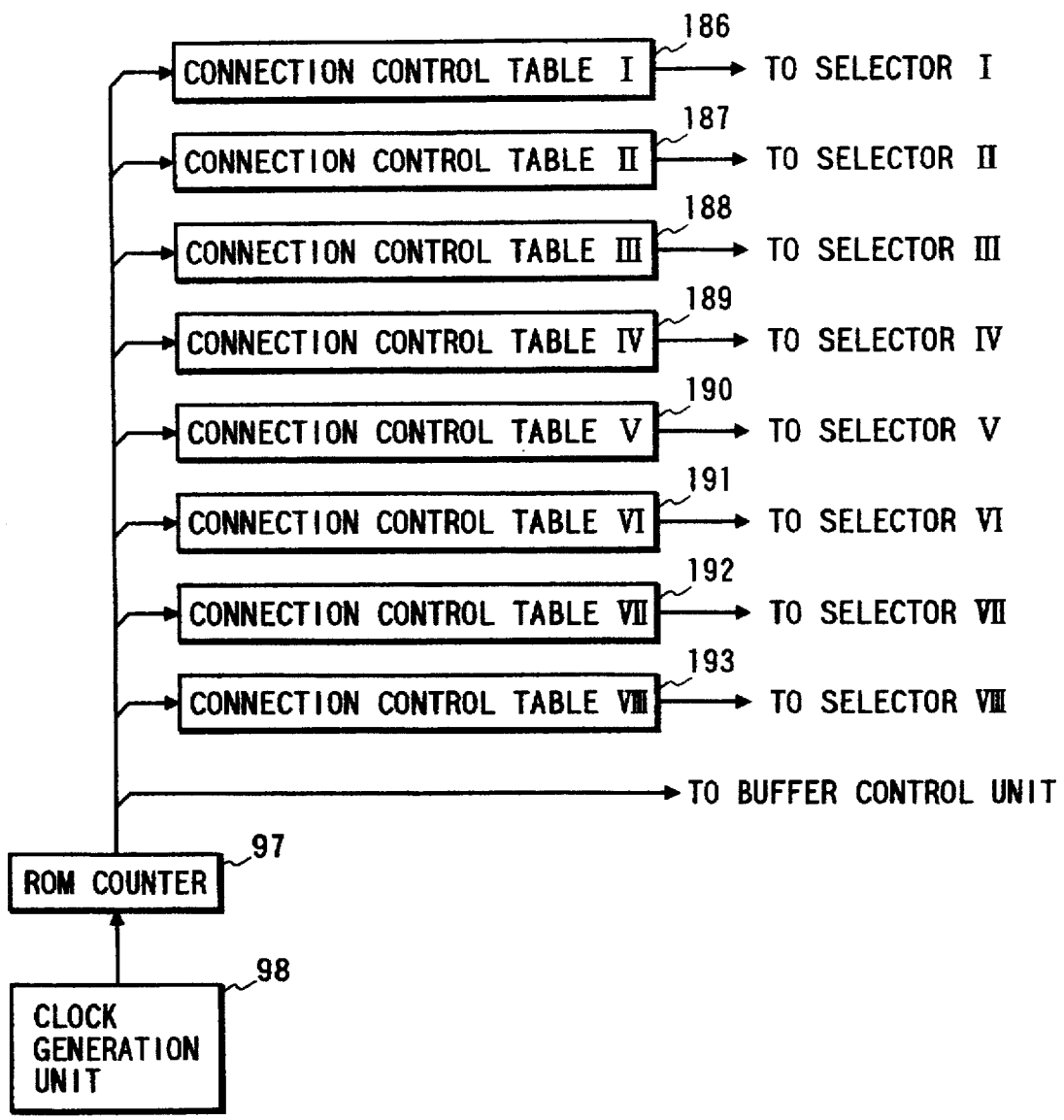
FIG. 26 is a block diagram of a connection control unit illustrating the fifth embodiment according to the present invention.

FIG. 26 shows an internal structure of the connection alteration control unit to which the present embodiment can be applied. In FIG. 26, blocks 186 to 193 represent connection control tables I to VIII, respectively. The connection control tables I to VIII are each read out in accordance with an address value from a 3-bit ROM counter and output a predetermined selection signal to a corresponding selector in the connection alteration unit. These tables are incorporated in a read-only memory (ROM). The contents of the connection control tables I to VIII will be described later. The ROM counter is the same as that shown in FIG. 14.

In the fifth embodiment, the contents of the connection control tables I to VIII are set as follows:

TABLE 6

| | Input Terminal Selected by Selector | | | | | | | |
|---|---|---|---|---|---|---|---|---|
| | Address | | | | | | | |
| Table Name | 0 | 1 | 2 | 3 | 4 | 5 | 6 | 7 |
| Connection Control Table I | I | VIII | VII | VI | V | IV | III | II |
| Connection Control Table II | II | I | VIII | VII | VI | V | IV | III |
| Connection Control Table III | III | II | I | VIII | VII | VI | V | IV |
| Connection Control Table IV | IV | III | II | I | VIII | VII | VI | V |
| Connection Control Table V | V | IV | III | II | I | VIII | VII | VI |
| Connection Control Table VI | VI | V | IV | III | II | I | VIII | VII |

TABLE 6-continued

| | Input Terminal Selected by Selector | | | | | | | |
|---|---|---|---|---|---|---|---|---|
| | Address | | | | | | | |
| Table Name | 0 | 1 | 2 | 3 | 4 | 5 | 6 | 7 |
| Connection Control Table VII | VII | VI | V | IV | III | II | I | VIII |
| Connection Control Table VIII | VIII | VII | VI | V | IV | III | II | I |

Table 6 shows input terminals to be selected by the selectors I to VIII in the connection alteration unit. Since the selectors I to VIII are connected to the output terminals I to VIII, respectively, the connection between the input terminals and the output terminals can be determined in accordance with Table 6. In Table 6, determination is further made such that two or more input terminals are not connected to an identical output terminal at the same.

Table 7 shows a relationship between the input terminals and the output terminals in each address value of the ROM counter.

TABLE 7

| Relationship Between Input Terminal and Output Terminal Connected by Connection Control Table | | | | | | | | |
|---|---|---|---|---|---|---|---|---|
| | Address | | | | | | | |
| Input Terminal | 0 | 1 | 2 | 3 | 4 | 5 | 6 | 7 |
| Input Terminal I | I | II | III | IV | V | VI | VII | VIII |
| Input Terminal II | II | III | IV | V | VI | VII | VIII | I |
| Input Terminal III | III | IV | V | VI | VII | VIII | I | II |
| Input Terminal IV | IV | V | VI | VII | VIII | I | II | III |
| Input Terminal V | V | VI | VII | VIII | I | II | III | IV |
| Input Terminal VI | VI | VII | VIII | I | II | III | IV | V |
| Input Terminal VII | VII | VIII | I | II | III | IV | V | VI |
| Input Terminal VIII | VIII | I | II | III | IV | V | VI | VII |

Although the buffer control unit according to the present embodiment uses the same structure as that shown in FIG. 13, the offset values of the buffer control tables I to VIII are set as follows:

TABLE 8

| | Address | | | | | | | |
|---|---|---|---|---|---|---|---|---|
| Table Name | 0 | 1 | 2 | 3 | 4 | 5 | 6 | 7 |
| Buffer Control Table I | A1 | A2 | A3 | A4 | A5 | A6 | A7 | A8 |
| Buffer Control Table II | A2 | A3 | A4 | A5 | A6 | A7 | A8 | A1 |
| Buffer Control Table III | A3 | A4 | A5 | A6 | A7 | A8 | A1 | A2 |
| Buffer Control Table IV | A4 | A5 | A6 | A7 | A8 | A1 | A2 | A3 |
| Buffer Control Table V | A5 | A6 | A7 | A8 | A1 | A2 | A3 | A4 |

TABLE 8-continued

| | Address | | | | | | | |
|---|---|---|---|---|---|---|---|---|
| Table Name | 0 | 1 | 2 | 3 | 4 | 5 | 6 | 7 |
| Buffer Control Table VI | A6 | A7 | A8 | A1 | A2 | A3 | A4 | A5 |
| Buffer Control Table VII | A7 | A8 | A1 | A2 | A3 | A4 | A5 | A6 |
| Buffer Control Table VIII | A8 | A1 | A2 | A3 | A4 | A5 | A6 | A7 |

The 16 numbered tables as shown in Tables 7 and 8 are all shifted in a cycle and read out synchronously by the ROM counter. Accordingly, the connection relationship between the input terminals and the output terminals is formed such that the connection therebetween is set to be shifted one by one in the same cyclical pattern.

In Tables 6, 7 and 8, if the connection destination of each input terminal is output terminal I, the offset value for reading in the dual port memory of the buffer will be assigned to A1 indicating the memory region I. Similarly, in the cases that each input terminal is destinationed to be connected with the output terminals II, III, IV, V, VI, VII and VIII, the offset values are assigned to values respectively corresponding to the memory regions II, III, IV, V, VI, VII and VIII.

In the buffer shown in FIG. 24, the memory regions I to VIII correspond to the channel processing group to which a separation-insertion unit belongs, the separation-insertion unit being connected to the adjacent node device to which the accepting terminal is connected. Accordingly, the connection control tables and the buffer control tables are set respectively as shown in Tables 6 and 8 so that the packet being stored in each buffer can be read out under control when the connection is made with an output terminal corresponding to the channel processing group to which the destination separation-insertion unit belongs, the separation-insertion unit being connected to the adjacent node device to which the accepting terminal equipment is connected.

In the embodiment, the operation of the node device is composed of 8 continuous operation periods T1, T2, T3, T4, T5, T6, T7 and T8, in which 8 table values are read out in a cycle in 16 tables. The 8 operation periods are each divided into a reading period Td in the dual port memory and a reading period Tf in the FIFO in accordance with the buffer operation.

Now, a description will be made as to an operation of the fifth embodiment according to the present invention with reference to the diagrams of FIGS. 7A, 7B, 8, 12, 13, 21A, 21B, 22, and 26, and a time chart of FIG. 27. The description will be made with respect to a packet transmission utilizing the terminal equipment I 48 as the transmitting terminal connected to the node device I 56 through the subtransmission line I 40 and the terminal equipment V 52 as the accepting terminal connected to the node device III 58 through the subtransmission line V 44. Hereinafter, the packet to be transmitted is called as packet A. Also, like elements in different node devices are represented by identical reference numerals for convenience sake.

Figure 16:
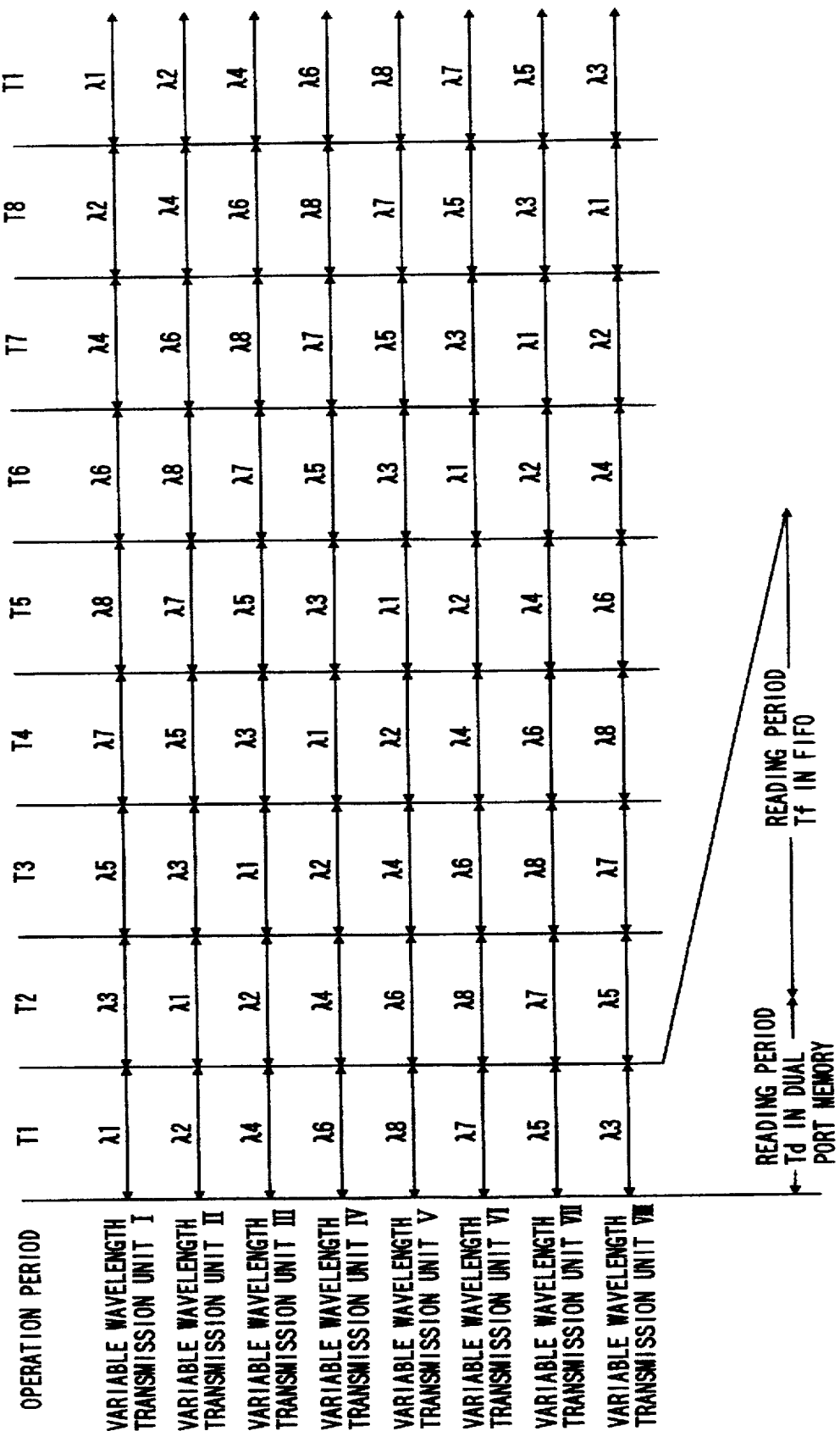
FIG. 16 is a time chart illustrating the first embodiment according to the present invention.

The transmitting terminal equipment I 48 connected to the node device I 56 through the subtransmission line I 40 composes the packet A, as shown in FIG. 16, such that a channel address value "5" for the accepting terminal equipment V 52 connected to the node device III 58 through the subtransmission line V 44 as shown in FIG. 5, and a node address value "3" are both added to the data portion to be transmitted to the accepting terminal equipment V 52 connected to the node device III 58 through the subtransmission line V 44.

The transmitting terminal equipment I 48 then transmits the packet A through the subtransmission line I 40 to the separation-insertion unit I 14 in the node device I 56. The I/F unit in the separation-insertion unit I 14 of the node device I 56 writes the packet A being transmitted through the subtransmission line in the FIFO I in order. After the end operation of writing in the FIFO I, the separation-insertion unit finds a break in the packet stream while reading it out from the FIFO II, stops reading from the FIFO II and starts reading from the FIFO I instead so that the packet from the FIFO I can be output from the selector 72.

After the end operation of reading the packet A from the FIFO I, the separation-insertion unit stops reading from the FIFO I and starts again reading from the FIFO II so that the packet from the FIFO II can be output again from the selector 72. The packet A from the selector 72 is then input to the buffer I.

In the buffer I, the node address portion of the input packet A is latched by the latch II 177 and compared by the comparator II 176 with the node address for the node device II located on the downstream side along the transmission direction. In this case, the node address of the packet A is set to "3" and it does not correspond to the node address "2" for the node device II adjacent to the downstream along the transmission direction, so that the comparator II outputs the signal indicating no designation to the demultiplexer II. The demultiplexer II then set the output destination of the packet A to FIFO III in response to the signal of no designation.

Assuming that an operation period during which the packet A was written in the FIFO III is T8, the packet A will be read out under the control of the buffer control unit during the reading period Tf in the FIFO of the subsequent operation period T1.

In the next operation period T1, the ROM counter 97 in the connection alteration control unit 161 outputs "0" as a reading address value to the connection control tables I through VIII at the same time so that the contents of the connection control table can be read out in accordance with the address value.

In this case, the selection signal to be read out from the connection control table I is for connection between the input terminal I and the output terminal I, as shown in Table 6. Similarly, the other connection control tables II, III, IV, V, VI, VII and VIII respectively take the selection signals for connections between the input terminal II and the output terminal II, III and III, IV and IV, V and V, VI and VI, VII and VII, and VIII and VIII. These selection signals are input to the selectors I 178 to VIII 185 in the connection alteration unit 162 so that the predetermined combination of connection between the input terminal and the output terminal can be selectively established.

During the reading period Td in the dual port memory of the same operation period T1, the reading address value "0" from the ROM counter 97 in the connection alteration control unit 161 is input to the buffer control tables in the buffer control unit 2. The contents of these buffer control tables I to VIII are then read out in accordance with this address value.

In this case, the offset value to be read out from the buffer control table I, as shown in Table 8, is A1 corresponding to the memory region I. Similarly, the other buffer control tables II, III, IV, V, VI, VII and VIII take the offset values A2, A3, A4, A5, A6, A7 and A8 respectively corresponding to the memory regions II, III, IV, V, VI, VII and VIII. These offset values are output to the address counters 75 in the buffer I 22 through the buffer VIII 29, respectively.

Further, the reading control unit in the buffer control unit 2 outputs control signals in response to clock signals from the connection alteration control unit, such as to permit reading from the dual port memory 77, inhibit reading from the FIFO III and set the input of the dual port memory to be output from the multiplexer I. In accordance with these control signals, the reading address counter 75 in the buffer I 22 starts loading with the offset value A1 from the buffer control table I 80 to count up by an increment in due order. The counter thus generates an address for reading the packet written in the memory region I and output it to the dual port memory 77. The reading address causes the dual port memory 77 to read out and output the packet from the output port thereof to the input terminal I of the connection alteration unit in due order.

It will be understood that the packet to be read out at the moment is destinationed to the terminal equipment I 48 connected to the adjacent node device II 57 through the subtransmission line I 40 because the connection is made between the input terminal I and the output terminal I.

During the period Td for reading the dual port memory of the same operation period T1, the offset value A2 is simultaneously loaded from the buffer control table II 81 to the reading address counter 75 in the buffer II 23, so that the packet being written in the memory region II is read out from the dual port memory 77 and output to the input terminal II in the same manner as that of the buffer I 22.

Similarly, the packets are read out from the memory regions III, IV, V, VI, VII and VIII in the buffers III 24, IV 25, V 26, VI 27, VII 28 and VIII 29 and output to the output terminals II through VIII, respectively. At the moment, the packets to be read out during the reading period Td are destinationed to the terminals with which the separation-insertion units II to VIII in the adjacent node device II 57 are connected through the subtransmission lines, respectively.

Subsequently, during the reading period Tf in the FIFO of the operation period T1, the reading control unit in the buffer control unit 2 outputs the control signals in response to the clock signals from the connection alteration control unit 161, such as to inhibit reading in the dual port memory, permit reading in the FIFO III and set the input of the FIFO III to be output from the multiplexer II. In accordance with these control signals, the buffer I 22 reads out from the FIFO III and outputs it to the input terminal I 30 through the selector 79. At this time, the packet A is read out, which has been written in the FIFO III.

Similarly, as to the buffers II 23 to VIII 29, the packets in the FIFO III are read out in due order and output to the input terminals II through VIII, respectively.

The connection alteration unit outputs the packets from the buffers I 22 to VIII 29 to the predetermined output terminals in accordance with the selection signals from the connection alteration control unit as mentioned above. The packets output from the respective output terminals in the connection alteration unit are converted into predetermined optical signals in the transmission units I to VIII and applied to the wavelength multiplexer 38.

At this time, the wavelengths of the applied optical signals, as described above, are $\lambda 1$, $\lambda 2$, $\lambda 3$, $\lambda 4$, $\lambda 5$, $\lambda 6$, $\lambda 7$ and $\lambda 8$ respectively in the transmission units I 163, II 164, III 165, IV 166, V 167, VI 168, VII 169 and VIII 170.

As such above, the optical signals applied from the 8 numbered transmission units are different in wavelength from each other so that all of the optical signals can be mixed in the wavelength multiplexer 38 without interacting each other. The optical signals are then incident on the optical fiber 39 and transmitted to the node device II 57 adjacent to the downstream. The packet A is thus sent from the terminal equipment I 48 connected, to the node device I 56 through the subtransmission line I 40, to the terminal equipment V 52 connected to the node device III 58 through the subtransmission line V 44, so that it can be transmitted as the optical signal having the wavelength λ1 to the node device II 57 as discussed above.

The node device II 57 alters the channel processing group of the packet A, which is transmitted thereto as the optical signal of the wavelength λ1, and relays it through the channel of the wavelength λ5 toward the node device or devices adjacent to the downstream.

The optical signals having the wavelengths λ1 to λ8 and transmitted from the node device I 56 through the optical fiber 60 are divided by the divider 5 and incident on the reception units I 6 to VIII 13, respectively. In the reception unit I, only the optical signal having λ1 is transmitted through the filter I and received by the photodiode (PD). In this case, since the packet A was sent from the node device I 56 as the optical signal of the wavelength λ1, it is received by the reception unit I and then output to the separation-insertion unit I 14.

The latch I 175 in the separation-insertion unit I 14 latches the node address portion of the input packet A and the comparator I 174 compares it with the node address value of its node device II. The node address portion of the packet A is set to "3" and it does not match up to the node address value "2" of the node device II, so that the comparator I outputs a relay instruction signal to the demultiplexer I. In accordance with the relay instruction signal, the demultiplexer I sets the output destination of the packet A to the FIFO II. The packet A is thus written in the FIFO II, read out under the control of the add control unit and output through the selector 72 to the buffer I 22.

Then, the latch II 177 in the buffer I latches the node address portion of the input packet A and the comparator II 176 compares it with the node address value of the node device III adjacent to the downstream along the transmission direction. The node address portion of the packet A is set to "3" and it match up to the node address value "3" of the node device III, so that the comparator II outputs a signal indicating designation presence to the demultiplexer II. In accordance with the signal, the demultiplexer II sets the output destination of the packet A to the dual port memory. Since the channel address of the packet A is "5", the offset value A5 is simultaneously output as a writing start address value to the writing address counter 74.

The writing address counter 74 then loads the writing start address and count up by an increment in due order so as to generate a writing address of the input packet A and output it to the dual port memory 77. The packet A has been already input to the input port of the dual port memory 77 through the demultiplexer II, so that the packet A is written in the memory region V in accordance with the address from the address counter 74 in due order.

The packet A will be read out during the operation period T5 when the output terminal V is connected to the input terminal I of the connection alteration unit. The output terminal V corresponds to the channel processing group V to which the separation-insertion unit V belongs, the separation-insertion unit V being connected to the accepting terminal in the adjacent node device III 58. On the other hand, the input terminal I of the connection alteration unit is connected to the buffer in which the packet A is written.

Assuming that the packet A is written in the dual port memory in the operation period T1, the reading address "1" will be output from the ROM counter 97 in the connection alteration control unit 161 to the connection control tables I through VIII at the same time during the operation period T2 subsequent to the operation period T1. In accordance with the address value, the contents of the connection control tables are read out.

At this time, the selection signal to be read out from the connection control table I is for connection between the output terminal I and the input terminal VIII, as shown in Table 6. Similarly, the other connection control tables II, III, IV, V, VI, VII and VIII respectively take the selection signals for connections between the output terminal II and the input terminal I, III and II, IV and III, V and IV, VI and V, VII and VI, and VIII and VII. These selection signals are input to the selectors I 178 through VIII 185 so that the predetermined combination of connection between the input terminal and the output terminal can be selectively established.

As similar to that of the operation period T1, the reading address value "1", which is output from the ROM counter 97 in the connection control unit 161 during the operation period T2, is input to the buffer control tables in the buffer control unit. Further, the reading all kinds of the reading control signals are composed in the reading control unit 88 in response to the clock signals from the connection alteration control unit. In accordance with these control signals, the dual port memories and the FIFOs III in the buffers I 22 to VIII 29 are read out. At this time, the dual port memory in the buffer I is read out from its memory region II as shown in Table 8. As to the other buffers II, III, IV, V, VI, VII and VIII, the packets are read out from the memory regions III, IV, V, VI, VII, VIII and I, respectively.

As such above, the packets are read out, input to the input terminals I through VIII and output from the predetermined output terminals mentioned above to the transmission units I 163 through VIII 170. Then, the packets are converted into the predetermined optical signals in the transmission units I to VIII and transmitted through the wavelength multiplexer 38 to the optical fiber.

In the subsequent operation periods T3 and T4, the ROM counter 97 in the connection alteration control unit 161 outputs "2 and 3" as reading address values so that the connection control tables and the buffer control tables can be read out. The packets are then read out from the predetermined dual port memories and the FIFOs respectively, transferred by the connection alteration unit to the predetermined channel processing groups and output as the optical signals from the transmission units.

In this case, the packet A has been written in the memory region V in the dual port memory of the buffer I 22, so that it will be read out during the period Td for reading the dual port memory in the subsequent operation period T5.

In the operation period T5, the ROM counter 97 in the connection alteration control unit 161 outputs "4" as a reading address value to the connection control tables I through VIII. In accordance with the address value, the contents of the connection control tables are read out. In this case, the input terminal I is connected to the output terminal V.

At this time, the address value "4" is also output to the buffer control unit 2 so that the buffer control tables can be read out. In this case, the memory region V is set to be read out from the dual port memory in the buffer I 22. The packet A is read out during the period Td for reading the dual port memory in the operation period T5 and output from the input terminal I to the output terminal V in the connection alteration unit. The packet A is then transmitted through the wavelength multiplexer 38 to the optical fiber and incident on the node device III 58.

The packet A, which was thus received as the optical signal having the wavelength λ1 in the reception unit I 3 in the node device II 57, is altered by the connection alteration unit from the channel processing group I to the channel processing group V and transmitted from the transmission unit V 167 as an optical signal of the wavelength λ5.

The optical signals having the wavelengths λ1 to λ8 and transmitted from the node device II 57 through the optical fiber are divided by the divider in the node device III 58 and incident on the reception units I 6 through VIII 13. In the reception unit V 10, only the optical signal having the wavelength λ5 can be transmitted through the filter V and received by the photodiode (PD). Since the packet A was sent from the node device II 57 as the optical signal with the wavelength λ5, it is received by the reception unit V 10. Then, the packet A is output from the reception unit V 10 to the separation-insertion unit V 18.

Then, the latch I 175 in the separation-insertion unit V 18 latches the node address portion of the input packet A and the comparator I 174 compares it with the node address value of its node device III. The node address portion of the packet A is set to "3" and it match up to the node address value "3" of its node device III, so that the comparator I outputs a separation instruction signal to the demultiplexer I.

In accordance with the separation instruction signal, the demultiplexer I outputs the packet A to the I/F unit. The packet A is then received by the accepting terminal equipment V through the subtransmission line V. Finally, a predetermined processing is performed in the accepting terminal equipment V by extracting only the data portion after removing the address portion from the packet.

As such above, the packet A has been transmitted from the transmitting terminal equipment I 48 connected to the node device I 56 through the subtransmission line I 40 to the accepting terminal equipment V 52 connected to the node device III 58 through the subtransmission line V 44.

In this embodiment, the packet A was sent with the wavelength λ1 from the transmission unit I 56 in the node device I. Then, the packet A was altered in the node device II 57 for the channel processing group to which the separation-insertion unit V 16 belongs, the separation-insertion unit V 16 being connected to the node device III 48 to which the accepting terminal is connected through the subtransmission line. In other words, the channel processing group of the packet A is transferred to another group corresponding to the optical signal of the wavelength λ5. Finally, the packet A was received by the reception unit V 10 in the node device III 58, dropped by the separation-insertion unit V 18 and received in the accepting terminal equipment V through the subtransmission line V.

The present embodiment uses the combination of selectors as the connection alteration unit and the ROM table for selecting the input terminals of the selectors, so that the control of the connection alteration unit can be simplified.

Further, the number of the input and output terminals has only to be arranged in the same number of the channels.

Furthermore, the embodiment uses the fixed transmission wavelength in one transmission unit group so that an inexpensive light source can be utilized as well as no wavelength control is required.

(Other Embodiments)

According to the present invention, the wavelength is selected for outputting the packet from the node device, i.e., the packet is read out from the buffer in synchronism with the transmission wavelength of the transmission unit being set to a desired one for outputting the packet, or the packet is read out from the buffer in synchronism with the output from the buffer being connected to the transmission unit for outputting the desired wavelength, so that the wavelength (channel) is altered into the desired one for the packet transmission. Then, the packet being transmitted through the desired wavelength is dropped by the drop means and thus transmitted to the desired accepting terminal equipment.

In this configuration, the destination address of the packet can be composed of a separation means address indicating an address of either separation means for separating the packet or a node device in which the separation means are included and a wavelength address indicating a wavelength (channel) which is separated by the separation means as shown in FIG. 22. Accordingly, node devices through which the packet is relayed can determine the timing for reading the packet from the buffer in accordance to the wavelength address and the separation means can determine whether to drop the packet or not in accordance to the separation means address, thus reducing the load required for the judgment of the packet address.

However, in the case that all of the node devices can not alter the transmission wavelengths such as in the third and fourth embodiments, it is necessary to determined whether the packet being input to the separation means has been already altered into a predetermined wavelength or not, so that the separation means can not determine whether to drop the packet or not in accordance with only the drop address. In this case, if the node device, from which the packet can be output with a desired wavelength, adds to the packet information such as to describe what the packet has been already transmitted with the predetermined wavelength, the separation means can be determine whether to separate the packet or not in accordance with both the separation means address and the additional information.

Although the above embodiments have been described with respect to the system utilizing the ring type network, the present invention is not limited thereto, other network systems can be applied, such as a bus type network system or the like.

The above embodiments have also adopted such a structure as each drop means is connected to one terminal. The present invention, however, is not limited to one terminal equipment, a plurality of terminal equipments can be connected to each of the separation means. Further, each of the separation means can be connected to another network system to which the plurality of terminal equipments are connected.

In the above embodiments, the separation-insertion means have been used as means for separating the packet to the terminal equipments connected and inserting the packet from the terminal equipments to the packet stream on the multi-transmission channel line. However, the separation means and the insertion means may be separately provided in the network. In this case, the separation means is preferably provided on an upper stream side than the insertion means as is similar to that of the above embodiments.

Further, although the above embodiments have used the divider and the filter to receive the packet in each node device, a branching filter may be used instead for dropping a multi-wavelength optical signal per wavelength and this makes it possible to further simplify the node device structure.

The storage capacity used in each node device, such as for the separation-insertion means, and the FIFO or the dual port memory in the buffer, can be determined by taking such factors into account as packet size transmitted, transmission capacity for the network and length of the operation period for transmission channel alteration.

Furthermore, although the optical signal has been used to realize the plurality of channels with a wide range of the optical wavelengths, an electric signal can be used to realize the plurality of channels by a frequency multiplexing technique.

As such above, according to the present invention, the network system, the node device and the transmission control method select the channel to be used at the packet transmission under control so as to alter the fixed wavelength reception means for receiving the packet, thus performing routing control of the packet. This makes it possible to simplify the routing control, with no exchange unit required as is dissimilar to the conventional node device of the first type. The system can be also decreased in its hardware scale.

Further, since the alteration pattern is set not to transmit an identical channel with a plurality of transmission means at the same time so that arbitration control can be performed, such a conventional arbitration control operation is not required as to monitoring for each channel the occurrence of an output conflict with respect to all of the wavelengths transmitted from the node device. This also makes it possible to simplify the node device structure as well as to decrease the hardware scale.

Furthermore, the alteration pattern is fixed in each transmission channel of the transmission means so that the variance rate of the wavelength can be reduced for example at the time of the transmission alteration. This allows the node device to perform a high-speed wavelength alteration, thereby achieving an improvement of the operation rate in the node device as well as an improvement of the throughput in the network system.

What is claimed is:

1. A network system for connecting a plurality of node devices for signal transmission through N numbered channels comprising:
    a first node device including:
        N numbered buffer means for temporarily storing signals to be transmitted;
        transmission means for sending each signal from each of the N numbered buffer means through the N numbered channels;
        channel alteration control means for controlling said transmission means to alter the channels through which the signals from said buffer means can be sent in accordance with a predetermined pattern to prevent the signals from two or more of said N numbered buffer means from being sent to the same channel at the same time; and
        buffer control means, operating synchronously with the alteration of channels by said channel alteration control means, for controlling said buffer means to read out the signals through desired channels; and
    a second node device for receiving signals from said first node device comprising:
        reception means for receiving the N numbered channels respectively.

2. A system according to claim 1, wherein said buffer means divides input signals into one signal to be output with channel designated through which the signal should be sent, and another signal to be output without channel designation.

3. A system according to claim 2, wherein said buffer means further divides the one signal to be output with channel designated in each channel to be transmitted.

4. A system according to claim 1, wherein the plurality of node devices including said first and second node devices are connected together in a ring shape.

5. A system according to claim 1 further including:
    a set of N sets of third node devices comprising;
    reception means for selectively receiving a predetermined channel out of the plurality of channels;
    separation means for selectively separating a signal to be separated from the signal stream in said reception means and for outputting the separated signal to a terminal connected thereto through a sub-transmission line;
    insertion means for inserting a signal to be transmitted from the terminal through the sub-transmission line to the signal stream received by said reception means; and
    transmission means for transmitting the signal stream through a predetermined channel in the plurality of channels,
    wherein channels to be received by said reception means are different from one another in the respective sets and channels to be transmitted from said transmission means are different in the respective sets so that each of said channels to be received by said reception means in the respective sets is the same as one of said channels to be transmitted from said transmission means in the respective sets.

6. A system according to claim 5, wherein the channel to be received by each set of said reception means is the same channel as that to be transmitted by the same set of said transmission means.

7. A system according to claim 1, wherein the plurality of node devices are all said first node devices.

8. A system according to claim 1, wherein the plurality of channels are optical channels having N numbered individual wavelengths.

9. A system according to claim 1, wherein said transmission means of said first node device includes N numbered variable channel transmission means respectively corresponding to said N numbered buffer means and said channel alteration control means of said first node device alter respective channels of said variable channel transmission means.

10. A system according to claim 9, wherein the plurality of channels are optical channels having N numbered individual wavelengths and said variable channel transmission means are used as variable wavelength transmission means each of which alters its transmission wavelength in a predetermined pattern;
    said predetermined pattern starts with the shortest wavelength out of N numbered wavelengths, selects odd numbers of the wavelengths in ascending order in turn, then selects the longest wavelength in even numbers after selecting the longest wavelength in odd numbers, selects even numbers of the wavelengths in descending order in turns and selects again the shortest wavelength after selecting the second shortest wavelength; or
    said predetermined pattern starts with the second shortest wavelength out of N numbered wavelengths, selects even numbers of the wavelengths in ascending order in turn, then selects the longest wavelength in odd numbers after selecting the longest wavelength in even numbers, selects odd numbers of the wavelengths in descending order in turn, and selects again the second shortest wavelength after selecting the shortest wavelength.

11. A system according to claim 1, wherein said transmission means of said first node device includes:
    N numbered fixed channel transmission means, each of which selectively outputs a predetermined channel out of the N numbered channels so that the channel to be output from each fixed channel transmission means cannot overlap another channel, and connection alteration means for altering connections between said N numbered buffer means and said N numbered fixed channel transmission means, and wherein said channel alteration control means alters said fixed channel transmission means, from which signals of the respective buffers are transmitted, in accordance with a predetermined pattern by controlling said connection alteration means.

12. A system according to claim 11, wherein said connection alteration means of said first node device includes N numbered selectors, which correspond to said N numbered fixed channel transmission means respectively, and distribution means for distributing outputs from said N numbered buffer means among all of said N numbered selectors so that the connection between said buffer means and said fixed channel transmission means can be altered by alteration as to which output should be selected from said buffer means for each selector.

13. A network system connecting a plurality of node devices for signal transmission through N numbered channels comprising:

at least one first node device including;

N numbered reception means for receiving the N numbered channels respectively;

N numbered buffer means for temporarily storing signals to be transmitted among the signals received by said reception means;

transmission means for sending each signal from each of the N numbered buffer means through the N numbered channels;

channel alteration control means for controlling said transmission means to alter the channels through which the signals from said buffer means can be sent in accordance with a predetermined pattern to prevent the signals from two or more of said buffer means from being sent to the same channel at the same time; and buffer control means operating synchronously with the alteration of channels by said channel alteration control means, for controlling said buffer means to read out the signals through the desired channels; and a second node device for receiving signals from said first node device comprising;

reception means for receiving the N numbered channels respectively.

14. A system according to claim 13, wherein said first node device further includes separation means for selectively separating a certain signal from a stream of signals received by said reception means and for outputting the certain signal to a terminal equipment connected thereto through a sub-transmission line.

15. A system according to claim 14, wherein the signal to be transmitted is a signal having a destination address including a separation means address indicating an address of the separation means to which a destination terminal equipment is connected or the node device in which the separation means are included, and a channel address indicating a channel from which the separation means can selectively separate the certain signal, whereby said buffer means can output said signal when a signal from said buffer means can be transmitted through a channel corresponding to said channel address, and said separation means determines in accordance with the separation means address whether said signal is separated or not.

16. A system according to claim 13, wherein said first node device further includes insertion means for inserting a signal sent from a terminal equipment connected thereto through a sub-transmission line into a signal stream to be transmitted by said transmission means.

17. A system including N numbered channels and a plurality of node devices each for receiving from and transmitting to two or more preassigned channels out of the N numbered channels so that a signal to be transmitted through any one of the N numbered channels can be transferred to another channel for transmission in at least one node device out of all of node devices, comprising:

at least one first node device selected out of the plurality of node devices including;

n numbered reception means for receiving n numbered channels to be received and transmitted by the at least one first node device out of the N numbered channels:

n numbered buffer means for temporarily storing signals to be transmitted out of signals received by said reception means;

transmission means for sending each signal from said each buffer means through the n numbered channels;

channel alteration control means for controlling said transmission means to alter the channels, through which the signals from said buffer means can be sent, in accordance with a predetermined pattern to prevent the signals from two or more of said buffer means from being sent to the same channel at the same time; and buffer control means, operating synchronously with the alteration of channels by said channel alteration control means, for controlling said buffer means to read out the signals through desired channels.

18. A system according to claim 17, wherein said at least one first node device further includes separation means for selectively separating a certain signal from a stream of signals received by said reception means and for outputting the certain signal to a terminal equipment connected thereto through a sub-transmission line.

19. A system according to claim 18, wherein the signal to be transmitted is a signal having a destination address including a separation means address indicating an address of the separation means to which a destination terminal equipment is connected or the node device in which the separation means are included, and a channel address indicating a channel with which the separation means can selectively separate the certain signal, whereby said buffer means can output said signal when a signal from said buffer means can be transmitted through a channel corresponding to said channel address, and said separation means determines in accordance with the separation means address whether said signal is separated or not.

20. A system according to claim 17, wherein said at least one first node device further includes insertion means for inserting a signal sent from a terminal equipment connected thereto through a sub-transmission line into a signal stream to be transmitted by said transmission means.

21. A system according to claim 17, wherein said buffer means divides input signals into one signal to be output with channel designated through which the signal should be sent, and another signal to be output without channel designation.

22. A system according to claim 21, wherein said buffer means further divides the one signal to be output with channel designated in each channel to be transmitted.

23. A system according to claim 17, wherein the plurality of node devices including said at least one first node device are together connected in ring shape.

24. A system according to claim 17, wherein the plurality of node devices further include a set of N sets of second node devices which comprises:
reception means for selectively receiving a predetermined channel out of the plurality of channels;
drop means for selectively dropping a signal to be separated from the signal stream in said reception means and for outputting the separated signal to a destination terminal to which the network system has been connected through a corresponding sub-transmission line;
add means for adding a signal to be transmitted from the destination terminal through the sub-transmission line to the signal stream in said reception means; and
transmission means for transmitting the signal stream through a predetermined channel in the plurality of channels,
wherein channels to be received by said reception means and channels to be sent from said transmission means are both different in each set so that the reception channels of each set of said reception means do not overlap any one of the transmission channels of each set of said transmission means.

25. A system according to claim 17, wherein the plurality of channels are optical channels having N numbered individual wavelengths.

26. A system according to claim 17, wherein said transmission means of said first node device includes n numbered variable channel transmission means respectively corresponding to said n numbered buffer means and said channel alteration control means of said at least one first node device alter respective channels of said variable channel transmission means.

27. A system according to claim 26, wherein the plurality of channels are optical channels of N numbered wavelengths including n numbered individual wavelengths and said variable channel transmission means are used as variable wavelength transmission means each of which alters its transmission wavelength in a predetermined pattern;
said predetermined pattern starts with the shortest wavelength out of n numbered wavelengths, selects odd numbers of the wavelengths in ascending order in turn, then selects the longest wavelength in even numbers after selecting the longest wavelength in odd numbers, selects even numbers of the wavelengths in descending order in turn, and selects again the shortest wavelength after selecting the second shortest wavelength; or
said predetermined pattern starts with the second shortest wavelength out of n numbered wavelengths, selects even numbers of the wavelengths in ascending order in turn, then selects the longest wavelength in odd numbers after selecting the longest wavelength in even numbers, selects odd numbers of the wavelengths in descending order in turn, and selects again the second shortest wavelength after selecting the shortest wavelength.

28. A system according to claim 17, wherein said transmission means of said at least one first node device includes:
n numbered fixed channel transmission means, each of which selectively outputs a predetermined channel out of the n numbered channels so that the channel to be output from each fixed channel transmission means cannot overlap another channel, and
connection alteration means for altering connections between said n numbered buffer means and said n numbered fixed channel transmission means, and
wherein said channel alteration control means alters said fixed channel transmission means, from which signals of the respective buffers are transmitted, in accordance with a predetermined pattern by controlling said connection alteration means.

29. A system according to claim 28, wherein said connection alteration means of said at least one first node device includes n numbered selectors, which correspond to said n numbered fixed channel transmission means respectively, and distribution means for distributing outputs from said n numbered buffer means respectively to said n numbered selectors so that the connection between said buffer means and said fixed channel transmission means can be altered by alteration as to which output should be selected from said buffer means for each selector.

30. A first node device in a network system for connecting a plurality of node devices through N numbered channels for signal transmission, in which a signal to be transmitted from the first node device is received in another node device or other node devices, comprising:
N numbered reception means for receiving the N numbered channels respectively;
N numbered buffer means for temporarily storing signals to be transmitted;
transmission means for sending the signals from said buffer means respectively through the N numbered channels;
channel alteration control means for controlling said transmission means to alter the channels through which the signals from said buffer means can be sent in accordance with a predetermined pattern to prevent the signals from two or more said buffer means from being sent to the same channel at the same time; and
buffer control means, operating synchronously with the alteration of channels by said channel alteration control means, for controlling said buffer means to read out the signals through desired channels.

31. A device according to claim 30 further including drop means for selectively dropping a certain signal from a stream of signals in said reception means and for outputting the certain signal to an accepting terminal to which the network system has been connected through a corresponding sub-transmission line.

32. A device according to claim 31, wherein the signal to be transmitted is a destination address including a drop means address indicating the drop means to which a destination accepting terminal has been connected or the node device in which the drop means are included, and a channel address indicating a channel through which the drop means can selectively drop the certain signal, whereby said buffer means can select a channel to be output in accordance with the channel address and said drop means can determine in accordance with the drop means address whether to drop the signal or not.

33. A device according to claim 30 further including add means for adding signals to the signal stream from the transmission means, the added signals being sent from the terminals each of which is connected to the network through the corresponding sub-transmission line.

34. A device according to claim 30, wherein said buffer means divides input signals into one signal to be output with channel designated through which the signal should be sent, and another signal to be output without channel designation.

35. A device according to claim 34, wherein said buffer means further divides the signal to be output with channel designated in each channel to be transmitted.

36. A device according to claim 30, wherein the plurality of channels are optical channels having N numbered individual wavelengths.

37. A device according to claim 30, wherein said transmission means includes N numbered variable channel transmission means respectively corresponding to said N numbered buffer means and said channel alteration control means alters respective channels of said variable channel transmission means.

38. A device according to claim 37, wherein the plurality of channels are optical channels having N numbered individual wavelengths and said variable channel transmission means are used as variable wavelength transmission means each of which alters its transmission wavelength in a predetermined pattern;

said predetermined pattern starts with the shortest wavelength out of N numbered wavelengths, selects odd numbers of the wavelengths in ascending order in turn, then selects the longest wavelength in even numbers after selecting the longest wavelength in odd numbers, selects even numbers of the wavelengths in descending order in turns and selects again the shortest wavelength after selecting the second shortest wavelength; or said predetermined pattern starts with the second shortest wavelength out of N numbered wavelengths, selects even numbers of the wavelengths in ascending order in turn, then selects the longest wavelength in odd numbers after selecting the longest wavelength in even numbers, selects odd numbers of the wavelengths in descending order in turn, and selects again the second shortest wavelength after selecting the shortest wavelength.

39. A device according to claim 30, wherein said transmission means includes:

N numbered fixed channel transmission means, each of which selectively outputs a predetermined channel out of the N numbered channels so that the channel to be output from each fixed channel transmission means cannot overlap another channel, and connection alteration means for altering connections between said N numbered buffer means and said N numbered fixed channel transmission means, and wherein said channel alteration control means alters said fixed channel transmission means, from which signals of the respective buffers are transmitted, in accordance with a predetermined pattern by controlling said connection alteration means.

40. A device according to claim 39, wherein said connection alteration means includes N numbered selectors, which correspond to said N numbered fixed channel transmission means respectively, and distribution means for distributing outputs from said N numbered buffer means among all of said N numbered selectors so that the connection between said buffer means and said fixed channel transmission means can be altered by alteration as to which output should be selected from said buffer means for each selector.

41. A node device in a network system including N numbered channels and a plurality of node devices each for receiving and transmitting two or more preassigned channels out of the N numbered channels so that a signal to be transmitted through any one of the N numbered channels can be transferred to another channel for transmission in at least one node device out of all of node devices, comprising:

n numbered reception means each of which for receiving n numbered channels to be received and transmitted by the at least one node device out of the N numbered channels;

n numbered buffer means each of which for temporarily storing signals to be transmitted out of all signals in said reception means;

transmission means for sending the signals from said buffer means respectively through the n numbered channels;

channel alteration control means for controlling said transmission means to alter the channels through which the signals from said buffer means can be sent in accordance with a predetermined pattern to prevent the signals from two or more said buffer means from being sent to the same channel at the same time; and buffer control means operating synchronously with the alteration of channels by said channel alteration control means, for controlling said buffer means to read out the signals through desired channels.

42. A device according to claim 41 further including drop means for selectively dropping a certain signal from a stream of signals in said reception means and for outputting the certain signal to an accepting terminal to which the network system has been connected through a corresponding sub-transmission line.

43. A device according to claim 42, wherein the signal to be transmitted includes a destination address including a drop means address indicating the drop means to which a destination accepting terminal has been connected or the node device in which the drop means are included, and a channel address indicating a channel through which the drop means can selectively drop the certain signal, whereby said buffer means can select a channel to be output in accordance with the channel address and said drop means can determine in accordance with the drop means address whether to drop the signal or not.

44. A device according to claim 41 further including add means for adding signals to the signal stream from the transmission means, the added signals being sent from the terminals each of which is connected to the network through the corresponding sub-transmission line.

45. A device according to claim 41, wherein said buffer means divides input signals into one signal to be output with a channel designated through which the signal should be sent, and another signal to be output without channel designation.

46. A device according to claim 45, wherein said buffer means further divides the signal to be output with the channel designated in each channel to be transmitted.

47. A device according to claim 41, wherein the plurality of channels are optical channels having N numbered individual wavelengths and said transmission means can output the n numbered wavelengths.

48. A device according to claim 41, wherein said transmission means includes n numbered variable channel transmission means respectively corresponding to said n numbered buffer means and said channel alteration control means alters respective channels of said variable channel transmission means.

49. A device according to claim 48, wherein the plurality of channels are optical channels of N numbered wavelengths including n numbered individual wavelengths and said variable channel transmission means are used as variable wavelength transmission means each of which alters its transmission wavelength in a predetermined pattern;

the predetermined pattern starts with the shortest wavelength out of n numbered wavelengths, selects odd numbers of the wavelengths in ascending order in turn, then selects the longest wavelength in even numbers after selecting the longest wavelength in odd numbers, selects even numbers of the wavelengths in descending order in turn, and selects again the shortest wavelength after selecting the second shortest wavelength; or the predetermined pattern starts with the second shortest wavelength out of n numbered wavelengths, selects even numbers of the wavelengths in ascending order in turn, then selects the longest wavelength in odd numbers after selecting the longest wavelength in-even numbers, selects odd numbers of the wavelengths in descending order in turn, and selects again the second shortest wavelength after selecting the shortest wavelength.

50. A device according to claim 41, wherein said transmission means includes:

n numbered fixed channel transmission means, each of which selectively outputs a predetermined channel out of the n numbered channels so that the channel to be output from each fixed channel transmission means cannot overlap another channel, and connection alteration means for altering connections between said n numbered buffer means and said n numbered fixed channel transmission means, and wherein said channel alteration control means alters said fixed channel transmission means, from which signals of the respective buffers are transmitted, in accordance with a predetermined pattern by controlling said connection alteration means.

51. A device according to claim 50, wherein said connection alteration means includes n numbered selectors, which correspond to said n numbered fixed channel transmission means respectively, and distribution means for distributing outputs from said n numbered buffer means respectively to said n numbered selectors so that the connection between said buffer means and said fixed channel transmission means can be altered by alteration as to which output should be selected from said buffer means for each selector.

52. A signal transmission control method for a first node device in a network system which connects a plurality of node devices through N numbered channels for signal transmission and in which a signal to be transmitted from the first node device is received in another node device or other node devices, comprising steps of:

receiving signals to be transmitted through the N numbered channels in N numbered reception means, respectively;

temporarily storing signals to be transmitted out of the received signals in N numbered buffer means;

controlling transmission means, which can send each signal from said each buffer means through the N numbered channels to alter the channels through which the signals from said buffer means can be sent in accordance with a predetermined pattern to prevent the signals from two or more of said buffer means from being sent to the same channel at the same time; and controlling said buffer means operating synchronously with the alteration of channels to read out the signals through desired channels.

53. A method according to claim 52 further including a step of separating by separation means a certain signal from a stream of signals received by said reception means and outputting the certain signal to a terminal equipment connected thereto through a sub-transmission line.

54. A method according to claim 53, wherein the signal on the network includes a destination address comprising a separation means address indicating an address of the separation means connected to a destination terminal equipment or the node device in which the separation means are included, and a channel address indicating a channel through which the separation means can selectively separate the certain signal, whereby said buffer means can select a channel for outputting the signal in accordance with the channel address and said separation means can determine in accordance with the separation means address whether to separate the signal or not.

55. A method according to claim 54, wherein said buffer means determine in accordance with the separation means address whether the signal should be output to a channel in accordance with the channel address.

56. A method according to claim 52, wherein said buffer means identifies a signal to be output through a channel in accordance with the channel address when the input signal is to be separated in a separation means adjacent to a stream of signals along the transmission direction of the first node device.

57. A method according to claim 52 further including a step of inserting a signal sent from a terminal equipment connected thereto through a sub-transmission line into a signal stream to be transmitted by said transmission means.

58. A method according to claim 52, wherein said buffer means store signals by dividing the signals into one signal to be output with a channel designated through which the signal should be sent, and another signal to be output without a channel designation.

59. A method according to claim 58, wherein said buffer means stores the signal to be output with the channel designated by further dividing the signal for the channel for transmission.

60. A method according to claim 52, wherein said transmission means includes N numbered variable channel transmission means respectively corresponding to said N numbered buffer means so that channel alteration of said transmission means can be performed by altering respective channels of said variable channel transmission means.

61. A method according to claim 60, wherein the plurality of channels are optical channels having N numbered individual wavelengths and said variable channel transmission means are used as variable wavelength transmission means each of which alters its transmission wavelength in a predetermined pattern;

the predetermined pattern starts with the shortest wavelength out of N numbered wavelengths, selects odd numbers of the wavelengths in ascending order in turn, then selects the longest wavelength in even numbers after selecting the longest wavelength in odd numbers, selects even numbers of the wavelengths in descending order in turn, and selects again the shortest wavelength after selecting the second shortest wavelength; or the predetermined pattern starts with the second shortest wavelength out of N numbered wavelengths, selects even numbers of the wavelengths in ascending order in turn, then selects the longest wavelength in odd numbers after selecting the longest wavelength in even numbers, selects odd numbers of the wavelengths in descending order in turn, and selects again the second shortest wavelength after selecting the shortest wavelength.

62. A method according to claim 52, wherein said transmission means includes:

N numbered fixed channel transmission means, each of which selectively outputs a predetermined channel out of the N numbered channels so that the channel to be output from each fixed channel transmission means cannot overlap another channel, and connection alteration means for altering connection between said N numbered buffer means and said N numbered fixed channel transmission means, and wherein channel alteration of said transmission means is performed by altering said fixed channel transmission means, from which signals of the respective buffers are transmitted, in accordance with a predetermined pattern by controlling said connection alteration means.

63. A method according to claim 62, wherein said connection alteration means include N numbered selectors, which correspond to said N numbered fixed channel transmission means respectively, and distribution means for distributing outputs from said N numbered buffer means among all of said N numbered selectors so that the connection between said buffer means and said fixed channel transmission means can be altered by alteration as to which output should be selected from said buffer means for each selector.

64. A signal transmission control method for node devices in a network system which includes N numbered channels and a plurality of node devices each for receiving and transmitting two or more preassigned channels out of the N numbered channels so that a signal to be transmitted through any one of the N numbered channels can be transferred to another channel for transmission in at least one node device out of all of node devices, comprising steps of:

receiving signals transmitted through n numbered channels out of N numbered channels in n numbered reception means, the n numbered channels each of which is received and transmitted by the at least one node device;

temporarily storing, in n numbered buffer means, signals to be transmitted out of the signals received by said n numbered reception means;

controlling transmission means, which can send each signal from said each buffer means respectively through the n numbered channels, to alter the channels through which the signals from said buffer means can be sent in accordance with a predetermined pattern to prevent the signals from two or more of said buffer means from being sent to the same channel at the same time; and controlling said buffer means operating synchronously with the alteration of channels to read out the signals through desired channels.

65. A method according to claim 64 further including a step of separating by separation means a certain signal to be separated from a stream of signals received by said reception means and outputting the certain signal to a terminal equipment connected thereto through a sub-transmission line.

66. A method according to claim 65, wherein the signal to be transmitted includes a destination address comprising a separation means address indicating the separation means to which a destination accepting terminal has been connected or the node device in which the separation means are included, and a channel address indicating a channel through which the separation means can selectively separate the certain signal, whereby said buffer means can select a channel for outputting the signal in accordance with the channel address and said separation means can determine in accordance with the separation means address whether to separate the signal or not.

67. A method according to claim 66, wherein said buffer means determines in accordance with the separation means address whether the signal should be output to a channel in accordance with the channel address.

68. A method according to claim 64, wherein said buffer means identifies a signal to be output through a channel in accordance with the channel address when the input signal is to be separated in separation means adjacent to a stream of signals along the transmission direction of the at least one node device.

69. A method according to claim 64 further including a step of inserting a signal sent from a terminal equipment connected thereto through a sub-transmission line into a signal stream to be transmitted by said transmission means.

70. A method according to claim 64, wherein said buffer means stores signals by dividing the signals into one signal to be output with a channel designated through which the signal should be sent, and another signal to be output without channel designation.

71. A method according to claim 70, wherein said buffer means stores the signal to be output with channel designated by further dividing the signal for the channel for transmission.

72. A method according to claim 64, wherein said transmission means includes n numbered variable channel transmission means respectively corresponding to said n numbered buffer means so that channel alteration of said transmission means can be performed by altering respective channels of said variable channel transmission means.

73. A method according to claim 72, wherein the plurality of channels are optical channels of N numbered wavelengths including n numbered individual wavelengths and said variable channel transmission means are used as variable wavelength transmission means each of which alters its transmission wavelength in a predetermined pattern;

the predetermined pattern starts with the shortest wavelength out of n numbered wavelengths, selects odd numbers of the wavelengths in ascending order in turn, then selects the longest wavelength in even numbers after selecting the longest wavelength in odd numbers, selects even numbers of the wavelengths in descending order in turn, and selects again the shortest wavelength after selecting the second shortest wavelength; or the predetermined pattern starts with the second shortest wavelength out of n numbered wavelengths, selects even numbers of the wavelengths in ascending order in turn, then selects the longest wavelength in odd numbers after selecting the longest wavelength in even numbers, selects odd numbers of the wavelengths in descending order in turn, and selects again the second shortest wavelength after selecting the shortest wavelength.

74. A method according to claim 64, wherein said transmission means includes:

n numbered fixed channel transmission means, each of which selectively outputs a predetermined channel out of the n numbered channels so that the channel to be output from each fixed channel transmission means cannot overlap another channel, and connection alteration means for altering connection between said n numbered buffer means and said n numbered fixed channel transmission means, and wherein channel alteration of said transmission means is performed by altering said fixed channel transmission means, from which signals of the respective buffers are transmitted, in accordance with a predetermined pattern by controlling said connection alteration means.

75. A method according to claim 74, wherein said connection alteration means includes n numbered selectors, which correspond to said n numbered fixed channel transmission means respectively, and distribution means for distributing outputs from said n numbered buffer means among all of said n numbered selectors so that the connection between said buffer means and said fixed channel transmission means can be altered by alteration as to which output should be selected from said buffer means for each selector.

76. A signal transmission control method for a first node device in a network system in which a plurality of node devices are connected for signal transmission through N numbered channels and in which a signal to be outputted from the first node device through a channel of the N numbered channels is received in another node device or other node devices, comprising the steps of:

- temporarily storing signals to be transmitted of signals which are input from said N numbered channels in N numbered buffers, respectively;
- altering channels from which the signals respectively stored in the N numbered buffers can be outputted in accordance with a predetermined pattern to prevent the signals from two or more of said N numbered buffers being outputted concurrently to one channel; and
- controlling read out of signals from said N numbered buffers synchronously with the altering of channels in said altering step.

77. A signal transmission control method for node devices in a network system which includes N numbered channels and a plurality of node devices each for processing two or more preassigned channels of the N numbered channels so that a signal to be transmitted through any one of the N numbered channels can be outputted to another channel in at least one node device of all of the node devices, comprising the steps of:

- temporarily storing signals to be transmitted of signals which are input from n numbered channels of the N numbered channels in n numbered buffers respectively, each of the n numbered channels being preassigned to the at least one node device;
- altering channels from which the signals respectively stored in n numbered buffers can be outputted in accordance with a predetermined pattern to prevent the signals from two or more of said n numbered buffers being outputted concurrently to one channel; and
- controlling read out of signals from said n numbered buffers synchronously with alteration of channels in said altering step.

* * * * *

UNITED STATES PATENT AND TRADEMARK OFFICE
CERTIFICATE OF CORRECTION

PATENT NO. : 5,801,859

DATED : September 1, 1998

INVENTOR(S) : MITSURU YAMAMOTO

It is certified that error appears in the above-identified patent and that said Letters Patent is hereby corrected as shown below:

COLUMN 3

Line 37, "can not" should read --cannot--.
    Line 43, "can not" should read --cannot--.
    Line 46, "such" should be deleted.
    Line 63, "Power" should read --power--.

COLUMN 4

Line 52, "destinationed" should read --directed--.
    Line 55, "a-preditermined" should read --a predetermined--.

COLUMN 5

Line 19, "such" should read --mentioned--.

COLUMN 6

Line 17, "including;" should read --including:--.
    Line 26, "can not" should read --cannot--.
    Line 33, "including;" should read --including:--.
    Line 41, "can" should read --can---.
    Line 52, "such" should read --such as mentioned--.
    Line 63, "such" should read --mentioned--.

UNITED STATES PATENT AND TRADEMARK OFFICE
CERTIFICATE OF CORRECTION

PATENT NO. : 5,801,859

DATED : September 1, 1998

INVENTOR(S) : MITSURU YAMAMOTO

Page 2 of 8

It is certified that error appears in the above-identified patent and that said Letters Patent is hereby corrected as shown below:

COLUMN 7

Line 26, "including;" should read --including:--.
    Line 42, "different" should read --different from--.
    Line 49, "can not" should read --cannot--.
    Line 52, "such" should read --mentioned--.
    Line 59, "such" should read --mentioned--.

COLUMN 8

Line 55, "includes" should read --includes:--.

COLUMN 9

Line 2, "can not" should read --cannot--.
    Line 8, "can not" should read --cannot--.
    Line 17, "such" should read --mentioned--.

COLUMN 10

Line 29, "connection alteration" should read
          --connection-alteration--.
    Line 32, "connection control" should read
          --connection-control--.
    Line 52, "includes." should read --includes--.
    Line 55, "can not" should read --cannot--.

UNITED STATES PATENT AND TRADEMARK OFFICE
CERTIFICATE OF CORRECTION

PATENT NO.: 5,801,859
DATED : September 1, 1998
INVENTOR(S): MITSURU YAMAMOTO Page 3 of 8

It is certified that error appears in the above-identified patent and that said Letters Patent is hereby corrected as shown below:

COLUMN 12

Line 20, "k1" should read --$\lambda 1$--
Line 31, "connected" should read --connected to--.
Line 32, "wave" should read --wave---.

COLUMN 13

Line 24, "packet" should read --packet to--.

COLUMN 15

Line 25, "such" should read --as mentioned--.
Line 27, "such" should read --as mentioned--.

COLUMN 16

Line 60, "ther" should read --other--.

COLUMN 17

Line 55, "destinated" should read --directed--.

UNITED STATES PATENT AND TRADEMARK OFFICE
CERTIFICATE OF CORRECTION

PATENT NO. : 5,801,859

DATED : September 1, 1998

INVENTOR(S) : MITSURU YAMAMOTO

It is certified that error appears in the above-identified patent and that said Letters Patent is hereby corrected as shown below:

COLUMN 18

Line 22, "interacting" should read --interacting with--.
    Line 35, "X8" should read --$\lambda 8$--.
    Line 40, "k1" should read --$\lambda 1$--.
    Line 49, "destinationed" should read --directed--.
    Line 58, "destinationed" should read --directed--.
    Line 65, "count" should read --counts--.

COLUMN 20

Line 28, "destinationed" should read --directed--.
    Line 29, "the" should be deleted.
    Line 38, "such" should be deleted.

COLUMN 21

Line 52, "(Third embodiment)" should read
    --(Third Embodiment)--.

COLUMN 22

Line 16, "can not" should read --cannot--.
    Line 33, "can not" should read --cannot--.
    Line 45, "can not" should read --cannot--.
    Line 54, "such" should read --described--.

UNITED STATES PATENT AND TRADEMARK OFFICE
CERTIFICATE OF CORRECTION

PATENT NO. : 5,801,859
DATED : September 1, 1998
INVENTOR(S): MITSURU YAMAMOTO Page 5 of 8

It is certified that error appears in the above-identified patent and that said Letters Patent is hereby corrected as shown below:

COLUMN 23

Line 27, "such" should read --described--.
    Line 34, "such" should read --described--.
    Line 35, "can not" should read --cannot--.
    Line 44, "such" should read --described--.
    Line 62, "such" should read --described--.

COLUMN 25

Line 23, "FIG. 3" should read --FIG. 23--.
    Line 46, "such" should read --described--.
    Line 64, "destinationed" should read --directed--.

COLUMN 26

Line 26, "such" should read --as described--.

COLUMN 28

Line 23, "destinationed" should read --directed--.

COLUMN 29

Line 30, "set" should read --sets--.

UNITED STATES PATENT AND TRADEMARK OFFICE
CERTIFICATE OF CORRECTION

PATENT NO. : 5,801,859
DATED      : September 1, 1998
INVENTOR(S): MITSURU YAMAMOTO Page 6 of 8

It is certified that error appears in the above-identified patent and that said Letters Patent is hereby corrected as shown below:

COLUMN 30

Line 19, "destinationed" should read --directed--.
    Line 35, "destinationed" should read --directed--.
    Line 64, "such" should read --described--.
    Line 67, "interacting" should read --interacting with--.

COLUMN 31

Line 41, "match" should read --matches--.
    Line 50, "count" should read --counts--.

COLUMN 32

Line 21, "reading" should read --reading of--.
    Line 31, "such" should read --described--.
    Line 50, "subs equent" should read --subsequent--.

COLUMN 33

Line 22, "match" should read --matches--.

UNITED STATES PATENT AND TRADEMARK OFFICE
CERTIFICATE OF CORRECTION

PATENT NO. : 5,801,859

DATED : September 1, 1998

INVENTOR(S): MITSURU YAMAMOTO

It is certified that error appears in the above-identified patent and that said Letters Patent is hereby corrected as shown below:

COLUMN 34

```
Line 20, "can not" should read --cannot--.
Line 22, "determined" should read --determine--.
Line 25, "can not" should read --cannot--.
Line 31, "be" should be deleted.
Line 36, "other" should read --and other--.
Line 42, "a" should read --and a--.
```

COLUMN 35

```
Line 6, "such" should read --described--.
```

COLUMN 36

```
Line 1, "claim 1" should read --claim 1,--.
Line 2, "comprising;" should read --comprising:--.
Line 53, "turns" should read --turn,--.
```

COLUMN 37

```
Line 24, "including;" should read --including:--.
Line 46, "comprising;" should read --comprising:--
```

UNITED STATES PATENT AND TRADEMARK OFFICE
CERTIFICATE OF CORRECTION

PATENT NO. : 5,801,859
DATED : September 1, 1998
INVENTOR(S) : MITSURU YAMAMOTO It is certified that error appears in the above-identified patent and that said Letters Patent is hereby corrected as shown below:

COLUMN 38

Line 14, "including;" should read --including:--.
Line 18, "channels:" should read --channels;--.
Line 23, "n" should read --N--.

COLUMN 41

Line 21, "turns" should read --turn,--.

COLUMN 43

Line 8, "in-even" should read --in even--.

COLUMN 44

Line 9, "determine" should read --determines--.

Signed and Sealed this

Twenty-ninth Day of June, 1999

*Attest:*

Q. TODD DICKINSON

*Attesting Officer*     *Acting Commissioner of Patents and Trademarks*